(12) United States Patent
Brey et al.

(10) Patent No.: US 7,989,384 B2
(45) Date of Patent: Aug. 2, 2011

(54) CATALYSTS, ACTIVATING AGENTS, SUPPORT MEDIA, AND RELATED METHODOLOGIES USEFUL FOR MAKING CATALYST SYSTEMS ESPECIALLY WHEN THE CATALYST IS DEPOSITED ONTO THE SUPPORT MEDIA USING PHYSICAL VAPOR DEPOSITION

(75) Inventors: Larry A. Brey, Woodbury, MN (US);
Thomas E. Wood, Stillwater, MN (US);
Gina M. Buccellato, Eagan, MN (US);
Marvin E. Jones, Grant, MN (US);
Craig S. Chamberlain, Woodbury, MN (US); Allen R. Siedle, Lake Elmo, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 12/756,635

(22) Filed: Apr. 8, 2010

(65) Prior Publication Data

US 2010/0197481 A1  Aug. 5, 2010

Related U.S. Application Data

(62) Division of application No. 10/948,012, filed on Sep. 23, 2004, now Pat. No. 7,727,931.

(60) Provisional application No. 60/506,623, filed on Sep. 26, 2003.

(51) Int. Cl.
| | |
|---|---|
| $B01J\ 21/18$ | (2006.01) |
| $B01J\ 23/00$ | (2006.01) |
| $B01J\ 23/02$ | (2006.01) |
| $B01J\ 23/06$ | (2006.01) |
| $B01J\ 23/04$ | (2006.01) |
| $C01D\ 7/37$ | (2006.01) |
| $C01B\ 31/20$ | (2006.01) |
| $C01B\ 31/32$ | (2006.01) |

(52) U.S. Cl. ........ 502/184; 502/317; 502/340; 502/344; 423/427; 423/437.2; 423/441; 977/900

(58) Field of Classification Search .................. 502/184, 502/317, 340, 344; 423/427, 437.2, 441; 977/900
See application file for complete search history.

(56) References Cited

U.S. PATENT DOCUMENTS 3,873,469 A * 3/1975 Foster et al. .................. 502/242
(Continued)

FOREIGN PATENT DOCUMENTS

DE        4432155        3/1996
(Continued)

OTHER PUBLICATIONS

Prati et al. "Gold on carbon as a new catalyst for selective liquid phase oxidation of diols." Journal of Catalysis 176, 552-560 (1998).*

(Continued)

*Primary Examiner* — Jerry Lorengo
*Assistant Examiner* — Jennifer A Smith
(74) *Attorney, Agent, or Firm* — Kenneth B. Wood

(57) ABSTRACT

Use of physical vapor deposition methodologies to deposit nanoscale gold on activating support media makes the use of catalytically active gold dramatically easier and opens the door to significant improvements associated with developing, making, and using gold-based, catalytic systems. The present invention, therefore, relates to novel features, ingredients, and formulations of gold-based, heterogeneous catalyst systems generally comprising nanoscale gold deposited onto a nanoporous support.

25 Claims, 31 Drawing Sheets

U.S. PATENT DOCUMENTS

| | | | |
|---|---|---|---|
| 3,966,645 A | | 6/1976 | Cairns et al. |
| 4,046,712 A | | 9/1977 | Cairns et al. |
| 4,087,622 A | | 5/1978 | Nakamura et al. |
| 4,469,640 A | | 9/1984 | Carcia et al. |
| 4,524,051 A | | 6/1985 | Wright et al. |
| 4,536,482 A | | 8/1985 | Carcia |
| 4,618,525 A | | 10/1986 | Chamberlain et al. |
| 4,686,202 A | | 8/1987 | Broecker |
| 4,698,324 A | | 10/1987 | Haruta et al. |
| 4,703,008 A | | 10/1987 | Lin |
| 4,839,327 A | | 6/1989 | Haruta et al. |
| 4,912,082 A | | 3/1990 | Upchurch et al. |
| 4,937,219 A | | 6/1990 | Haruta et al. |
| 4,994,422 A | | 2/1991 | Goldman |
| 5,051,394 A | | 9/1991 | Haruta et al. |
| 5,058,578 A | | 10/1991 | Weiss |
| 5,068,217 A | | 11/1991 | Falke et al. |
| 5,250,487 A | * | 10/1993 | Wirtz et al. .................. 502/243 |
| 5,492,627 A | * | 2/1996 | Hagen et al. .................. 210/651 |
| 5,506,273 A | | 4/1996 | Haruta et al. |
| 5,525,568 A | | 6/1996 | Yamaguchi et al. |
| 5,550,093 A | | 8/1996 | Wan et al. |
| 5,559,065 A | | 9/1996 | Lauth et al. |
| 5,623,090 A | | 4/1997 | Haruta et al. |
| 5,750,013 A | | 5/1998 | Lin |
| 5,759,949 A | | 6/1998 | Grigorova et al. |
| 5,789,337 A | | 8/1998 | Haruta et al. |
| 5,851,452 A | * | 12/1998 | Mas et al. ....................... 264/4.6 |
| 5,929,258 A | | 7/1999 | Hayashi et al. |
| 5,932,750 A | * | 8/1999 | Hayashi et al. ................ 549/523 |
| 5,989,648 A | | 11/1999 | Phillips |
| 6,034,028 A | | 3/2000 | Hayashi et al. |
| 6,110,862 A | | 8/2000 | Chen |
| 6,124,505 A | | 9/2000 | Haruta et al. |
| 6,252,095 B1 | | 6/2001 | Hayashi et al. |
| 6,265,341 B1 | | 7/2001 | Komatsu et al. |
| 6,504,039 B2 | | 1/2003 | Weisbeck et al. |
| 6,524,991 B2 | | 2/2003 | Bowman et al. |
| 6,528,031 B1 | | 3/2003 | Park et al. |
| 6,534,438 B1 | | 3/2003 | Baker et al. |
| 6,548,682 B1 | | 4/2003 | Weisbeck et al. |
| 6,692,713 B2 | | 2/2004 | Grunwaldt et al. |
| 6,800,584 B2 | | 10/2004 | Baker et al. |
| 7,243,658 B2 | | 7/2007 | Deevi et al. |
| 2002/0115894 A1 | | 8/2002 | Weisbeck et al. |
| 2003/0004054 A1 | | 1/2003 | Ito et al. |
| 2003/0013904 A1 | | 1/2003 | Chaturvedi et al. |
| 2003/0042226 A1 | | 3/2003 | Coll et al. |
| 2003/0060655 A1 | | 3/2003 | Hayashi et al. |
| 2003/0073573 A1 | | 4/2003 | Baker et al. |
| 2003/0092921 A1 | | 5/2003 | Stangland et al. |
| 2003/0134741 A1 | | 7/2003 | Weisbeck et al. |
| 2003/0187294 A1 | | 10/2003 | Hagemeyer et al. |
| 2004/0138480 A1 | | 7/2004 | Weisbeck et al. |
| 2005/0095189 A1 | | 5/2005 | Brey et al. |
| 2006/0168924 A1 | | 8/2006 | Sun |
| 2007/0207079 A1 | | 9/2007 | Brady |

FOREIGN PATENT DOCUMENTS

| | | |
|---|---|---|
| DE | 10020346 | 11/2000 |
| DE | 10030637 | 1/2002 |
| DE | 10321273 | 12/2004 |
| EP | 0 129 406 A | 12/1984 |
| EP | 0499402 | 8/1992 |
| EP | 0827779 A1 | 3/1998 |
| EP | 1031378 | 8/2000 |
| EP | 1040869 A2 | 10/2000 |
| EP | 1125933 | 8/2001 |
| EP | 1288188 | 3/2003 |
| EP | 1027356 B1 | 12/2003 |
| EP | 1378369 B1 | 12/2004 |
| EP | 1437228 B1 | 3/2005 |
| EP | 1169491 B1 | 9/2005 |
| EP | 1512544 B1 | 11/2005 |
| EP | 1292380 B1 | 12/2005 |
| GB | 606876 | 4/1948 |
| GB | 1486108 | 9/1977 |
| JP | 1094945 | 4/1989 |
| JP | 5057192 | 3/1993 |
| JP | 5103996 | 4/1993 |
| JP | 5154384 | 6/1993 |
| JP | 6016422 | 1/1994 |
| JP | 7008797 | 1/1995 |
| JP | 7096187 | 4/1995 |
| JP | 8127550 | 5/1996 |
| JP | 8295502 | 11/1996 |
| JP | 9127036 | 5/1997 |
| JP | 10005590 | 1/1998 |
| JP | 10237055 | 9/1998 |
| JP | 10244156 | 9/1998 |
| JP | 10330291 | 12/1998 |
| JP | 11076820 | 3/1999 |
| JP | 2000296332 | 10/2000 |
| JP | 2000309582 | 11/2000 |
| JP | 2001334155 | 12/2001 |
| JP | 2002-513672 T | 5/2002 |
| JP | 2003103174 | 4/2003 |
| RU | 1825654 | 7/1993 |
| RU | 2626495 | 6/1995 |
| WO | WO 97/43042 | 11/1997 |
| WO | WO 98/00413 | 1/1998 |
| WO | WO 99/47726 | 9/1999 |
| WO | WO 00/09259 | 10/2000 |
| WO | WO 00/59632 | 10/2000 |
| WO | WO 02/066154 | 8/2002 |
| WO | WO 02/072258 | 9/2002 |
| WO | WO 2004/112958 A1 | 12/2004 |
| WO | WO 2006/003450 | 1/2006 |
| WO | WO 2007/106664 | 9/2007 |

OTHER PUBLICATIONS

Bond, G.C. et al., *Gold Bulletin*, vol. 33, No. 2 pp. 41-51, 2000.
Wolf, A. et al., *Applied Catalysis A*: General 226, pp. 1-13, 2002.
Takeuchi, A. et al., "High Dispersion Platinum Catalyst by RF Sputtering," *Journal of Catalysis*, vol. 83, p. 477-479, 1983.
Liu, Z.P. et al., "General Rules for predicting Where a Catalytic Reaction Should Occur on Metal Surfaces: A Density Functional Theory Study of C-H and C-O Bond Breaking/Making on Flat, Stepped, and Kinked Metal Surfaces," J. Am. Chem. Soc., vol. 125, No. 7, pp. 1958-1967, 2003.
Kobayashi T. et al., "Thin Films of Supported Gold Catalysts for CO Detection," *Sensors and Actuators*, B1, pp. 222-225, 1990.
Oh, H.S et al., "Selective Catalytic Oxidation of CO: Effect of Chloride on Supported Au Catalysts," *Journal of Catalysis*, vol. 210, pp. 35-386, 2002.
Costello, C.K. et al., "Nature of the Active Site for CO Oxidation on Highly Active Au/y-Al2O3" *Applied Catalysis A: General*, vol. 232, pp. 159-168, 2002.
Grisel, R. et al, "Catalysis by Gold Nanoparticles," *Gold Bulletin*, vol. 35, No. 2, pp. 39-45, 2002.
Wang, D. et al., "Influence of pretreatment conditions on low-temperature CO oxidation over Au/MOx/Al2O3 catalysts," *Journal of Molecular Catalysis A: Chemical*, vol. 200, pp. 229-238, 2003.
Hakkinen, H. et al., "Gold Clusters (AuN, 2<N<10) and their anions," *Physical Review* B, vol. 62, No. 4, pp. R2287- R2290, 2000.
Sanchez,A. et al., "When Gold Is Not Noble: Nanoscale Gold Catalysts, " *J. Phys. Chem. A*, vol. 103, pp. 9573-9578,1999.
Semenov, E., "Multiayer Nanoporous Gold," JHU Summer Internship, Jul. 26, 2002.
Reisner, D.E. et al., "Nanostructured Materials for Energy Storage and Energy Conversion Devices," IECEC, Proceedings Paper #97501, vol. 2,1997.
Boccuzzl, F. et al., "Au/TiO2 Nanosized Samples: A Catalytic, Tem, and FTR Study of the Effect of Calcination Temperature on the CO Oxidation," Journal of Catalysis, vol. 202, pp. 256-267, 2001.
Lee, S. et al., "Au catalysts supported on anodized aluminium for low-temperature CO oxidation," *Catalysis Communications*, vol. 3, pp. 425-428, 2002.
World Gold Council, CatGold News, No. 1 Sep. 2001.
World Gold Council, CatGold News, No. 2, Spring 2002.
World Gold Council, CatGold News, No. 3, Autumn 2002.
World Gold Council, CatGold News, No. 4, Spring 2003.

Ando, Masanori et al., *Large Optical CO Sensitivity of $NO_2$-Pretreated Au-NiO Composite Films*, Sensors and Actuators B, vol. 36, No. 1, pp. 513-516 (Oct. 1996).

Arrii, S. et al., *Oxidation of CO on Gold Supported Catalysts Prepared by Laser Vaporization: Direct Evidence of Support Contribution*, J. Am. Chem. Soc., vol. 126, No. 4, pp. 1199-1205 (Jan. 10, 2004).

Chen, Yeong-Jey et al., *Deposition of Highly Dispersed Gold on Alumina Support*, Journal of Catalysis, vol. 200, No. 1, pp. 59-68 (May 15, 2001).

Endes, H.E., et al., *A Thin-Film $SnO_2$ Sensor System for Simultaneous Detection of CO and $NO_2$ with Neural Signal Evaluation*, Sensors and Actuators, vol. 36, No. 1, pp. 353-357 (Oct. 1996).

Ensinger, W. et al., *Noble et. al Deposition on Aluminum Oxide Powder Surfaces by Ion Beam Sputtering*, Nuclear Instruments and Methods in Physics Research B, vol. 141, No. 1-4, pp. 693-698 (May 1998).

Ensinger, W. et al., *Surface Treatment of Aluminum Oxide and Tungsten Carbide Powders by Ion Beam Sputter Deposition*, Surface and Coatings Technology, vol. 163-164, pp. 281-285 (Oct. 3, 2002).

Ensinger, W. et al., *The Rotating Wing Drum: An Apparatus for Ion Beam Treatment of Powders*, Review of Scientific Instruments, vol. 65, No. 9, pp. 2963-2967 (Sep. 1, 1994).

Ensinger, W. et al., *Noble et. al Deposition on Aluminum Oxide Powder Surfaces by Ion Beam Sputtering*, Nuclear Instruments and Methods in Physics Research B, vol. 141, No. 1-4, pp. 693-698 (May 1998).

Ensinger, W. et al., *Surface Treatment of Aluminum Oxide and Tungsten Carbide Powders by Ion Beam Sputter Deposition*, Surface and Coatings Technology, vol. 163-164, pp. 281-285 (Oct. 3, 2002).

Ensinger, W. et al., *The Rotating Wing Drum: An Apparatus for Ion Beam Treatment of Powders*, Review of Scientific Instruments, vol. 65, No. 9, pp. 2963-2967 (Sep. 1, 1994).

Grisel, R.J.H. et al, *Selective Oxidation of CO, Over Supported Au Catalysts*, Journal of Catalysis, vol. 199, No. 1, pp. 48-59 (Apr. 1, 2001).

Haruta, Masatake et al., *Chemical Vapor Deposition of Gold on $Al_2O_3$, $SiO_2$, and $TiO_2$ for the Oxidation of CO and of $H_2$*, Catalysis Letters, vol. 51, No. 1-2, pp. 53-58 (Jan. 1998).

Haruta, Masatake et al., *Thin Films of Supported Gold Catalysts for CO Detection*, Sensors and Actuators B. vol. 1, 1990, pp. 222-225.

Kalck, Philippe et al., *Chemical Vapor Deposition Methods for the Controlled Preparation of Supported Catalytic Materials*, Chem. Rev., vol. 102, No. 9, pp. 3085-3128 (Aug. 3, 2002).

LeGore, L.J. et. al., *Aggregation and Sticking Probability of Gold on Tungsten Trioxide Films*, Sensors and Actuators B, vol. 76, No. 1-3, pp. 373-379 (Jun. 1, 2001).

Veith, Gabriel M. et al, *Noanoparticles of Gold on $\gamma$-$Al_2O_3$ Produced by DC Magnetron Sputtering*, Journal of Catalysis, vol. 231, No. 1, pp. 151-158 (Apr. 1, 2005).

Lu, G. Q., et al., *Nanoporous Materials—An Overview*, Nanoporous Materials: Science and Engineering, Imperial College, Press, 2004, ISBN: 1-86094-211-3, chapter 1, pp. 1-12.

Balerna, A., et al., *A Structural Investigation on Small Gold Clusters by Exafs*, Surface Science 156 (1985) 206-213.

Bond, Geoffrey C., et al., *Catalysis by Gold*, Catal. Rev.-Sci. Eng., 41 (3&4), 319-388 (1999).

Carnes, Corrie L., et al., *Synthesis, Characterization, and Adsorption Studies of Nanocrystalline Aluminum Oxide and a Bimetallic Nanocrystalline Aluminum Oxide/Magnesium Oxide*, Chem. Mater. 2002, 14, 2922-2929.

Demydov, Dmytro, et al., *Characterization of Mixed Metal Oxides ($SrTiO_3$ and $BaTiO_3$) Synthesized by a Modified Aerogel Procedure*, Journal of Non-Crystalline Solids, 350 (2004) 165-172.

Guczi, L., et al., *Modeling Gold Nanoparticles: Morphology, Electron Structure, and Catalytic Activity in CO Oxidation*, J. Phys. Chem. B 2000, 104, 3183-3193.

Haruta, Masatake, *Size- and Support-Dependency in the Catalysis of Gold*, Catalysis Today, 36 (1997) 153-166.

Kobayashi, Tetsuhiko, et al., *Thin Films of Supported Gold Catalysts for CO Detection*, Sensors and Actuators, B1 (1990) 222-225.

Kozlova, Anguelina P., *Iron-Oxide Supported Gold Catalysts Derived from Gold-Phosphine Complex $Au(PPh_3)(NO_3)$: State and Structure of the Support*, Journal of Catalysis 176, 426-438 (1998).

Okumura, Mitsutaka, et al., *Chemical Vapor Deposition of Gold Nanoparticles on MCM-41 and Their Catalytic Activities for the Low-Temperature Oxidation of CO and of $H_2$*, Chemistry Letters 1998, 315-316.

Okumura, Mitsutaka, et al., *Chemical Vapor Deposition of Gold on $Al2O_3$, $SiO_2$, and $TiO_2$ for the Oxidation of CO and of $H_2$*, Catalysis Letters 51 (1998) 53-58.

Okumura, Mitsutaka, et al., *The Reactivities of Dimethylgold (III)$\beta$-Diketone on the Surface of $TiO_2$*, Solid State Ionics 95 (1997) 143-149.

Potters Industries Inc., *Spheriglass® Solid Glass Spheres*, internet article at http://web.archive.org/web/20030802223458/http://www.pottersbeads.com/markets/polySpheriglass.asp retrieved on Mar. 29, 2005 and Way Back Machine, *Search Results*, internet article at http://web.archive.org/web/*/http://www.pottersbeads.com/markets/polySpheriglass.asp retrieved on Mar. 29, 2005.

Prati, Laura, et al., *Gold on Carbon as a New Catalyst for Selective Liquid Phase Oxidation of Diols*, Journal of Catalysis 176, 552-560 (1998).

Serp, Philippe, et al., *Chemical Vapor Deposition Methods for the Controlled Preparation of Supported Catalytic Materials*, Chem. Rev. 2002, 102, 3085-3128.

Sigma-Aldrich Co., *Nanomaterials*, internet article at http://www.sigmaaldrich.com/img/assets/3900/NanoMetOxPowd&MesMolSieves.PDF> retrieved on Mar. 22, 2005.

Solliard, C., et al., *Surface Stress and Size Effect on the Lattice Parameter in Small Particles of Gold and Platinum*, Surface Science 156 (1985) 487-494.

Valden, M., et al., *Onset of Catalytic Activity of Gold Clusters on Titania with the Appearance of Nonmetallic Properties*, Science, v. 281 (Sep. 11, 1998).

Prati et al. Gold on carbon as a new catalyst for selective liquid phase oxidation of diols. Journal of Catalysis 176, 552-650 (1998).

Yeong-Jey, Deposition of Highly Dispersed Gold on Alumina Support, Journal of Catalysis 200, 59-68, 2001.

Extended European Search Report, EP Divisional Patent Application 10 17 9499.8, Mar. 8, 2011, 6 pages.

* cited by examiner

CATALYSTS, ACTIVATING AGENTS, SUPPORT MEDIA, AND RELATED METHODOLOGIES USEFUL FOR MAKING CATALYST SYSTEMS ESPECIALLY WHEN THE CATALYST IS DEPOSITED ONTO THE SUPPORT MEDIA USING PHYSICAL VAPOR DEPOSITION

CROSS-REFERENCE TO RELATED APPLICATIONS

This application is a divisional of U.S. patent application Ser. No. 10/948,012, filed Sep. 23, 2004, now U.S. Pat. No. 7,727,931 which claimed the benefit of U.S. Provisional Patent Application Ser. No. 60/506,623, filed on Sep. 26, 2003, the disclosures of both of which are incorporated herein by reference in their entirety.

FIELD OF THE INVENTION

The present invention relates to gold-based catalyst systems, and particularly to gold-based catalyst systems in which nanoscale gold particles are immobilized on nanoporous support media.

BACKGROUND OF THE INVENTION

It has been known that ultra-fine, nanoscale gold particles exhibit specific physical and chemical properties different from those of the ordinary coarse gold grains ("Ultra-fine Particles" published by Agne Publishing Center in 1986). In particular, such ultrafine gold is catalytically active and can be used as a catalyst for oxidizing carbon monoxide to form carbon dioxide. The use of catalytically active gold also has been proposed to catalyze other oxidation reactions such as the oxidation of carbonaceous soot in diesel exhaust streams, oxidation of unsaturated and saturated hydrocarbons, and the like.

Generally, ultra-fine particles of gold are very mobile and possess large surface energies and, therefore, tend to coagulate easily. In fact, it has been difficult to prevent such coagulation from occurring, making ultrafine gold hard to handle. Such mobility is undesirable inasmuch as the catalytic activity of gold tends to fall off as its particle size increases. This problem is relatively unique to gold and is much less of an issue with other noble metals such as Pt and Pd. Therefore, the development of the methods to deposit and immobilize ultrafine gold particles on a carrier in a uniformly dispersed state has been desired.

The primary methods known to date to deposit catalytically active gold on various supports recently have been summarized by Bond and Thompson (G. C. Bond and David T. Thompson, *Gold Bulletin,* 2000, 33(2) 41) as including (i) coprecipitation, in which the support and gold precursors are brought out of solution, perhaps as hydroxides, by adding a base such as sodium carbonate; (ii) deposition-precipitation, in which the gold precursor is precipitated onto a suspension of the pre-formed support by raising the pH, and (iii) Iwasawa's method in which a gold-phosphine complex (e.g., [Au(PPh$_3$)]NO$_3$) is made to react with a freshly precipitated support precursor. Other procedures such as the use of colloids, grafting and vapor deposition meet with varying degrees of success.

These methods, however, suffer from serious difficulties resulting in a situation as aptly described by Wolf and Schuth (Applied Catalysis A; General 226 (2002) 2): (hereinafter the Wolf et al. article). "Although rarely expressed in publications, it also is well known that the reproducibility of highly active gold catalysts is typically very low." The reasons for this serious reproducibility problem with these methods include: the difficulty in controlling gold particle size, the poisoning of the catalyst by ions such as Cl, the inability of these methods to control nano-sized gold particle deposition, the loss of active gold in the pores of the substrate, the necessity in some cases of thermal treatments to activate the catalysts, inactivation of certain catalytic sites by thermal treatment, the lack of control of gold oxidation state, and the inhomogeneous nature of the hydrolysis of gold solutions by the addition of a base.

DE 10030637 A1 describes using PVD techniques to deposit gold onto support media. However, the support media exemplified in working examples are merely ceramic titanates made as described under conditions in which the media would lack nanoporosity. Thus, this documents fails to appreciate the importance of using nanoporous media to support catalytically active gold deposited using PVD techniques. WO 99/47726 and WO 97/43042 provide lists of support media, catalytically active metals, and/or methods for providing the catalytically active metals onto the support media. However, these two documents also fail to appreciate the benefits of using nanoporous media as a support for catalytically active gold deposited via PVD. Indeed, WO 99/47726 lists many supports as preferred that lack nanoporosity.

In short, gold offers great potential as a catalyst, but the difficulties involved with handling catalytically active gold have severely restricted the development of commercially feasible, gold-based, catalytic systems.

SUMMARY OF THE INVENTION

We have discovered that the use of physical vapor deposition methodologies to deposit nanoscale gold on activating, nano-porous support media makes the use of catalytically active gold dramatically easier and opens the door to significant improvements associated with developing, making, and using gold-based, catalytic systems. The present invention, therefore, relates to novel features, ingredients, and formulations of gold-based, heterogeneous catalyst systems generally comprising nanoscale gold deposited onto a nanoporous support. The many aspects of the invention provide significant advances in areas including but not limited to catalyst deposition onto support media (especially deposition of catalytically active gold onto a nanoporous support), catalyst support structure, catalyst system design, catalyst activating agents, and methods of using activating agents to enhance the performance of catalytic systems. Some aspects of the present invention also generally are applicable to a wider range of other catalysts such as platinum, palladium, rhodium, ruthenium, molybdenum, iridium, copper, silver, nickel, iron, and the like.

The gold-based catalyst systems of the present invention have excellent catalytic performance. These systems would find application in the area of CO abatement in the form of personal, vehicle and building protection, catalysts and catalyst supports for the purification of exhaust gases from internal combustion engines, removal of CO from fuel cell feedstocks, and in catalyzing other oxidation reactions such as the oxidation of carbonaceous soot in diesel exhaust streams and the selective oxidation of organic compounds. For instance, the gold-based catalyst systems would be suitable as catalyst systems for the catalytic oxidation of unsaturated and saturated hydrocarbons. The term hydrocarbon means unsaturated or saturated hydrocarbons such as olefins or alkanes. The hydrocarbon can also contain heteroatoms like N, O, P, S or halogens. The organic compounds to be oxidized may be acyclic, monocyclic, bicyclic, or polycyclic and may be mono-olefinic, di-olefinic, or poly-olefinic. The double bonds in compounds with two or more double bonds may be conjugated or non-conjugated.

As an overview, one aspect of the invention involves using physical vapor deposition (PVD) methodologies to deposit one or more catalytically active metals such as gold onto a nanoporous support. Some embodiments of nanoporous supports have very high surface area throughout the volume of the support, and conventional methodologies involve impregnating such media as much as possible throughout their volume with catalyst. Indeed, the technical literature reports that such "full volume" impregnation may be required to achieve acceptable catalytic performance. However, PVD tends to be a line of sight coating technique, meaning that PVD deposits catalyst mainly at and very near (some minor surface penetration will occur, such as by diffusion) the surface of the nanoporous support media. From a conventional perspective, the nanoporous media appears to be underutilized, making it appear as if PVD were an inappropriate technique to be used in this context. However, we have found that surface deposition/coating of catalytically active metal onto the nanoscale topography of nanoporous media provides catalyst systems with excellent performance notwithstanding conventional wisdom. In the case of gold, for example, it appears that these nanoscale features help to immobilize the gold, preventing gold accumulation that might otherwise result in a loss of performance. In short, the present invention appreciates that nanoporous support media have more to offer catalytically than just high surface area throughout the volume of the media.

Some aspects of the invention carry out PVD of catalytically active metal in unique ways. In one approach, support media is both tumbled (or otherwise fluidized) and comminuted (e.g., ground or milled) to some degree during at least a portion of the PVD treatment. It has been found that comminuting the media during PVD enhances performance of the resultant catalyst system.

In other aspects, PVD is used to deposit a catalytically active metal such as gold separately from and after the support media has been impregnated with an activating agent. In short, preferred modes of practice involve depositing gold via PVD only after the support media has been impregnated with one or more activating agents, dried, and optionally calcined. This greatly expands the range of activating agents that can be used in combination with a catalytically active metal. We can use ingredients that would otherwise react or be too soluble in solution when wet methods are used to deposit gold. For instance, the process of the invention can deposit gold or other metals onto media comprising very basic or water soluble materials. This has opened the door to testing and using water soluble, metal salts as activating agents inasmuch as these are not washed away when gold is subsequently deposited via PVD. It would not be very practical to attempt to use such salts as activating agents when gold is impregnated onto the support media via solution processing, inasmuch as the gold solutions could wash away the water soluble material and/or be chemically incompatible with the activating agents (e.g., gold solutions tend to be strongly acidic, e.g., $HAuCl_4$).

Water soluble salts such as alkali metal salts and/or alkaline earth metal salts are inexpensive, readily available, and easily incorporated into catalytic systems when practicing the present invention. Significantly, it has been discovered that these salts are potent activators for gold-based catalysis, especially when used to activate nanoporous carbon support media. Bifurcating PVD deposition of catalytically active gold from earlier activation of the support media was a key to help enable this advance in the use of carbon media supports with activating salts for gold-based catalysis.

The present invention offers many other features and advantages. First, we have observed that a catalytically active metal such as gold is active right away when deposited via PVD. There is no need to heat treat the system after gold deposition as is the case with some other methodologies. We anticipate that other precious metals may also not require a heating step after deposition. This, of course, does not mean that a heating step, if desired, is not possible. It is within the scope of the present invention to include a subsequent heating step. Additionally, the gold is highly active catalytically for relatively long periods with respect to CO oxidation, even though it tends to be deposited only proximal to the support media surface when using PVD to deposit the gold. The catalyst systems also are effective in humid environments and work over a wide temperature range, including room temperature (e.g., about 22° C. to about 27° C.) and much cooler (e.g., less than 5° C.).

The physical vapor deposition process is very clean in the sense that there are no impurities introduced into the system as in the case of the solution state processes.

In particular, the process may be chloride-free and thus there is no need for washing steps to remove chloride or other undesirable ions, molecules or reaction by-products, as is the case in most solution state deposition processes.

By using this process, very low levels of metal are required for high activity. While most research in this area uses at least 1% by weight gold to achieve activity, and often times much more than 1 weight % gold to achieve high activity, in this work we have achieved very high activity at 0.05% by weight gold or lower. This reduction in the amount of precious metal required for high activity provides a very substantial cost savings.

The catalyst system is robust and consistent. For example, we prepared and tested two identical embodiments of our system about one month apart. Notwithstanding the fact that the two embodiments were separately made, the respective data for each were identical for practical purposes. This kind of consistency is uncommon for gold-based catalyst systems. See the Wolf et al. article.

This process results in a very uniform product with respect to precious metal concentration per particle and metal nanoparticle size and size distribution. TEM studies have shown that our process can deposit gold in a form including discrete nanoparticles and small clusters or in a more continuous thin film depending on what is desired. In general, it is desired to include gold in nanoparticle/small gold cluster form.

This catalyst preparation method can deposit catalyst metals uniformly on non-uniform or non-homogeneous surfaces. This is not true for the solution state deposition processes wherein solution deposition favors deposition on the surfaces having a charge opposite to the depositing metal ion, leaving the other surfaces uncoated or at best weakly coated.

The PVD process can be used to deposit other metals simultaneously or sequentially or to deposit mixtures of metals by using poly-phasic targets so that catalyst particles can be formed that comprise polyphasic nanoparticles, e.g., nanoparticles comprising atomic mixtures of say M1 and M2 (where M1 and M2 represent different metals), or that have combinations of metal nanoparticles for multi-function catalysts, e.g., nanoparticle mixtures comprising mixtures of discrete M1 particles and discrete M2 particles. In this fashion, catalyst particles can be prepared that can catalyze more than one reaction and these functions can be carried out simultaneously in practice. Thus, a catalyst particle can be prepared that will oxidize CO while at the same time oxidize $NO_x$ efficiently.

This process can efficiently deposit catalytically active metals on a wider range of support media, e.g., fibers or scrims. While fibers can be coated in the solution coating processes, the shear used to pulp and disperse the fibers generally results in dust formation and in inefficient coating due to the abrasion of the fibers during the coating process. The catalytic fibers can be used to produce novel, highly catalytically active felts, fabrics and fiber scrims.

This new process allows the creation of a new family of active metals on carbon and on other oxidatively sensitive substrates. In the processes known in the art that require a heating step to affix and activate the catalyst particles, carbon in the presence of an oxidizing environment cannot withstand the elevated temperatures that are often required. Thus, the carbon particles had to be treated in a reducing atmosphere since they would be attacked by oxygen during this heating step. Such a reducing step may undesirably reduce other catalyst constituents (e.g., as in the case of iron oxide supported on carbon or in porous carbon). In the instant invention, carbon particles and other non-oxide particles can be coated with catalyst nanoparticles and no heating step or post reduction is required. In this manner, high surface area carbon can be rendered catalytic for CO oxidation without losing the adsorptive properties of the porous carbon for the removal of other impurities from a gas steam.

This new process can be used to coat very fine particles of catalyst support so that the fine particles can then be coated onto a second granular phase or can be formed into a porous granule to provide high CO oxidation activity while providing low back pressure during use.

A method of making a heterogeneous catalyst system is provided in one aspect of the present invention. The method comprises a step of physically vapor depositing catalytically active gold onto a nanoporous support medium.

A heterogeneous catalyst system is provided in another aspect of the present invention. The system comprises a nanoporous support medium. The nanoporous support medium includes at least one water soluble salt impregnated onto the support medium. The nanoporous support medium also includes catalytically active gold deposited onto the support medium, wherein the catalytically active gold is deposited at a Penetration Depth Ratio in the range of from about $1 \times 10^{-9}$ to about 0.1.

In another aspect of the present invention a heterogeneous catalyst system is provided that comprises a nanoporous support medium, an alkali metal salt impregnated onto the support medium, and catalytically active gold deposited onto the support medium.

A method of making a catalyst system is also provided in accordance with an aspect of the present invention. The method includes a step of impregnating a water soluble salt onto a catalyst support medium. The method also includes a step of heat treating the impregnated support medium at a temperature greater than about 200° C. Additionally, the method includes a step of physically vapor depositing a catalyst onto the heat treated support medium.

In another aspect of the present invention a method of making a catalyst system is provided. The method comprises a step of physically vapor depositing a catalyst onto a catalyst support medium. The method also includes a step of mixing and comminuting the support medium during at least a portion of the physical vapor deposition.

Also, a heterogeneous catalyst system comprising catalytically active gold deposited onto an activated carbon support medium is provided in another aspect of the present invention.

In yet another aspect of the present invention a method of making a heterogeneous catalyst system is provided. The method includes a step of determining information indicative of the impact that a water soluble salt has upon the catalytic activity of gold that is physically vapor deposited onto a support medium impregnated with the salt. The method also includes a step of using the information to make a catalyst system derived from ingredients comprising the salt, the medium, and gold.

Additionally, in another aspect of the present invention, a method of making a catalyst system is provided. The method includes a step of impregnating a water soluble salt onto a catalyst support medium. The method also includes a step of physically vapor depositing catalytically active gold onto the impregnated support medium.

In a further aspect, the present invention relates to a method of activating a substrate surface is provided. This method includes a step of hydrolyzing a metal alkoxide onto a catalyst support medium. The method includes a step of depositing catalytically active metal onto the activated support surface and includes gold as the active metal and physical vapor deposition as the method of depositing said metal.

In yet a further aspect, the present invention relates to a method of producing an enhanced surface area particle for support of active metal catalysts is disclosed. The method includes incorporating smaller, nanoporous particles (i.e., guest particles) onto a coarser particle (i.e., host particle). The method includes depositing a catalytically active metal onto the enhanced surface area support and includes gold as the active metal and physical vapor deposition as the method of depositing said metal. The ratio of the average particle size of the host particles to the guest particles is desirably in the ratio of 10,000:1 to 10:1.

DETAILED DESCRIPTION

Figure 1:
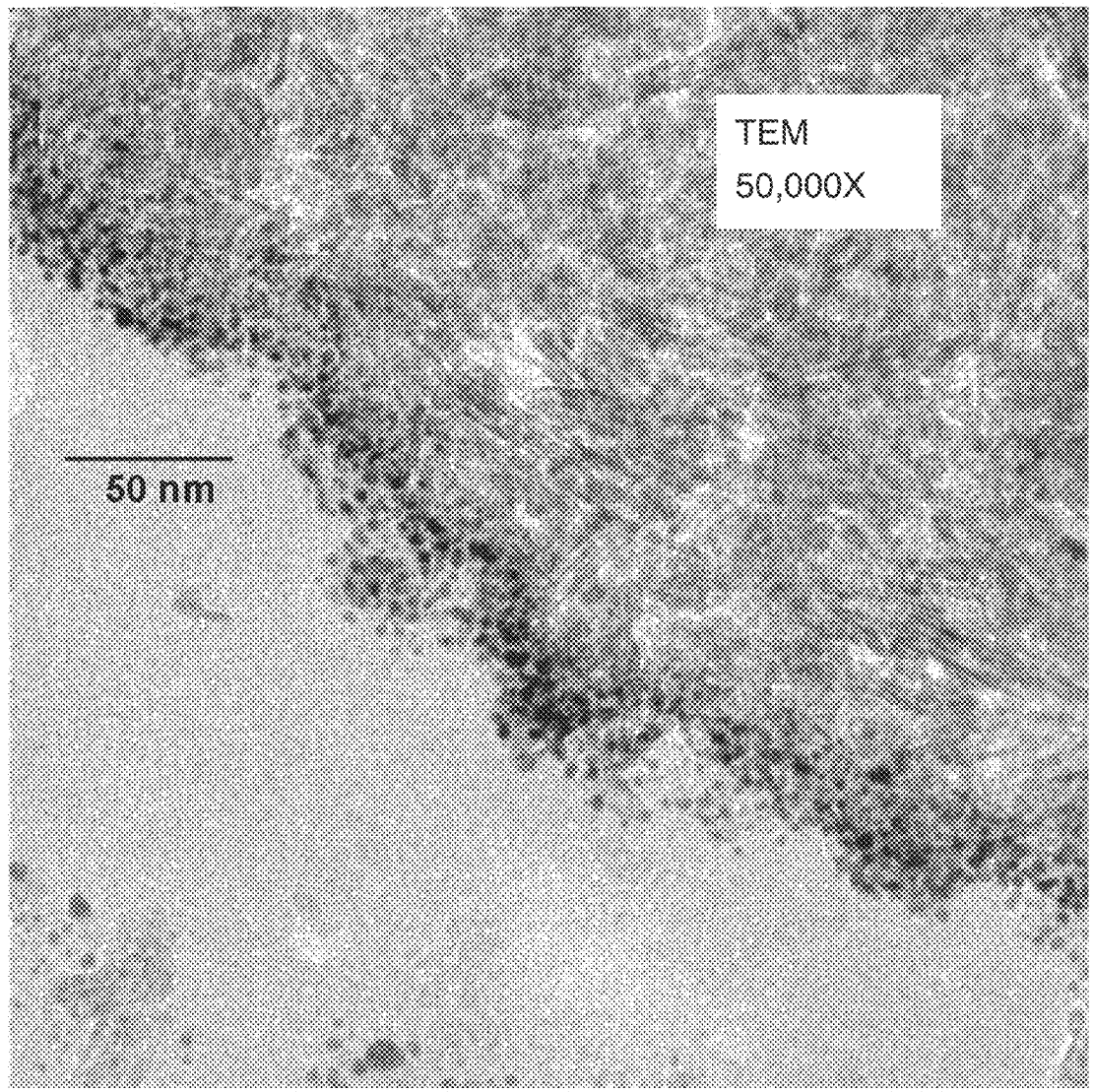
FIG. 1 is a TEM image of a cross-section of a representative catalyst surface of the present invention (material of example 3).

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention. While the present invention will be described in the specific context of gold-based catalyst systems, the principles of the invention are applicable to other catalyst systems as well.

In the practice of the present invention, catalytically active gold is deposited onto the desired support(s) using physical vapor deposition. Physical vapor deposition refers to the physical transfer of gold from a gold-containing source or target to the support. Physical vapor deposition may be viewed as involving atom-by-atom deposition although in actual practice, the gold may be transferred as extremely fine bodies constituting more than one atom per body. Once at the surface, the gold may interact with the surface physically, chemically, ionically, and/or otherwise.

Physical vapor deposition typically occurs under temperature and vacuum conditions in which the gold is very mobile. Consequently, the gold is quite mobile and will tend to migrate on the surface of the substrate until immobilized in some fashion, e.g., by adhering to a site on or very near the support surface. It is believed that sites of adhering can include defects such as surface vacancies, structural discontinuities such as steps and dislocations, interfacial boundaries between phases or crystals or other gold species such as small gold clusters. It is a distinct advantage of the invention that the deposited gold is immobilized effectively in a manner in which the gold retains a high level of catalytic activity. This is contrasted to those conventional methodologies in which the gold accumulates into such large bodies that catalytic activity is unduly compromised or even lost.

There are different approaches for carrying out physical vapor deposition. Representative approaches include sputter deposition, evaporation, and cathodic arc deposition. Any of these or other PVD approaches may be used, although the nature of the PVD technique used can impact catalytic activity. For instance, the energy of the physical vapor deposition technique used can impact the mobility, and hence tendency to accumulate, of the deposited gold. Higher energy tends to correspond to an increased tendency of the gold to accumulate. Increased accumulation, in turn, tends to reduce catalytic activity. Generally, the energy of the depositing species is lowest for evaporation, higher for sputter deposition (which may include some ion content in which a small fraction of the impinging metal species are ionized), and highest for cathodic arc (which may be several tens of percents of ion content). Accordingly, if a particular PVD technique yields deposited gold that is more mobile than might be desired, it may be useful to use a PVD technique of lesser energy instead.

Physical vapor deposition generally is a line of sight/surface coating technique between the gold source and the support. This means that only the exposed, outer surfaces of the support, but not the inner pores well within the substrate, are directly coated. Inner surfaces not in a direct line of sight with the source will tend not to be directly coated with gold. However, we have found by TEM analysis that after deposition on the surface of a porous substrate, the gold atoms can migrate by diffusion or other mechanism some moderate distance into the catalyst surface to provide nano-particles and gold clusters in the substrate pores in the region immediately adjacent to the surface before being immobilized. The average penetration into the porous substrates can be up to 50 nanometers in depth or sometimes greater, such as up to about 70 to about 90 nm in depth. In general though, the penetration depth is less than 50 nm and can be less than 30 nm. The gold penetration is very shallow compared to the typical support size.

The total thickness of the gold, or $C_t$, is equal to the gold penetration depth plus the thickness of the gold that is deposited on the surface of the substrate and that has not penetrated by diffusion. This total thickness is in general less than 50 nm and can often be less than 30 nm or even less than 20 nm. On materials having surface pores whose depth is greater than about 10 nm to 20 nm, the total gold thickness can appear to be greater than 50 nm since the gold layer follows the contours of the surface and the actual surface contour is reflected by the pore structure that it possesses. It is most preferred that the active gold species be collected on the outermost portion of the catalyst particle since this is the surface of the catalyst that interacts most readily with gaseous reactants.

The thickness of the gold shell region relative to the catalyst support particle size is quantified by the formula $$PDR = C_t / UST$$

wherein PDR is the penetration depth ratio, UST is the underlying support thickness or particle size and $C_t$ is the total thickness of the gold, as defined above. The underlying support thickness represents the size of the support as measured perpendicular to the catalyst surface and is usually indicative of particle size. The underlying support thickness may be determined by microscopic methods including optical microscopy or scanning electron microscopy. The value for $C_t$ may be determined by transmission electron microscopy in the case of thin films and high resolution scanning electron microscopy in the case of thicker films. The total thickness $C_t$ is very easily discerned from visual inspection of TEM data. Because of the uniformity by which gold is coated, a single representative TEM picture can be effective to characterize the coating. In practice, a sample may be effectively characterized via examination of a number of TEM pictures of catalyst surface cross-sections (vida infra). In preferred embodiments, PDR is in the range of from about $1 \times 10^{-9}$ to 0.1, preferably $1 \times 10^{-6}$ to $1 \times 10^{-4}$, indicating that the gold shell region is very thin indeed relative to total support thickness. As noted above, this generally corresponds to a penetration depth on the order of up to about 50 nm, preferably about 30 nm on preferred supports.

Characterization of the surface region and the gold bodies is accomplished using transmission electron microscopy as is well-known in the catalyst art. One method suitable for characterizing the catalytic surfaces is as follows: the catalyst particles are embedded in 3M Scotchcast™ Electrical Resin #5 (epoxy; 3M Company, St. Paul, Minn.) in disposable embedding capsules; resin is allowed to cure at room temperature for 24 hours.

For each sample, a random, embedded granule is trimmed (with a stainless steel razor blade previously cleaned with isopropyl alcohol) down to the middle surface region of the granule such that most of the granule is cut away on one side, leaving epoxy on the on the other side. A small trapezoid-shaped face (less than a half millimeter on a side) is selected and trimmed such that the epoxy/granule interface is left intact. The long direction of this interface is also the cutting direction. A Leica Ultracut UCT microtome (Leica Microsystems Inc., Bannockburn, Il) is used to cross-section the face. The face is first aligned such that the granule surface was perpendicular to the knife edge. Sections approximately 70 nm thick are cut at a speed of 0.08 mm/second. These sections are separated by floating onto deionized water and collected using a microtomy hair tool and picked up using a "Perfect Loop" (loop distributed by Electron Microscopy Sciences, Fort Washington, Pa.). Samples are transferred via this loop to a 3 mm diameter, 300 mesh copper TEM grid with carbon/formvar lacey substrate. The regions of interest (intact, cleanly cut specimens showing the interfacial region) that lie over the holes in the substrate are imaged and analyzed.

Images are taken at various magnifications (50,000× and 100,000×) in a Hitachi H-9000 transmission electron microscope (TEM; Hitachi High Technologies America, Pleasanton, Ca) at 300 KV accelerating voltage using a Gatan CCD camera (Gatan Inc., Warrenton, Pa.) and Digital Micrograph software. Representative regions (regions selected wherein the interface of the catalytic surface is clearly examined in a fashion perpendicular to the surface of the sample) are imaged. Calibrated markers and sample identifications are placed on each image. Numerous (>10) interfacial regions are examined.

An example of a TEM image of a cross-section of a representative catalyst surface of the present invention (material of example 3) is shown in FIG. 1. The gold nanoparticles can be seen to be both on the surface of the support and in the sub-surface region of the support. The region containing the gold nanoparticles is very thin and the gold deposition can be seen to follow the contours of the surface of the support.

As a consequence of line of sight coating, the resultant catalytically active material of the invention from one perspective may be viewed as nanoporous catalytic supports having relatively thin shells of discontinuous, catalytic gold on and proximal to their outer surfaces. That is, a resultant catalytically active material comprises a gold-rich shell region proximal to the surface and an interior region comprising negligible gold. In preferred embodiments, this gold-rich shell region comprises small (generally less than 10 nm, most preferably less than 5 nm), discrete gold bodies.

The inventive approach of forming a catalytically active shell region only on the surface of a nanoporous support is contrary to conventional wisdom when developing new catalytic material, and, therefore, the fact that the resultant material is so catalytically active is quite surprising. Specifically, the present invention puts catalytic functionality only near the surface of a highly porous support. Interior porosity is purposely unused. From a conventional perspective, it seems pointless to underutilize a nanoporous support in this manner. Knowing that catalytically active metal is to be deposited only at the support surface, the conventional bias might have been to use a nonporous substrate when depositing catalytically active gold onto a support. This is especially the case when PVD is not able to access the interior of the porous support in any event. The present invention overcomes this bias through the combined appreciation that (1) gold mobility is highly restricted on the surface of nanoporous supports, and (2) gold is still catalytically active even at very low weight loadings resulting from the surface coating approach. Consequently, using such supports is highly and uniquely beneficial in the context of depositing gold onto the surface region of a nanoporous support even though full catalytic capacity of the support is not utilized.

Generally, physical vapor deposition preferably is performed while the support to be treated is being well-mixed (e.g., tumbled, fluidized, or the like) to help ensure that particle surfaces are adequately treated. Methods of tumbling particles for deposition by PVD are summarized in U.S. Pat. No. 4,618,525. For methods specifically directed at catalysts see Wise: "High Dispersion Platinum Catalyst by RF Sputtering," Journal of Catalysis, Vol. 83, pages 477-479 (1983) and Cairns et al U.S. Pat. No. 4,046,712. More preferably, the support is both tumbled or otherwise fluidized as well as comminuted (e.g., ground or milled to some degree) during at least a portion of the PVD process. This provides a degree of mechanical abrasion of the surface of the particles and generation of some fines during gold deposition. Our data suggests that catalytic performance is enhanced when deposition is carried out with comminution. It is our belief that these processes, i.e., the generation of fines and the mechanical interaction of the grits with each other, increases the activity of the resulting catalyst materials. While not wishing to be bound by theory, we believe that the fines provide higher surface area for higher activity. Fresh surface areas of the support are also exposed, and this might also enhance performance.

The impact of such comminution upon the resultant surface characteristics of the catalyst system were studied via TEM analysis. In the case of the gold on carbon containing the activating agents of the present invention, the TEMs reveal the presence of a unique, two phase structure believed to comprise nanoparticles and clusters of gold and carbonaceous material on the surface of the gold-coated particles. It is possible that the mechanical action gives rise to this unique structure as carbonaceous material from one granule is transferred onto the gold-coated surface of another granule by rubbing. This nano-composite of gold/activation agent and carbon seems to possess a very high activity for catalysis of CO oxidation.

Figure 2:
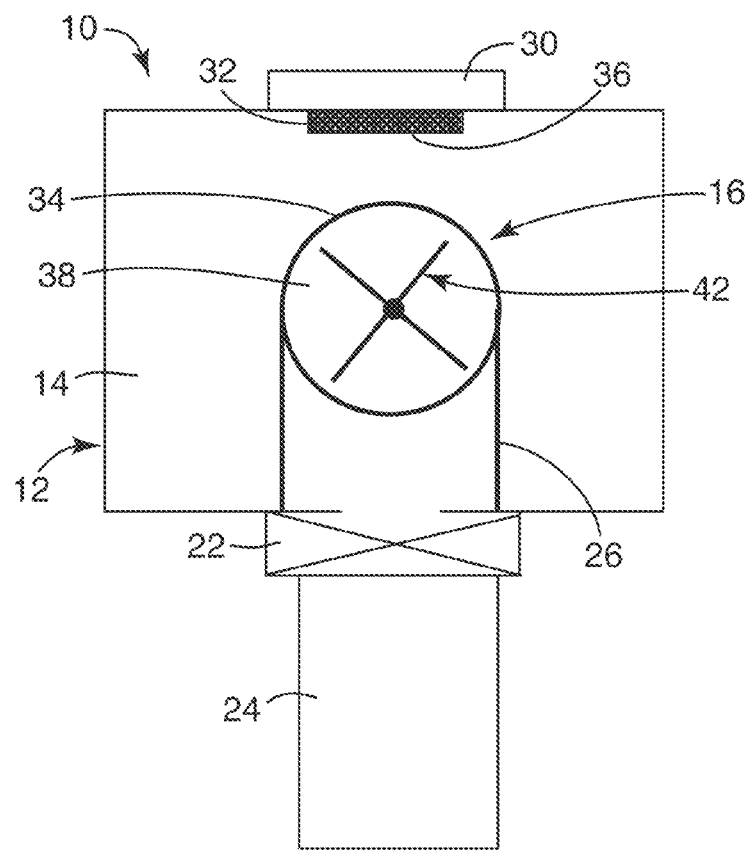
FIG. 2 is a schematic side view of an apparatus for carrying out a PVD process for depositing catalytically active gold onto a support.
Figure 3:
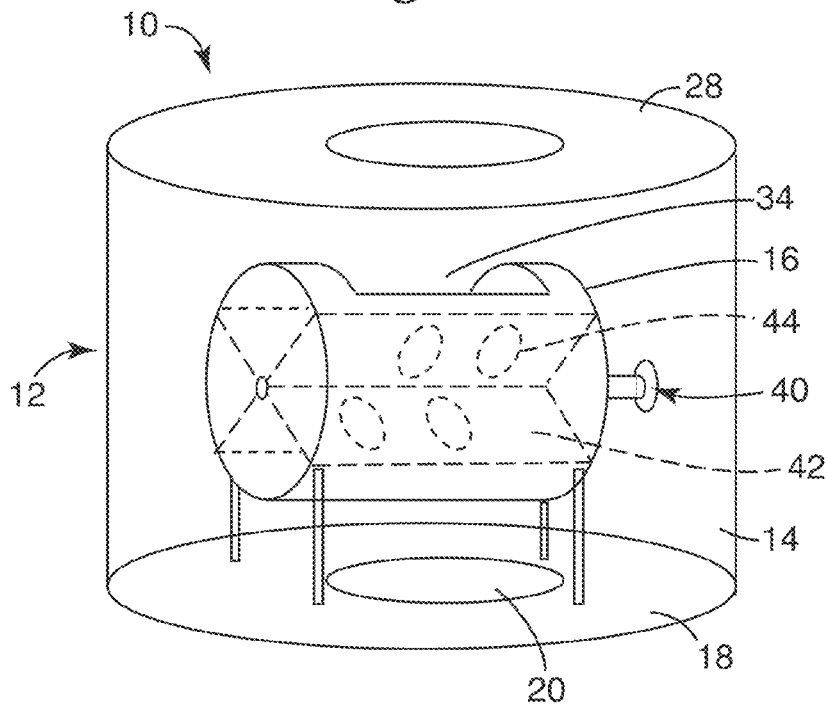
FIG. 3 is a schematic perspective view of the apparatus of FIG. 2.

An apparatus 10 for carrying out the preferred PVD process is shown in FIGS. 2 and 3. The apparatus 10 includes a housing 12 defining a vacuum chamber 14 containing a particle agitator 16. The housing 12, which may be made from an aluminum alloy if desired, is a vertically oriented hollow cylinder (45 cm high and 50 cm in diameter). The base 18 contains a port 20 for a high vacuum gate valve 22 followed by a six-inch diffusion pump 24 as well as a support 26 for the particle agitator 16. The chamber 14 is capable of being evacuated to background pressures in the range of $10^{-6}$ torr.

The top of the housing 12 includes a demountable, rubber L-gasket sealed plate 28 that is fitted with an external mount three-inch diameter dc magnetron sputter deposition source 30 (a US Gun II, US, INC., San Jose, Calif.). Into the source 30 is fastened a gold sputter target 32 (7.6 cm (3.0 inch) diameter×0.48 cm (3/16 inch) thick). The sputter source 30 is powered by an MDX-10 Magnetron Drive (Advanced Energy Industries, Inc, Fort Collins, CO) fitted with an arc suppressing Sparc-le 20 (Advanced Energy Industries, Inc, Fort Collins, CO).

The particle agitator 16 is a hollow cylinder (12 cm long× 9.5 cm diameter horizontal) with a rectangular opening 34 (6.5 cm×7.5 cm) in the top 36. The opening 34 is positioned 7 cm directly below the surface 36 of the gold sputter target 32 so that sputtered gold atoms can enter the agitator volume 38. The agitator 16 is fitted with a shaft 40 aligned with its axis. The shaft 40 has a rectangular cross section (1 cm×1 cm) to which are bolted four rectangular blades 42 which form an agitation mechanism or paddle wheel for the support particles being tumbled. The blades 42 each contain two holes 44 (2 cm diameter) to promote communication between the particle volumes contained in each of the four quadrants formed by the blades 42 and agitator cylinder 16. The dimensions of the blades 42 are selected to give side and end gap distances of either 2.7 mm or 1.7 mm with the agitator walls 48. Preferred modes of use of this apparatus are described below in the examples.

The gap spacing between the agitator 16 and the walls of the housing 12 affects the performance of the resulting catalyst. As the gap is made smaller, the support particles will have a greater tendency to be ground to some degree. Since such grinding is believed to be beneficial, the gap is set at a suitable distance to ensure that grinding occurs. In one preferred mode the gap was set at about the diameter of the support particles to be coated.

Physical vapor deposition may be carried out at any desired temperature(s) over a very wide range. However, the deposited gold may be more catalytically active if the gold is deposited at relatively low temperatures, e.g., at a temperature below about 150° C., preferably below about 50° C., more preferably at ambient temperature (e.g., about 20° C. to about 27° C.) or less. Operating under ambient conditions is preferred as being effective and economical since no heating or chilling requirements are involved during the deposition While not wishing to be bound by theory, it is believed that the deposition at lower temperatures yields more catalytically active gold for at least two reasons. First lower temperatures yield gold with more defects in terms of geometrical size and/or shape (angularities, kinks, steps, etc.). Such defects are believed to play a role in many catalytic processes (see Z. P. Liu and P. Hu, *J. Am. Chem. Soc.*, 2003, 125, 1958). On the other hand, deposition at higher temperatures tends to yield gold that has a more organized and defect-free crystal structure and hence is less active. Additionally, deposition temperature can also impact gold mobility. Gold tends to be more mobile at higher temperatures and hence more likely to accumulate and lose catalytic activity.

The present invention provides catalytically active gold on the desired support(s) to form heterogeneous catalytic systems of the present invention. Gold is widely known as a noble, relatively inert metal with a yellowish color. However, the characteristics of gold change dramatically in nanoscale regimes, where gold becomes highly catalytically active. The high reactivity of gold catalyst in comparison with other metal catalysts is illustrated by reactions such as oxidation of CO under ambient conditions and reduction of NO, as well as epoxidation and hydrochlorination of unsaturated hydrocarbons.

In preferred embodiments, catalytically active gold may be identified by one or more requisite characteristics including size, color, and/or electrical characteristics. Generally, if a gold sample has one or more of these requisite characteristics, and preferably two or more of these characteristics, it will be deemed to be catalytically active in the practice of the present invention. Nanoscale size is a key requisite associated with catalytically active gold in that the catalytic activity of gold to a large degree is a function of whether the gold sample has a thickness dimension in the nanoscale regime (e.g., particle diameter, fiber diameter, film thickness, or the like). Bodies (also referred to as clusters in the literature) having smaller dimensions tend to be more catalytically active. As size increases, catalytic characteristics fall off rapidly. Accordingly, preferred embodiments of catalytically active gold may have a nanoscale size over a wide range, with smaller sizes more preferred when higher activity is desired. As general guidelines, catalytically active gold has particle or cluster dimensions in the range of from about 0.5 nm to about 50 nm, preferably about 1 nm to about 10 nm. Preferably, the gold has a size of no more than about 2 nm to about 5 nm in any dimension. The technical literature reports that catalytic activity may be a maximum at sizes in the range of from about 2 nm to about 3 nm. The size of the individual gold nanoparticles can be determined by TEM analysis as is well known in the art and as is described herein.

In terms of color, gold in larger scale size regimes has a yellowish color. However, in the nanoscale size regimes in which gold is catalytically active, the color of gold becomes a reddish pink when viewed under white light, although very small clusters of gold and gold surface species can be colorless. Such colorless species can be quite catalytic, and the presence of such colorless species is usually accompanied by some colored nanoparticles of gold. Consequently, determining if the color of a gold sample includes a noticeable reddish pink component and/or is colorless indicates that it is possible that the sample is catalytically active.

The amount of catalytically active gold provided on a support can vary over a wide range. However, from a practical perspective, it is helpful to consider and balance a number of factors when choosing a desired weight loading. For instance, catalytically active gold is highly active when provided on nanoporous supports in accordance with the practice of the present invention. Thus, only very low weight loadings are needed to achieve good catalytic performance. This is fortunate, because gold is expensive. For economic reasons, therefore, it would be desirable not to use more gold than is reasonably needed to achieve the desired degree of catalytic activity. Additionally, because nanoscale gold is highly mobile when deposited using PVD, catalytic activity may be compromised if too much gold is used due to accumulation of the gold into large bodies. With such factors in mind, and as general guidelines, the weight loading of gold on the support preferably is in the range of 0.005 to 10 weight %, preferably 0.005 to 2 weight %, and most preferably from 0.005 to 1.5 weight % based upon the total weight of the support and the gold.

Depositing catalytically active gold onto a support is very compatible with PVD techniques. Gold naturally sputters to form catalytically active, nanoscale particles and clusters onto the nanoporous support surface. It is believed that the gold is deposited mainly in elemental form, although other oxidation states may be present. Although gold is mobile and will tend to accumulate in low energy sites of the surface, the nanoporous characteristics of the support and the preferred use of activating agents in the practice of the present invention help to immobilize the gold, helping to keep the deposited gold clusters isolated and preferably discontinuous, This helps to preserve catalytic activity that might be otherwise compromised if the gold were to accumulate into larger sized bodies. As an alternative, very thin, gold films of nanoscale thickness may also be formed over some or all of the support surface if desired, keeping in mind that catalytic activity decreases with increasing film thickness. Even though such films may be formed with catalytic activity, discontinuous, isolated gold clusters tend to be much more catalytically active and are preferred in most applications.

Optionally, the heterogeneous catalyst system may be thermally treated after gold deposition if desired. Some conventional methods may require such thermal treatment in order to render the gold catalytically active. However, gold deposited in accordance with the present invention is highly active as deposited without any need for a thermal treatment. Indeed, such gold can very effectively catalytically oxidize CO to form $CO_2$ at room temperature or even much cooler. Additionally, depending upon factors such as the nature of the support, the activating agents, the amount of gold, or the like, catalytic activity can be compromised to some degree if thermally treated at too high a temperature. Indeed, for some modes of practice in which the heterogeneous catalyst system is intended to be used in a heated environment, e.g., an environment having a temperature higher than about 200° C., the catalytic activity of the system should be confirmed at those temperatures. Embodiments of the invention that perform catalytically well for CO oxidation in such high temperature regimes are described below in the examples. These include systems in which the support includes one or more of alumina, titania, silica, and/or the like.

It is also believed that low-coordination gold in catalytic nanoparticles is beneficial. Low coordination gold refers to $Au_n$ for which n on average is in the range of 1 to 100, preferably about 2 to 20. Without wishing to be bound by theory, we propose that the catalytic activity of the very small clusters of gold is associated at least to some degree with low-coordination defects, and that these defects are able to provide sites for storing charges which may be transferred from underlying supports and/or other sources. Accordingly, with such defects and mechanism in mind, it is preferred that heterogeneous catalysts of the invention include one or more of the following features: (a) The gold and hence the defects are located mainly on the surface of the underlying support; (b) The average value for n is greater than about 2, and (c) As much as is practically possible, gold clusters are isolated but nonetheless close to each other (within a distance of about 1-2 nm or less). (d). While such features may be associated with smaller sized gold clusters, it is possible that such characteristics may be found mainly at steps or edges of larger clusters.

In addition to gold, one or more other catalysts could also be provided on the same supports and/or on other supports intermixed with the gold-containing supports. Examples include one or more of silver, palladium, platinum, rhodium, ruthenium, osmium, copper, iridium, or the like. If used, these may be co-deposited onto the support from a target source that is the same or different than the gold source target. Alternatively, such catalysts may be provided on the support either before or after the gold. Other catalysts requiring a thermal treatment for activation advantageously may be applied onto the support and heat treated before the gold is deposited. In certain cases catalysts such as Rh, Pd and Pt can be deposited according to the present invention and utilized as catalysts without the presence of gold.

In the practice of the present invention, catalytically active gold is deposited onto one or more nanoporous supports to thereby form a heterogeneous catalyst system. Nanopores can be observed and nanopore size can be measured via transmission electron microscopy. The nanoporous nature of a support may also be characterized by a technique such as described in ASTM Standard Practice D 4641-94 in which nitrogen desorption isotherms are used to calculate the pore size distribution of catalysts and catalyst supports in the range from about 1.5 to 100 nm. Nanoporous means that the total nanoporous capacity for pores in the size range of 1 to 10 nm is greater than 20% (i.e., greater than about 0.20 using the formula below) of the total pore volume of the support material in the range from 1 to 100 nm as calculated using the following formula with data obtained from ASTM D4641-94, the entirety of which is incorporated herein by reference:

$$NPC = \frac{CPv_1 - CPv_{10}}{CPv_1 - CPv_{100}}$$

NPC—Nanoporous Capacity $CPv_n$—Cumulative Pore Volume at Pore Radius '$n$' $(MM^3/G) \times 10^{-3}$ $n$—Pore Radius (in nanometers)

The nanoporous characteristic of the support helps to immobilize gold clusters on the support surface. This stabilization of the very small gold particles and clusters is evidenced by both the direct observation of smaller particles of gold in TEM studies of materials possessing nanoporous surfaces and in higher catalytic activity as measured by the ability of the catalyst to convert CO to $CO_2$ in the presence of air.

The nanoporous characteristic of the support helps to immobilize gold clusters on the support surface. This stabilization of the very small gold particles and clusters is evidenced by both the direct observation of smaller particles of gold in TEM studies of materials possessing nanoporous surfaces and in higher catalytic activity as measured by the ability of the catalyst to convert CO to $CO_2$ in the presence of air. Advantageously, gold is also readily deposited onto nonporous supports using PVD in a catalytically active state without requiring additional thermal or other treatment for activation. In addition to nanoporosity, the substrate particles optionally may further have microporous, mesoporous, and/or macroporous characteristics as such are defined in applicable provisions of IUPAC Compendium of Chemical Technology, 2d edition (1997). A typical population of activated carbon or alumina support particles will tend to include a combination of nanoporous, microporous, mesoporous, and macroporous properties.

It is important to note that the support materials only need be nanoporous in the exterior surface region of the support at a depth equal to or greater than the penetration depth of the gold atoms in the present invention. Thus, the present invention includes methods whereby normally low surface area, non-nanoporous materials can be made to possess exterior surfaces characterized by nanoporosity. These methods include adsorption of nanoporous materials such as gels and nanoparticle size colloids on the surface of a material to form the nanoporous material; hydrolysis of metal alkoxides or metal salts on the surface of a material to form the nanoporous materials; and oxidation of a thin coating of metal, e.g., aluminum, titanium, tin, antimony or the like, on the surface of a material to form a nanoporous material. In the latter case, the thin metal films can be deposited by physical vapor methods and the oxidation can be carried out by dry or moist air to produce a nanoparticle film on the substrate.

In the case of hydrolysis of metal alkoxides, as exemplified herein, hydrolysis with gas phase water is generally more effective in producing activating nanoporous films than hydrolyzing with liquid phase water or water solutions.

The support(s) may be used in various shapes or combinations such as, for example, powder, particle, pellet, granule, extrudate, fiber, shell, honeycomb, plate, or the like. The particles can be regular in shape, irregular, dendritic, dendrite-free, or the like. Preferred supports are particulate in nature or powders.

A particularly preferred support is prepared by adsorbing or adhering fine (less than 100 micrometers, preferably less than 50 micrometers and most preferably less than 10 micrometer) nanoporous particles on coarser (greater than 30 mesh) particles. This small-particle-supported-on-a-larger-particle composite structure provides dramatically higher total exterior surface area while retaining the desirable gas passing characteristics, i.e., low pressure drop, of a coarser particle. In addition, by using nanoporous, smaller particles in constructing these composite particles, inexpensive, non-nanoporous, coarser particles can be used. Thus, very inexpensive, highly active catalyst particles can be prepared since the bulk of the volume of a catalyst bed is taken up by the inexpensive, underlying, coarser particles. Examples of nanoporous small particles that can be used in this fashion include sol-gel-derived small particles, nanoporous, fine particle size zeolites, and high surface area aerogel particles.

In constructing the composite support particles, the small particles can be adhered to the larger particles using partially hydrolyzed alkoxide solutions, basic metal salt solutions, or nanoparticle sized colloidal metal oxides and oxy-hydroxides as an adhesion agent. Partially hydrolyzed alkoxide solutions are prepared as is well known in the sol-gel art. Useful metal alkoxides include alkoxides of titanium, aluminum, silicon, tin, vanadium and admixtures of these alkoxides. Basic metal salts include nitrate and carboxylate salts of titanium and aluminum. Nanoparticle size colloidal materials include colloids of oxides and oxy-hydroxides of aluminum, titanium and oxides of silicon, tin, and vanadium. The adhesion agent is present in solution and generally is included at an amount of 2 to about 50 oxide weight percent of the nanoporous small particle size material to be adhered.

To construct the composite support particles one of two preferred methods may be generally used. In one method, the nanoporous, small particle size material is admixed with the selected adhesion agent in solution and then this mixture is combined with the coarser particles. If the coarser particle is porous, the small particle-adhesion agent solution mixture can be introduced by incipient wetting of the porous larger particle. If the larger particle is not porous, the small particle-adhesion agent solution mixture can be admixed with the coarser particles and the solution liquid can be removed either concurrent with the mixing or subsequent to the mixing. In either case, after combining the nanoporous, small particle size material, the adhesion agent and the coarser particles and removing the liquid from the solution, the mixture is dried and calcined to provide a composite particle having the smaller, nanoporous particles adhered on the surface of a coarser particle. The calcining temperature is selected to be below the temperature at which the nanoporous particles lose porosity. Generally the calcining temperature will be in the range of 200° C. to 800° C.

Particulate embodiments of support media may have any of a wide range of sizes. Support particle size generally may be expressed in terms of a mesh size. A typical expression for mesh size is given by "a×b", wherein "a" refers to a mesh density through which substantially all of the particles would fall through, and "b" refers to a mesh density that is sufficiently high so as to retain substantially all of the particles. For example, a mesh size of 12×30 means that substantially all of the particles would fall through a mesh having a mesh density of 12 wires per inch, and substantially all of the particles would be retained by a mesh density having a density of 30 wires per inch. Support particles characterized by a mesh size of 12×30 would include a population of particles having a diameter in the range from about 0.5 mm to about 1.5 mm.

Selecting an appropriate mesh size for the substrate particles involves balancing density and catalytic rate against air flow resistance. Generally, a finer mesh size (i.e., smaller particles) tends to provide not only greater catalytic rate and filter capacity, but also higher air flow resistance. Balancing these concerns, "a" is typically in the range of 8 to 12 and "b" is typically 20 to about 40 with the proviso that the difference between a and b is generally in the range from about 8 to about 30. Specific mesh sizes found to be suitable in the practice of the present invention include 12×20, 12×30, and 12×40.

In addition to nanoporosity, support media of the present invention preferably further include one or more additional characteristics. For instance, preferred embodiments of the support media are characterized by multiphasic, e.g., biphasic, surfaces. Multiphasic means that the surface has more than one phase. Our data shows that catalytic activity is enhanced when gold is deposited onto a multiphasic surface. While not wishing to be bound, it is believed that the resultant phase boundaries on the surface appear to help stabilize gold. TEM studies as described herein and as is well known in the art can be used to assess whether a surface is biphasic. It is believed that these phase boundaries are very finely dispersed at the nanoscale, helping to make the boundaries effective for immobilizing gold.

Multiphasic characteristics may be provided by treatment of a support with one or more activating agents. As one example, $Ba(NO_3)_2$ is one type of activating agent that may be added to a support prior to gold deposition via solution impregnation followed up with a calcining treatment. Consider an embodiment in which barium nitrate is used as an activating agent for a gamma alumina support. When the resultant materials are investigated using X-ray diffraction, an isolated barium phase is not detected. While not wishing to be bound, it is believed that the barium has reacted onto the alumina support surface, thus modifying the surface. Consequently, it is believed that the surface has aluminum rich regions constituting one phase and a barium rich region constituting another phase. Each phase has different properties and different affinity to gold. Hence, the phase boundaries, in one belief, function in a manner analogous to fencing to prevent migration and accumulation of gold. Activating agents are described further below.

A wide variety of materials may serve as suitable supports in the practice of the present invention. Representative examples include carbonaceous materials, siliceous materials (such as silica), metal compounds such as metal oxides or sulfides, combinations of these, and the like. Representative metal oxides (or sulfides) include oxides (or sulfides) of one or more of magnesium, aluminum, titanium, vanadium, chromium, manganese, iron, cobalt, nickel, copper, zinc, gallium, germanium, strontium, yttrium, zirconium, niobium, molybdenum, technetium, ruthenium, rhodium, palladium, silver, cadmium, indium, iron, tin, antimony, barium, lanthanum, hafnium, thallium, tungsten, rhenium, osmium, iridium, and platinum.

Examples of carbonaceous substances include activated carbon and graphite. Suitable activated carbon particles may be derived from a wide variety of source(s) including coal, coconut, peat, any activated carbon(s) from any source(s), combinations of at least two of these, and/or the like.

Preferred embodiments of support media may be selected from aluminous oxides, titania, titania-alumina, activated carbon, binary oxides such as hopcalite ($CuMnO_2$), molecular sieves, and/or the like. Of these, alumina, titania and activated carbon are particularly preferred support materials. Activated carbon, titania and alumina are found in forms characterized by nanoporosity and therefore, these forms are preferred support materials. Activated carbon is advantageous because in addition to providing a support for catalytic activity, the carbon also functions as an absorbent for noxious gases. Activated alumina also is a preferred support material, as it is very robust to aging and heat. Heterogeneous catalyst systems are advantageously made from ingredients comprising an alumina support when the catalyst system will be used at elevated temperature and/or where longer service life is desired.

Heterogeneous catalyst systems of the present invention optionally may incorporate one or more activating agents to enhance catalytic performance of the system. As used herein, an activating agent generally refers to any ingredient that is generally not catalytic by itself yet can enhance the performance of a catalyst when both the activating agent(s) and the catalyst are incorporated into the system.

One preferred class of activating agents of the present invention includes one or more metal salts. Clearly, the use of such a metal salt enhances catalytic performance, but the exact mechanism by which performance is enhanced is not known for certain. Without wishing to be bound, it is believed that the metal cation reacts with the surface of the support in a manner that helps to immobilize gold (e.g., by providing a multiphasic surface) and/or that the metal cation functions as an electron acceptor or participates in some fashion in the catalytic reaction sequence.

Examples of metal salts include salts of the alkali or alkaline earth metals such as lithium, sodium, magnesium, calcium, and/or barium. Other metals include Cs, Ru, and the like. Combinations of any of these metal salts may be used. In some embodiments, the activating agent comprises at least one alkali metal salt and at least one alkaline earth metal salt, wherein the weight ratio of the alkali metal salt to the alkaline earth metal salt is in the range of about 1:19 to about 19:1, preferably about 1:3 to about 3:1. For instance, the catalytic performance of a system comprising a potassium salt and a barium salt on a nanoporous alumina support with gold catalyst is astounding as shown in the examples below. Briefly, this system catalytically oxidized nearly all CO in a test stream containing 1500 ppm CO at ambient temperature for a sustained period of time.

The metal salts can include any suitable counter anion(s). Examples include nitrate, hydroxide, acetate, carbonate, combinations of these, and the like. Carbonate is an especially preferred anion as it appears independently to have activating characteristics. Carbonate is even more effective when used in combination with an alkali metal or alkaline earth metal. Accordingly, preferred activating agents of the invention comprise a carbonate salt, and more preferably an alkali metal carbonate salt or an alkaline earth metal carbonate salt.

Potassium carbonate is very effective, for example, especially when used on activated carbon with a gold catalyst, but it is also effective in systems with other types of supports, e.g., alumina, as well. The fact that potassium carbonate activates a carbon-gold system is quite surprising. Firstly, depositing gold onto $K_2CO_3$ in the absence of the carbon or other nanoporous support provides a system with very low, if any, catalytic activity. Further, depositing gold on activated carbon in the absence of the $K_2CO_3$ also provides a system with very low, if any, catalytic activity. Yet, when the three ingredients are combined, a very effective catalyst system results as shown by the examples below. Indeed, discovering such a simple and effective way to make activated carbon as a support for catalytically active gold is a significant accomplishment. The benefits of the carbonate is highlighted by data showing that potassium sulfate is a poor activating agent, although it is believed that its performance would improve if a support impregnated with potassium sulfate were to be thermally treated prior to gold deposition.

Yet, potassium carbonate and many of the other salts mentioned herein are very soluble in aqueous solution. Depositing the gold onto the substrate via PVD allows systems containing both gold and such activating materials to be easily made. Water soluble activators such as $K_2CO_3$ cannot be used with conventional aqueous impregnation or precipitation methods. This is because they would dissolve in and be washed from the support medium by the water solvents.

Another advantageous class of activating agents includes alkoxide materials, especially those described above with respect to forming nanoporous surface features on less porous host particles. Preferred alkoxides include alkoxides of Ti and Al. Alkoxide materials are advantageously used in combination with one or more of the water soluble salt materials described above. When the two kinds of materials are used together, they can be impregnated onto the support at the same time or sequentially in any order, although it is preferred that the alkoxide material(s) be impregnated onto the support after the impregnation of the salt(s). In a representative process, the water soluble salt is impregnated onto the support, and the support is then dried and optionally calcined. Next, the alkoxide is impregnated onto the support, the product is hydrolyzed, dried, and optionally calcined. Thus, prepared, gold is then deposited onto the activated support.

Use of an alkoxide as an impregnant/activating agent appears to change the crystalline structure of the support in our TEM studies. Specifically, the grain structure of the support proximal to the support surface appears to be much finer than the core region and much finer than otherwise identical systems prepared without the alkoxide. The structure modification penetrates in most instances further into the support than the gold, e.g., 50 nm or more. In some instances, the boundary between the modified surface region and the unmodified core region is easily observed.

Not all alkoxides may work in all conditions. For example, Ti and Al alkoxides were found to enhance catalytic performance when incorporated into catalyst systems as shown in the examples. However, substituting a Zr-based alkoxide into these formulations did not demonstrate any enhancement in the ability of the system to oxidize CO.

In a similar fashion, some water soluble salt activating agents, particularly sulfates, oxalates, and phosphates, did not demonstrate activating performance in some of our studies, although it is believed that calcining the impregnated support could improve performance of at least the sulfates and oxalates. While not wishing to be bound, it is believed that these kinds of anions, which tend to be coordinating, impact support surface charges in a manner that impairs the ability of the surface to immobilize gold. Yet, sulfate and oxalate anions are readily decomposed at reasonable calcining temperatures, which may explain why we believe that calcining would enhance the activating characteristics of these materials.

Iron salts also are poor candidates for use as the only activating agent when PVD techniques are used to deposit gold. This is unexpected, inasmuch as iron salts are effective activators when gold is impregnated onto particles via solution processing. This shows that ingredients that readily work in one context, e.g., solution processing, may not work the same in another context, e.g., PVD processing.

Likewise, not all porous supports are readily activated under the same conditions that work with other support media. For instance, certain zeolites, e.g., sodium Y zeolites form poor support media when processed in ways that are effective for alumina, carbon, silica, hopcalite, etc. Even when activated with a salt, low or no catalytic activity for CO oxidation was observed when procedures that worked for alumina were applied to zeolite media. Zeolites are known to have more ordered structures and to not possess the defects of other oxides. Silicalite, the aluminum-free form of ZSM-5-type zeolite, was found to work well in the present invention. Thus, for certain zeolite materials to be used as support media, they are preferably surface treated in some fashion to enhance the ability of the surface to immobilize gold.

The amount of activating agent used in the heterogeneous catalyst system can vary over a wide range and will depend upon a variety of factors including the nature of the activating agent, the amount of gold to be incorporated into the system, the nature of the support, and the like. Generally, if too little activating agent is used, the potential benefits of using the activating agent may not be fully attained. On the other hand, beyond some point, using additional activating agent may not provide significant additional benefit and may undermine catalytic performance to some degree. Accordingly, as suggested guidelines, representative embodiments of the invention may include from 0.25 to 15, preferably 1 to 5 weight percent of activating agent based upon the total weight of activating agent and the support. When one or more water soluble salts and one or more alkoxide materials are used in combination, the molar ratio of the salt(s) to alkoxide(s) ingredient(s) is in the range of 1:100 to 100:1, preferably 1:5 to 5:1.

The activating agent may be incorporated into the heterogeneous catalyst system in a variety of different ways. In some instances, the support to be used may inherently include a suitable activating agent. For example, activated carbon derived from coconut shell naturally includes potassium carbonate as a constituent. This kind of activated carbon provides an excellent support for gold catalyst without requiring additional activating ingredients.

We have demonstrated the benefit of using activated carbon from coconut husk as well as the benefit of using potassium carbonate as an activating agent. Kuraray GC carbon and Kuraray GG carbon are both derived from coconut shells. Kuraray GG carbon is the natural, resultant carbon that includes potassium carbonate. Kuraray GC carbon is similar except that it has been acid washed and then extensively rinsed with water to remove the potassium carbonate and other acid and water soluble constituents. When gold is deposited onto these two carbons using PVD, the system derived from Kuraray GG carbon (includes the potassium carbonate) is a very good catalyst for CO oxidation, especially under more humid conditions. On the other hand, the system derived from Kuraray GC carbon (essentially no potassium carbonate) has low activity for CO oxidation in dry or humid environments. Further, if the Kuraray GG carbon is washed to remove the potassium salt, catalytic functionality of the resultant system is significantly compromised. Catalytic activity can be recovered again if the washed Kuraray GG carbon is impregnated with an activating agent prior to gold deposition, especially if the impregnated carbon is thermally treated (described further below) prior to gold deposition.

TEM (transition electron micrograph) examination of the gold deposited on Kuraray GG carbon particles by physical vapor deposition showed the presence of nanoparticles and protodots both on the immediate surface of the support and in pores immediately adjacent to the support surface. As could be seen in the transition electron micrograph, the gold was present in both nanoparticle and in very small cluster forms. The gold particles formed preferentially in small grooves and fissure-like pores in the carbon as evidenced by the orientation of the gold particles in linear, necklace-like patterns on the surface of the carbon. The dark field image of the same region showed the gold-enriched striations clearly. The uniformity of the gold deposition could be clearly seen on the TEM images. The gold clusters that were observed by TEM were as small as 1 nm or less and as large as about 5 nm. The gold rich gold grooves or striations were as wide as about 7 nm and as long as about 50 to 100 nm. There were also gold-rich domains comprising exceedingly fine gold arrays that appear as veil-like bright regions in the dark field image. It is unknown why these regions, although quite crystalline in character, did not coalesce into single crystals of gold.

Although not wishing to be bound by theory, a possible explanation for the performance of potassium carbonate is that potassium carbonate provides sites where water can adsorb. Indeed, in certain cases we have found that the gold catalysts are more active in the presence of moisture.

Unlike Kuraray GG carbon, many other desirable supports do not naturally include an activating agent. Consequently, in some instances, it may be desirable to incorporate an activating agent comprising one or more constituents into the desired support. Such incorporation can occur in any desired manner. Incipient wetness impregnation is one suitable technique, and examples of using solution impregnation are described in the examples below. Briefly, incipient wetness impregnation involves slowly adding a solution comprising the desired activating agent to dry support particles with mixing. The solution generally is added until saturation, and adding an excess of solution is desirably avoided. Such solutions typically are aqueous and the concentration of each species of activating agent in the solution generally is in the range of from about 0.2 M to about 2.5 M. If more than one species of activating agent is to be added, these may be added together, separately, or in overlapping fashion. After impregnation, the particles are dried and optionally calcined (thermal treatment).

Deposition of gold preferably occurs via PVD after impregnation, drying, and optional calcining Bifurcation of impregnation and gold deposition is a distinct advantage for many reasons. First, if the gold were to be added to the particles via solution impregnation, the kinds of activating agents that could be used would be limited. For instance, HAuCl$_4$, a gold species commonly used in solution methods because of its relatively low cost, is very acidic making it incompatible with basic activating agents such as the preferred alkali and alkaline earth metal salts. In cases where basic gold species are used, the aqueous impregnation would tend to wash away some of the desired activating ions. Thus, subsequent deposition of gold via PVD (a non-solution process) separate from impregnation with activating agents is a significant process feature that allows gold to be substantially more easily used in combination with these extremely effective activating agents. As an additional advantage, this method allows gold to be deposited onto the support with the activating agent already in place. We think this is one reason why gold deposited in accordance with our invention is so active as deposited without requiring a subsequent thermal treatment.

Thermal treatment (calcining) of the activated support prior to gold deposition, however, can be very beneficial. In some instances, an activating agent may not function to the desired degree until after calcining. For example, calcining tends to yield demonstrable improvements when the activating agent includes a nitrate salt. In other instances, the performance of an effective activating agent would be further enhanced. For example, the performance of generally effective carbonate salts can be enhanced to a degree via calcining Yet, salts such as potassium carbonate tend to already be in active form when impregnated, and the resultant activated supports are beneficially dried, e.g., at a temperature up to about 200° C. without really needing a calcining treatment.

In general, thermal treatment involves heating the impregnated support at a temperature in the range of 125° C. to about 1000° C. for a time period in the range of 1 second to 40 hours, preferably 1 minute to 6 hours, in any suitable atmosphere, such as air; an inert atmosphere such as nitrogen; carbon dioxide; argon; or a reducing atmosphere such as hydrogen; and the like. The particular thermal conditions to be used will depend upon factors including the nature of the support and the nature of the impregnants(s). Generally, thermal treatment should occur below a temperature at which the constituents of the impregnated support would be decomposed, degraded, or otherwise unduly thermally damaged. Many calcining treatments of impregnated supports are described in the examples below.

Although an activating agent may be supplied as a salt or the like, the resultant form of the salt or its constituent ions after incorporation into the heterogeneous catalyst system is not known with certainty. Analysis by x-ray diffraction shows no distinct oxide or carbonate phase of metal, although some carbonate per se is shown. It is believed, therefore, that the metal ions have reacted with and modified the support surface.

There is a wide range of applications for catalysts of the present invention. We believe that these catalysts will find application in the areas of treatment of automobile exhaust, as hydrogenation catalysis, as catalysts for the oxidation of hydrocarbons, and as catalysts for the removal of the oxides of nitrogen, and in sensors for detection and measurement of gases and vapors, and CO removal from inhabited areas. Respiratory protection devices such as smoke masks or escape hoods could usefully employ catalysts of the invention for the removal of hazardous CO or other gases from breathing air.

The present invention will now be further described in the following illustrative examples.

Test Method 1: CO Challenge Test Procedure

Figure 4:
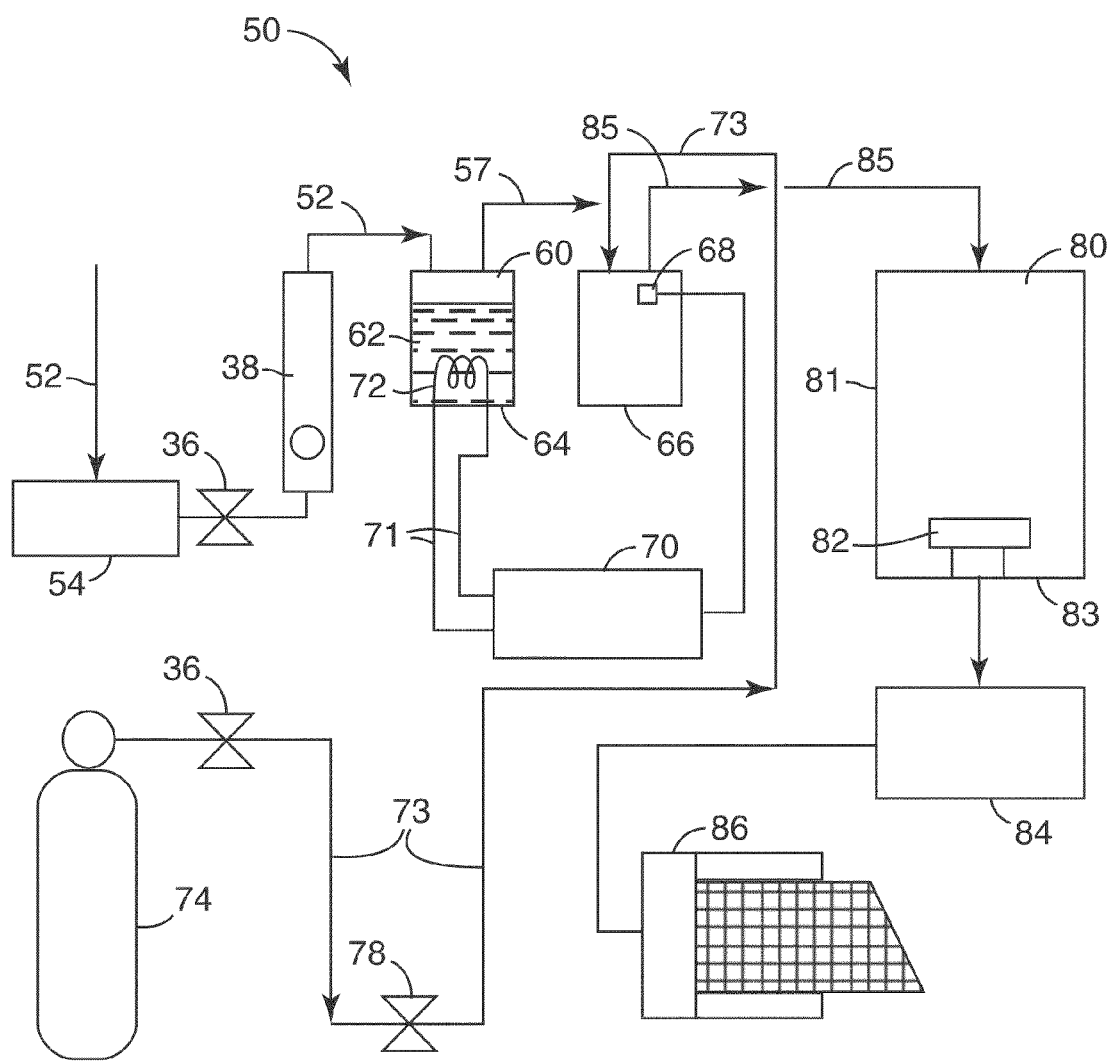
FIG. 4 shows testing system that was used to subject samples to CO challenges in order to assess catalytic characteristics for oxidizing CO.

FIG. 4 shows testing system 50 that was used to subject samples to CO challenges in order to assess catalytic characteristics for oxidizing CO. High-pressure compressed air from supply line 52 is reduced in pressure, regulated, and filtered by regulator 54 (3M Model W-2806 Air Filtration and Regulation Panel, 3M Company, St. Paul, Minn.) to remove particulates and oils. The regulator is adjusted to give a delivery pressure of between 40 and 60 psi. Valve 56 (Hoke Inc., Spartanburg, S.C.) is used to set the desired main airflow rate as measured by a flow meter 58 (Gilmont®, Barnant Co, Barrington, Ill.) with a range of 0 to 77 LPM. The flow meter 58 was calibrated using a Gilibrator® bubble flow meter (Sensidyne, Inc., Clearwater, Fla.; not shown). Unless otherwise stated an airflow rate of 64 LPM was used for all catalyst testing.

The main airflow passes through the headspace 60 above a heated distilled water bath 62 of vessel 64 and then passes via lines 57 and 75 into a 1000 ml mixing flask 66. Relative humidity in the mixing flask is monitored using a RH sensor 68 (Type 850-252, General Eastern, Wilmington, Mass.). The RH sensor 68 provides an electrical signal to a humidity controller 70 (an Omega Engineering PID controller series CN1200 from Omega Engineering Inc., Stamford, Conn.) that delivers power via lines 71 to a submerged heater 72 to maintain the RH at the set point. Unless otherwise indicated, the relative humidity is controlled at 85%.

A cylinder 74 of carbon monoxide equipped with a regulator 76 suitable for CO service provides a regulated flow of CO gas via line 73. A stainless steel, very fine angled metering valve 78 (Swagelok Co, Solon, Ohio) is used to set the desired CO flow rate. Unless otherwise indicated, a CO flow rate of 96 mL/min is used in order to obtain a CO concentration in the air stream of 1500 ppm. The metered CO is combined with the humidified air in the mixing flask 66.

The combined stream then flows into the test chamber 80 having a box 81 such as an inverted, 13-quart, stainless steel bucket closably engaging a support platform 83. Inside the test chamber 80 is a test fixture 82. The test chamber 80 is sealed to support platform 83 using a foam gasket (not shown). Two clamps (not shown) ensure a tight seal to the support platform 83. The box 81 can be removed to allow catalyst text fixtures to be placed inside for testing and taken out after testing is complete. The support platform 83 is equipped with an inner 29/42 tapered fitting (not shown) onto which the fixture 82 containing the catalyst to be tested is mounted.

The CO and $CO_2$ concentrations and the dew point temperature are measured at the outlet of the test chamber using a Brüel & Kjer Multi-gas Monitor Type 1302 sensor (Brüel & Kjaer, Naerum, Denmark; not shown) equipped with optical filters #982 to detect $CO_2$ and #984 to detect CO. The Multi-gas Monitor was calibrated with 10,000-ppm $CO_2$ and 3,000-ppm CO gas standards following the manufacturers recommended procedure. The Multi-gas Monitor outputs data to a data acquisition device such as a chart recorder or a laptop PC running Hyperterminal Software (Hilgraeve, Monroe, Mich.). Text files are imported into Microsoft® Excel software (Microsoft Corp., Redmond, Wash.) for data analysis. Prior to initiating testing the system 50 is allowed to equilibrate to a constant concentration of nominally 1500-ppm CO. Variability in the initial CO concentration was ±5% for samples tested at 1500-ppm and ±3% for samples tested at 3600-ppm CO. The temperature of the air stream is monitored downstream of the test fixture using a K-type thermocouple (not shown) and digital readout (not shown) (Fluke 51 K/J Thermometer, Fluke Corporation, Everett, WA).

Catalyst samples are sieved to remove fines prior to testing. Unless otherwise specified, samples were sieved to remove particles finer than 20 mesh using U.S. Standard Sieves (A.S.T.M. E-11 specification; The Murdock Co., Mundelein, Ill.). A specified catalyst volume, typically 100 ml, is loaded into the aluminum test fixture 82 with 8.9 cm (3.5 in) inner diameter and equipped with an outer 29/42 tapered fitting using a loading column (as described in UK 606,876 with one modification, the removal of the upward-facing cone). Typical bed depth is approximately 1.6 cm (0.6 in). Screens mounted inside the test fixture 82 prevent loss of catalyst particles during the testing. When the measured CO concentration has stabilized, the tubing 85 carrying the air/CO mixture is disconnected from the top of the test chamber 80 via the tapered fitting (not shown), the box 81 is removed, and the test fixture 82 containing the catalyst is placed on the 29/42 fitting on the support platform 81. The box 81 is replaced and sealed to the support platform 83. CO and $CO_2$ concentration measurements begin when the air/CO tubing 85 is reconnected to the tapered fitting on the top of the test chamber 80. Measurements continue for a specified time period, typically 30 minutes.

For tests run at 64 LPM with 3600-ppm CO, valve 78 was replaced with a stainless steel, fine metering, double pattern valve (Swagelok Co., Solon, Ohio) to allow for control of higher CO flowrates.

Test Method 2: Chromatographic Test Procedure and Apparatus

Figure 5:
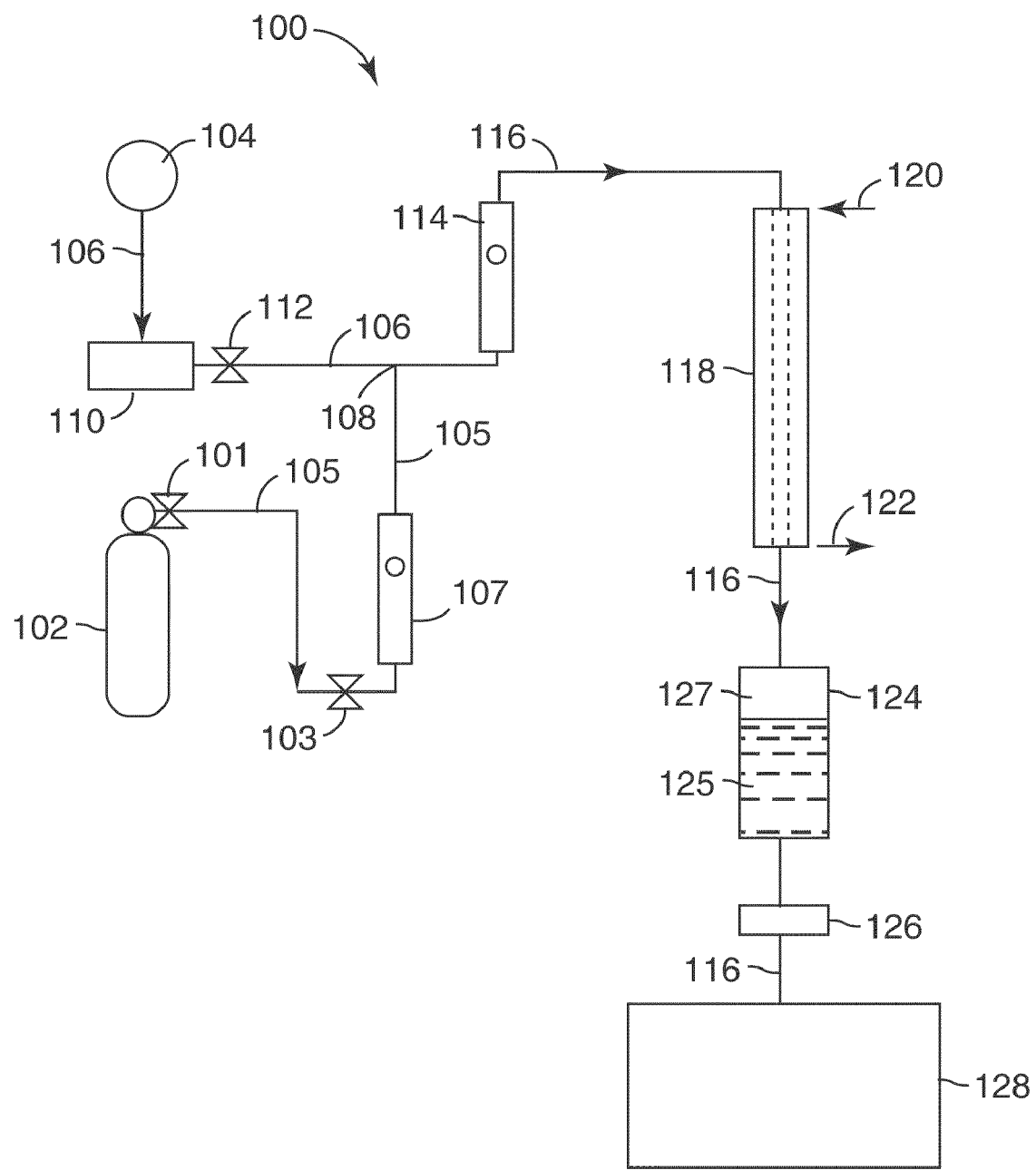
FIG. 5 schematically shows a system used for chromatographic analysis of catalytic characteristics of samples.

FIG. 5 shows a system 100 used for chromatographic analysis of catalytic characteristics of samples. System 100 includes a high pressure CO in air mixture (1.9% v/v) stored in tank 102 and is also coupled to a source 104 of building compressed air via line 106. Pressure regulator and shut off valve 101 and fine needle valve 103 help control the flow of CO in air through line 105. The flow of CO in air is measured by rotameter 107 (Alphagaz (Air Liquide) 3502 flow tube, Morrisville, Pa.).

The flow of building compressed air through line 106 is reduced in pressure, regulated, and filtered by regulator 110 (3M Model W-2806 Air Filtration and Regulation Panel, 3M Company, St. Paul, Minn.). The regulator is adjusted to give a delivery pressure of between 40 and 60 psi. Fine needle valve 112 is used to set the desired airflow rate through line 106.

The flows of CO in air and the building compressed air are combined at juncture 108 to provide a CO in air mixture of the desired concentration and flow rate. Rotameter 114 (Aalborg Instruments 112-02 flowtube, Orangeburg, N.Y.) on line 116 measures the total flow of the combined streams. The rotameters are calibrated using a Gilibrator® bubble flow meter (not shown) placed at the catalyst bed (no catalyst present). The two rotameters 107 and 114 are chosen to obtain concentrations from about 1000 to 20,000 ppm CO at flow rates from about 100 mL/min to about 500 mL/min under lab ambient conditions.

The diluted CO in air mixture in line 116 is then humidified to the desired RH by passing the air mixture either through the inner tube of a tube in shell Nafion® dryer 118 as shown (Perma Pure MD 110-12P; Toms River, N.J.) operating as a humidifier or by passing the air mixture through a pressure vessel containing water (not shown). Wet air is introduced to dryer 118 through line 120 and exits via line 122. In the latter, process, a RH of about 70% was obtained at a flow rate of 200 ml/min. Wet air is passed through the dryer shell to humidify the dry CO in air stream passing through the inner tube. The wet air is obtained by bubbling compressed air through a glass frit into a flask of water maintained at a controlled temperature in a refrigerated water bath. If a lower RH is desired, the temperature of the water bath is lowered until the CO in air mixture attains the desired RH. This is measured by a General Eastern Hygro-M1 optical mirror dew point hygrometer (GE General Eastern Instruments, Wilmington Mass.). Room temperature air saturated with water vapor at about 3 L/min through the dryer shell humidifies a CO/air stream at 100 mL/min to >90% RH The catalyst sample (usually about 1-2 cm in depth) is snowflaked into a section of thick walled 4 mm ID polyethylene tubing 124 about 8 cm in length to form a catalyst bed 125. A cotton plug 127 seals one end of tubing 124. The CO in air mixture passes through the catalyst bed and then through a particulate cartridge filter 126 (Balston DFU sample filter grade BQ, Parker Hannifin Corporation, Tewksbury, Mass.) into the gas sampling valve of a gas chromatograph 128 (SRI model 8610C gas chromatograph with gas sampling valve and thermal conductivity and helium ionization detectors, Torrance, Calif.). The particulate filter 126 protects the GC valve from damage by particulates escaping the catalyst bed.

The gas sampling valve periodically injects the exit stream from the catalyst bed onto a 5 ft molecular sieve 5A column. This separates CO from air. CO concentration is determined by either a thermal conductivity detector (CO detection limit about 500 ppm) or by a helium ionization detector (CO detection limit<10 ppm). The CO concentration is measured approximately every four minutes during the test, displayed, and recorded in a data file.

These detectors are calibrated by diluting a known flow of Scott certified CO (99.3%) with a known flow of air to generate known CO concentrations (flow calibrator: Sensidyne Gilibrator flow calibrator, Clearwater, Fla.). A calibration curve is generated from these data.

Gold Application Method: Process for Deposition of Gold Nanoparticles onto Substrate Particles:

The apparatus described in the detailed description and shown in FIGS. 2 and 3 is used as follows to prepare catalytic materials according to the following procedure, unless expressly noted otherwise. 300 cc of substrate particles are first heated to about 200° C. in air overnight (120° C. in the case of carbon substrates) to remove residual water. They are then placed into the particle agitator apparatus 10 while hot, and the chamber 14 is then evacuated. Once the chamber pressure is in the $10^{-5}$ torr range, the argon sputtering gas is admitted to the chamber 14 at a pressure of about 10 millitorr. The gold deposition process is then started by applying a cathodic power of 0.03 kilowatts. The particle agitator shaft 40 is rotated at about 4 rpm during the gold deposition process. The power is stopped after 60 minutes. The chamber 14 is backfilled with air and the gold coated particles are removed from the apparatus 10. The gold sputter target 32 is weighed before and after coating to determine the amount of gold deposited. In the case of carbon particles, the amount of gold deposited was determined by ion-coupled plasma elemental analysis on the treated carbon particles to be 0.05% w/w.

During the deposition process the gap between the blades 42 and the chamber wall were maintained at 1.7 mm (deposition condition 1) or 2.7 mm (deposition condition 2).

Preparation of Gamma Alumina Particles:

Room temperature deionized water (2600 ml), 48 g of 16 N analytical grade nitric acid and 800 g alpha alumina monohydrate (boehmite) powder sold under the trade designation DISPERAL were charged into an 18.9 liter polyethylene-lined steel vessel. The charge was dispersed at high speed for five minutes using a Gifford-Wood Homogenizer Mixer (Greeco Corp., Hydson, N.H.). The resulting sol was poured into a 46 cm×66 cm×5 cm polyester-lined aluminum tray where it was dried in a air oven at 100° C. to a friable solid.

The resulting dried material was crushed using a "Braun" type UD pulverizer having a 1.1 mm gap between the steel plates. The crushed material was screened and the 0.125 mm to about 1 mm screen size material was retained and was fed into the end of a calciner which was a 23 cm diameter 4.3 meter long stainless steel tube having a 2.9 meter hot zone, the tube being inclined at 2.4 degrees with respect to the horizontal, and rotating at 7 rpm, to provide residence time of about 15-20 minutes. The calciner had a hot zone feed end temperature of about 350° C. and exit end temperature of about 800° C. The gas above the alumina particles at the hot end of the calciner was measured at about 380° C. during the calcinations. The pre-fired material was then screened to be greater than 20 mesh but less than 16 mesh in size using U.S. Standard Sieves (A.S.T.M. E-11 specification; The Murdock Co., Mundelein, Ill.). This size fraction was designated alumina particles "A". An additional sample of the pre-fired material was screened to be greater than about 20 mesh but less than 14 mesh in size using the U.S. Standard Sieves (A.S.T.M. E-11 specification; The Murdock Co., Mundelein, Ill.). The 14 to 20 mesh particle size samples were designated alumina particles "B". These materials were used in the preparation of the following catalyst supports.

Example 1

Type A Gamma Alumina Particles

Figure 6:
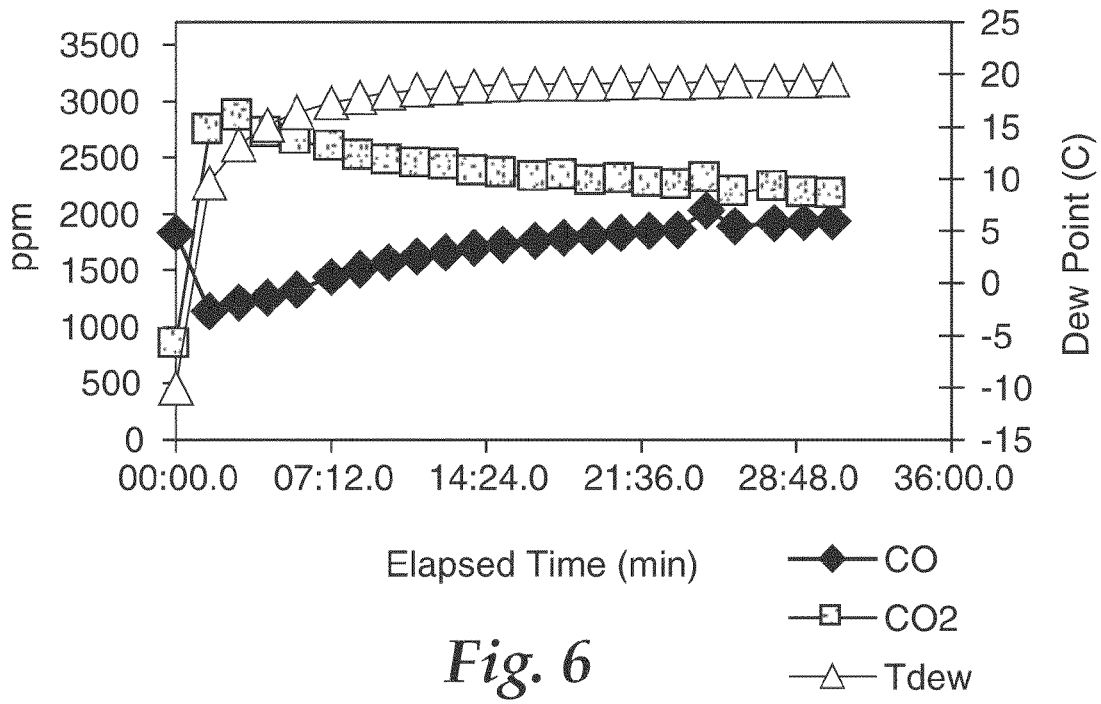
FIG. 6 is a graph showing catalytic characteristics of a sample, wherein the ability of the sample to catalytically oxidize CO to $CO_2$ in a flow containing CO in air is depicted as a function of time.

Type A gamma alumina particles were treated with gold by plasma-assisted sputtering as previously described using deposition condition 2. The performance of the CO oxidation catalyst of example 1 in oxidizing CO during gas flow through a bed was measured using test method 1. The CO challenge was 3600 ppm CO and the total gas flow rate was 64 liters/min. The gas was at 85% relative humidity. The results are represented in FIG. 6. FIG. 6 and other similar graphs in these examples display measured gas concentrations in ppm versus time of testing after test gas mixture is passed through a 100 ml test bed. The elapsed time is represented in minutes: seconds:tenths of seconds.

Example 2

Un-modified Type B Gamma Alumina Particles

Figure 7:
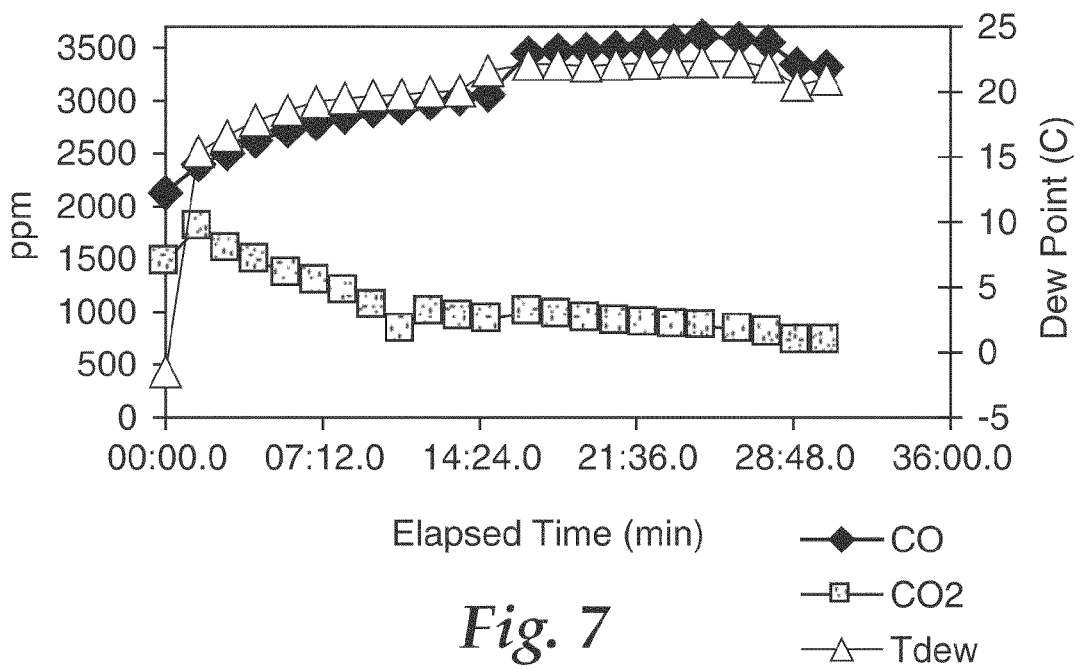
FIG. 7 is a graph showing catalytic characteristics of a sample, wherein the ability of the sample to catalytically oxidize CO to $CO_2$ in a flow containing CO in air is depicted as a function of time.

Type B gamma alumina particles were treated with gold by plasma-assisted sputtering as previously described using deposition condition 2. The performance of the CO oxidation catalyst of example 2 in oxidizing CO during gas flow through a bed was measured using test method 1. The CO challenge was 3600 ppm CO and the total gas flow rate was 64 liters/min. The gas was at 85% relative humidity. The results are represented in FIG. 7.

Impregnation of Gamma Alumina Particles:

A solution of the impregnation liquid was prepared by mixing sufficient soluble salt of the impregnation metal with deionized water in sufficient quantity to generate a solution having the desired concentration. As an example, to prepare a 0.5 M solution of potassium carbonate (FW=138.21 g/mole), 69.11 g of potassium carbonate was dissolved in sufficient deionized water to yield a final volume of 1 liter.

The particles were impregnated by incipient wetness. The incipient wetness technique involves slow addition of the impregnation solution to the dry, gamma alumina particles while stirring the particles with a paddle or spatula, until the pores of the gamma alumina particles are fully saturated with the solution via impregnation of the solution into the pores of the gamma alumina particles. An excess of the impregnation solution, as evidenced by the visual observation of liquid phase on or between the particles was avoided. After the particles were fully saturated, the impregnated particles were dried in a forced air oven at 130° C. and were calcined as described for each sample.

Example 3

Preparation of Potassium Carbonate Impregnated Gamma Alumina Particles—Sample Heated to 130° C.

710 g of gamma alumina particles A (950 ml volume of gamma alumina particles) was impregnated by the incipient wetness technique using a 0.5 M $K_2CO_3$ (Merck KgaA, Darmstadt, Germany) solution. After an addition of 469 ml of the 0.5 M $K_2CO_3$ full saturation was achieved. This results in a catalyst support, after drying that is about 2.5% by weight potassium. The particles were dried at 130° C. and a 300 ml portion of this sample was treated with gold (deposition condition 2).

The weight percent gold on this sample was measured by Inductively Coupled Argon Plasma Spectroscopic Analysis (ICP). The results for replicate samples were 0.0486 wt % gold and 0.0521 wt % gold.

A sample from Example 3 was examined by TEM as previously described. The approximate size range of Au particles in an undulating region that appeared to be representative of the sample was 2.1 to 6.6 nm. The average size of Au particles in this region was 3.0 nm and the approximate range of depth into the substrate was 38 to 60 nm. In a flat region of the sample, the approximate size range of Au particles was 2.4 to 11.4 nm. The average size of Au particles in this region was 8.6 nm and the gold particles were found to be entirely on the surface of the particle with little penetration observed.

Figure 8:
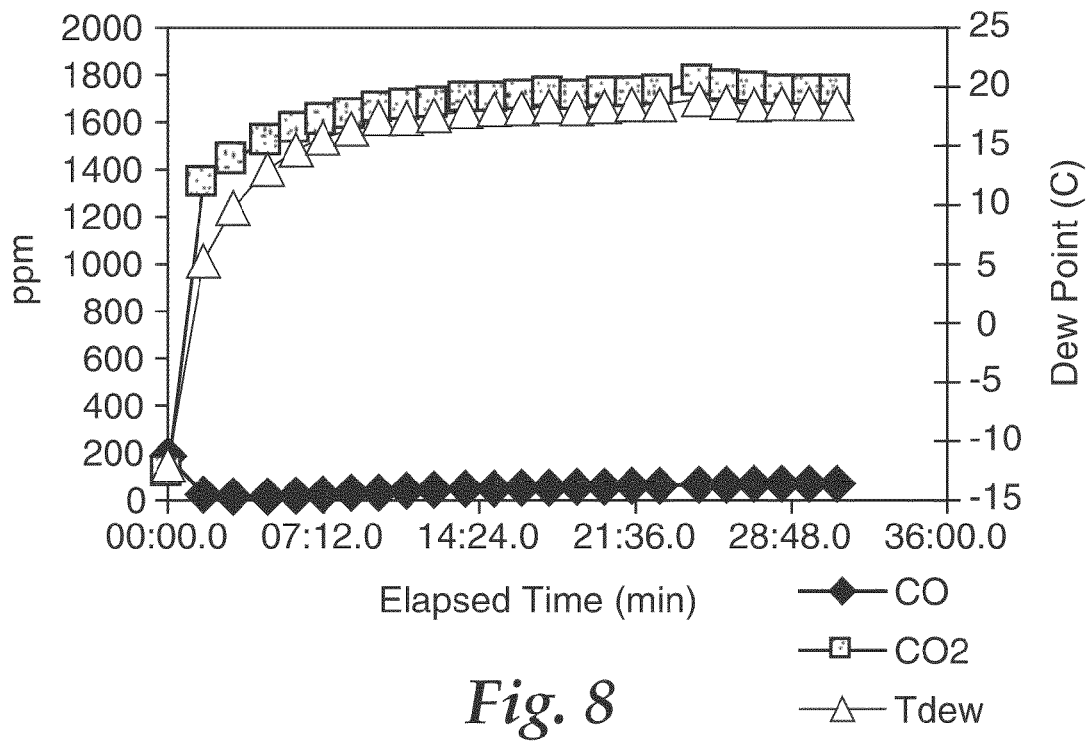
FIG. 8 is a graph showing catalytic characteristics of a sample, wherein the ability of the sample to catalytically oxidize CO to $CO_2$ in a flow containing CO in air is depicted as a function of time.

The performance of the catalyst of example 3 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 8. These results illustrate the improved catalytic properties of the support modified with a potassium source.

Example 4

Preparation of Potassium Carbonate Impregnated Gamma Alumina Particles—Sample Heated to 300° C.

A 300 ml portion of the dried sample from example 3 was calcined to 300° C. by heating in air in a box furnace and holding the sample at 300° C. for 1 hour. After cooling, this calcined sample was treated with gold (deposition condition 2).

Figure 9:
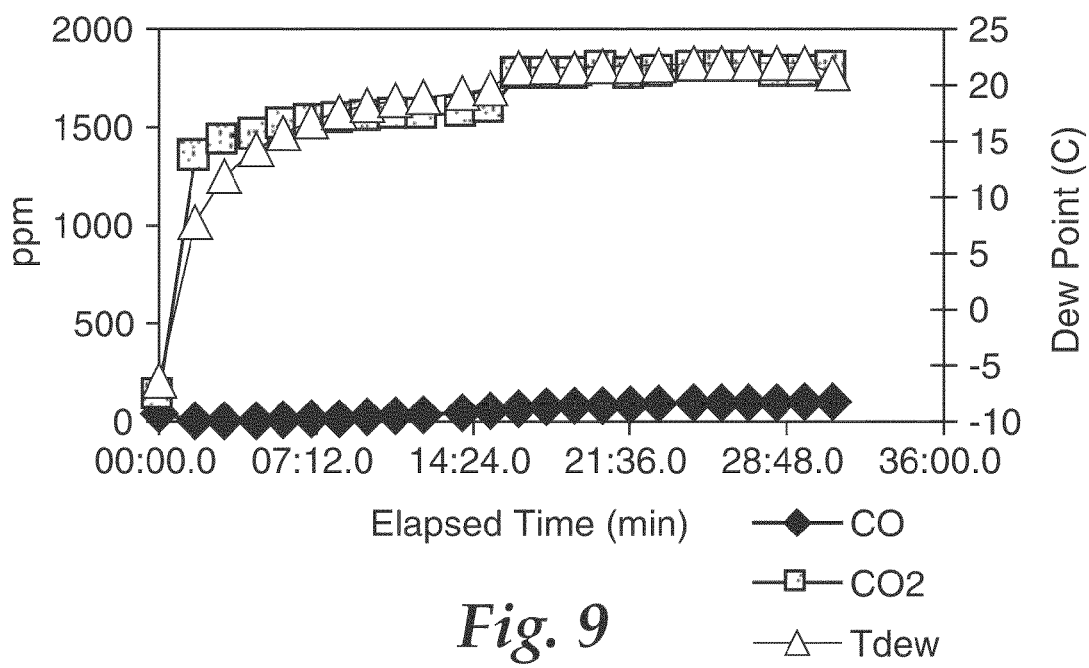
FIG. 9 is a graph showing catalytic characteristics of a sample, wherein the ability of the sample to catalytically oxidize CO to $CO_2$ in a flow containing CO in air is depicted as a function of time.

The performance of the catalyst of example 4 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 9.

Example 5

Preparation of Potassium Carbonate Impregnated Gamma Alumina Particles—Sample Heated to 600° C.

A 300 ml portion of the dried sample from example 3 was calcined to 600° C. by heating in air in a box furnace and holding the sample at 600° C. for 1 hour. After cooling, this calcined sample was treated with gold (deposition condition 2).

Figure 10:
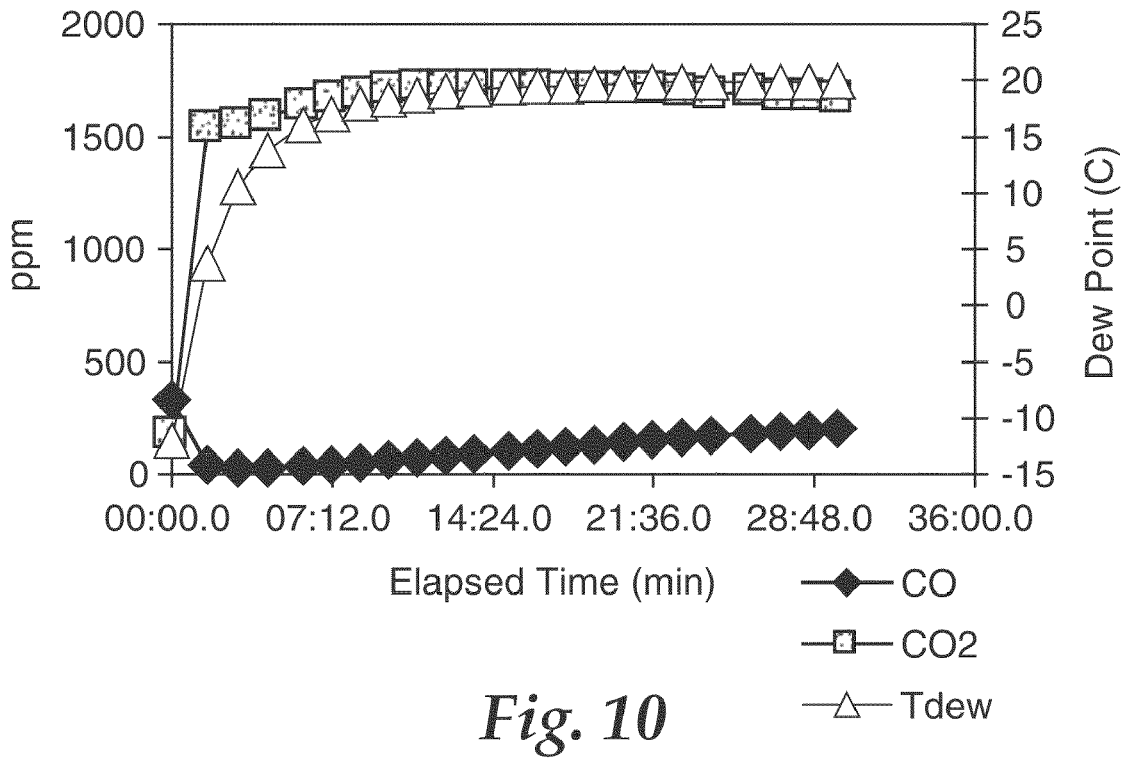
FIG. 10 is a graph showing catalytic characteristics of a sample, wherein the ability of the sample to catalytically oxidize CO to $CO_2$ in a flow containing CO in air is depicted as a function of time.

The performance of the catalyst of example 5 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 10.

Example 6

Preparation of Potassium Carbonate Impregnated Gamma Alumina Particles—Effect of Potassium Carbonate Content A solution of potassium carbonate was prepared by dissolving 6.91 g of $K_2CO_3$ ((Merck KGAA, Darmstadt, Germany)) in sufficient deionized water to yield a volume of 200 ml. A sample of gamma alumina particles B (300 ml volume of particles, 224.14 g) was impregnated by the incipient wetness technique using about 150 ml of the 0.4 M $K_2SO_4$. After impregnation, the particles were dried in an oven at 130° C. After drying the impregnated particles were gold treated via plasma-assisted sputtering (deposition condition 2).

Figure 11:
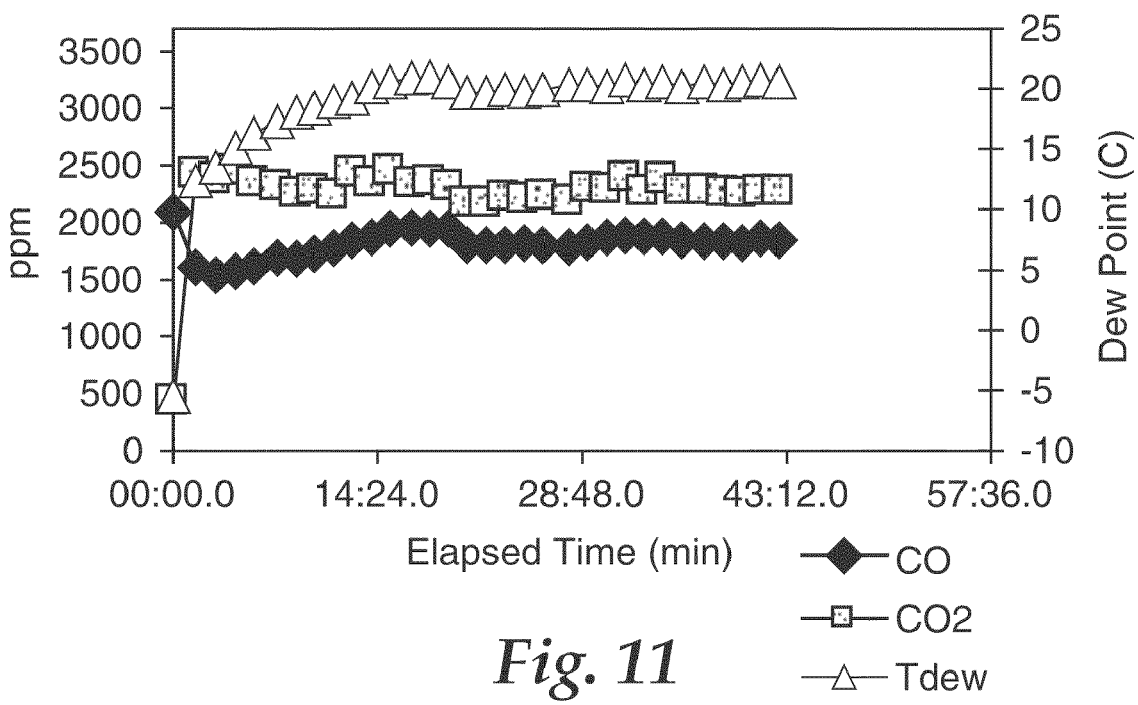
FIG. 11 is a graph showing catalytic characteristics of a sample, wherein the ability of the sample to catalytically oxidize CO to $CO_2$ in a flow containing CO in air is depicted as a function of time.

The performance of the catalyst of example 6 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 11.

Example 7

Figure 12:
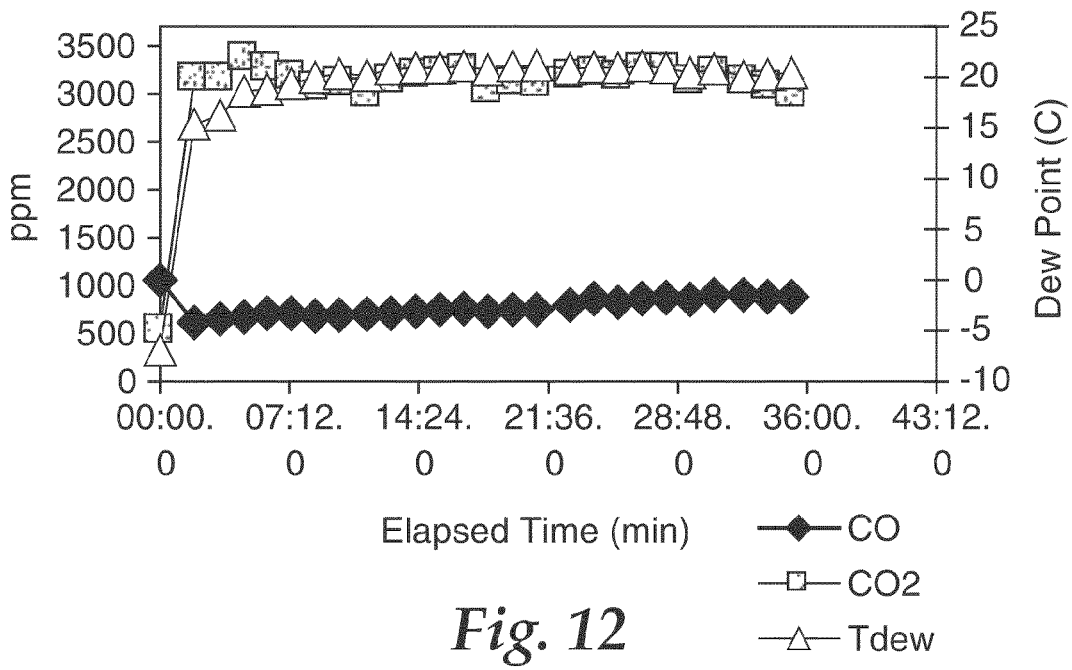
FIG. 12 is a graph showing catalytic characteristics of a sample, wherein the ability of the sample to catalytically oxidize CO to $CO_2$ in a flow containing CO in air is depicted as a function of time.

Preparation of Potassium Carbonate Impregnated Gamma Alumina Particles—Effect of Potassium Carbonate Content Potassium carbonate impregnated gamma alumina particles were prepared and tested exactly as described in example 6 with the exception that 13.82 g of potassium carbonate was used in place of the 6.91 g potassium carbonate. The results of testing are represented in FIG. 12.

Example 8

Figure 13:
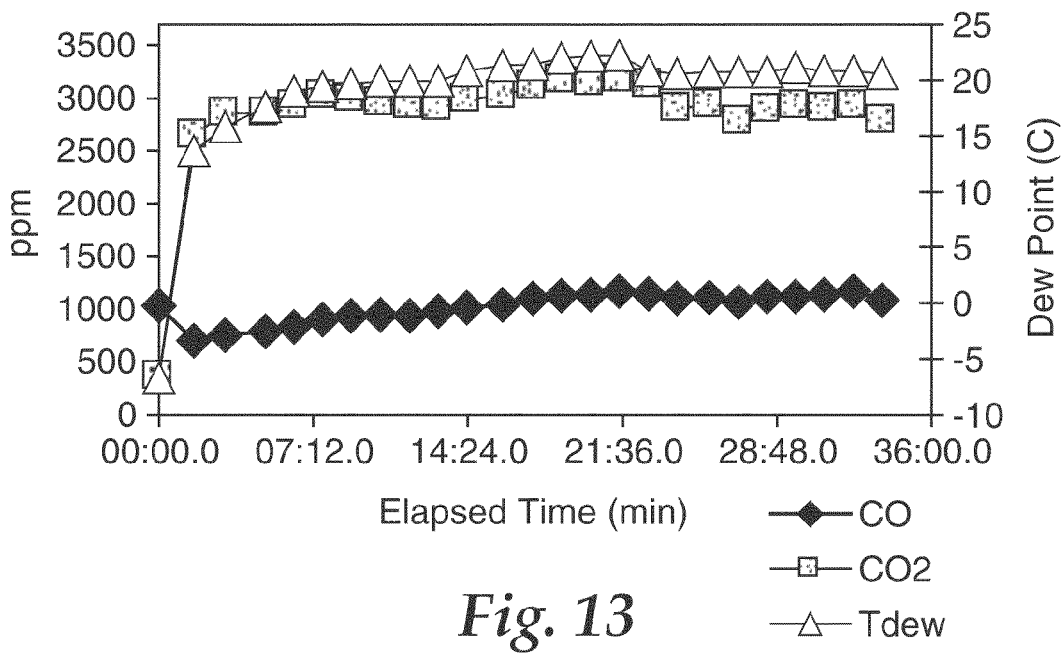
FIG. 13 is a graph showing catalytic characteristics of a sample, wherein the ability of the sample to catalytically oxidize CO to $CO_2$ in a flow containing CO in air is depicted as a function of time.

Preparation of Potassium Carbonate Impregnated Gamma Alumina Particles—Effect of Potassium Carbonate Content Potassium carbonate impregnated gamma alumina particles were prepared and tested exactly as described in example 6 with the exception that 20.72 g of potassium carbonate was used in place of the 6.91 g potassium carbonate. The results of testing are represented in FIG. 13.

Example 9

Preparation of Ammonium Carbonate Impregnated Gamma Alumina Particles

A solution of 0.5 M ammonium carbonate (Fisher Scientific Co., Fair Lawn, N.J.) was prepared by dissolving 11.41 g of ammonium carbonate hydrate in sufficient deionized water to yield a volume of 200 ml. A sample of gamma alumina particles A (300 ml volume of particles, 224.14 g sample) was impregnated by the incipient wetness technique using about 150 ml of the 0.5 M ammonium carbonate solution. After impregnation, the particles were dried in an oven at 100° C. After drying the impregnated particles were gold treated via plasma-assisted sputtering (deposition condition 2).

Figure 14:
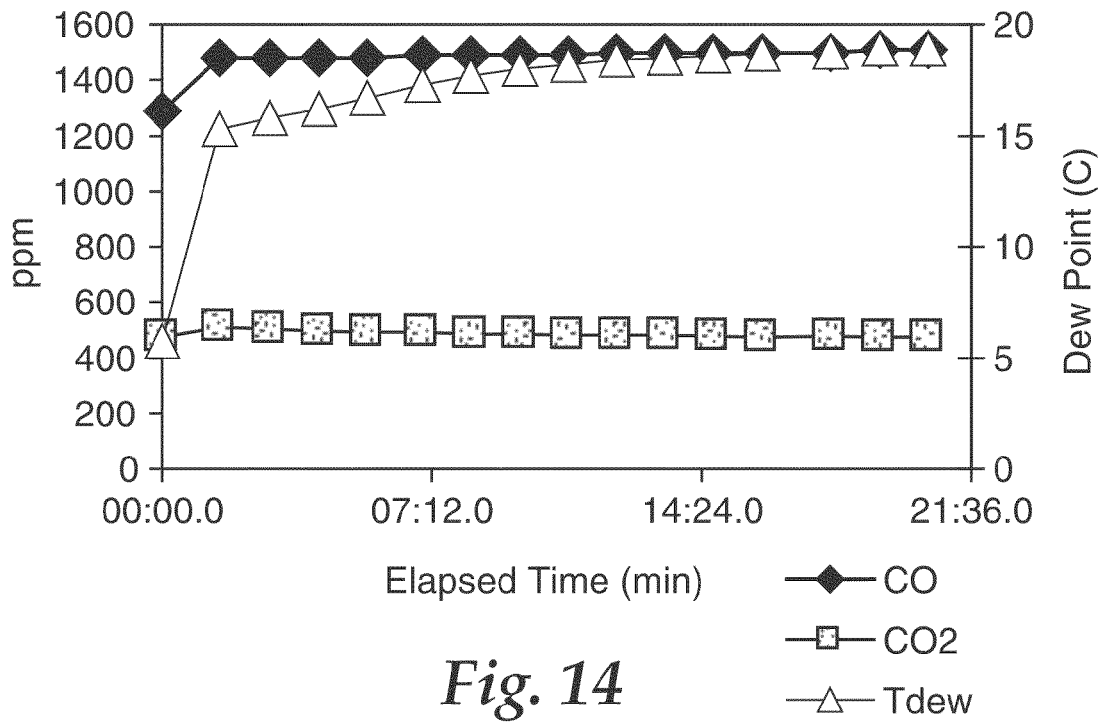
FIG. 14 is a graph showing catalytic characteristics of a sample, wherein the ability of the sample to catalytically oxidize CO to $CO_2$ in a flow containing CO in air is depicted as a function of time.

The performance of the catalyst of example 9 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 14.

Example 10

Preparation of Potassium Hydroxide Impregnated Gamma Alumina Particles

A solution of 0.4 M potassium hydroxide was prepared by dissolving 4.49 g of KOH (Merck KgaA, Darmstadt, Germany) in sufficient deionized water to yield a volume of 200 ml. A sample of gamma alumina particles A (300 ml volume of particles, 224.14 g sample) was impregnated by the incipient wetness technique using about 150 ml of the 0.4 M KOH. After impregnation, the particles were dried in an oven at 100° C. After drying the impregnated particles were gold treated via plasma-assisted sputtering (deposition condition 2).

Figure 15:
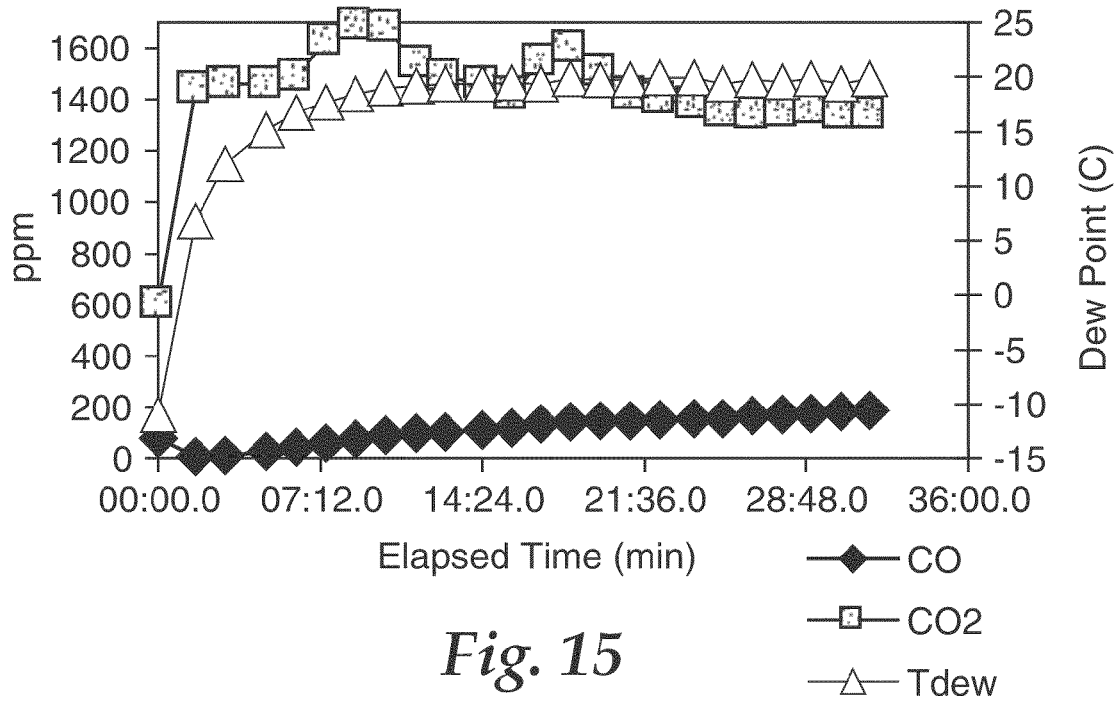
FIG. 15 is a graph showing catalytic characteristics of a sample, wherein the ability of the sample to catalytically oxidize CO to $CO_2$ in a flow containing CO in air is depicted as a function of time.

The performance of the catalyst of example 10 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 15.

Example 11

Preparation of Potassium Acetate Impregnated Gamma Alumina Particles

A solution of 0.4 M potassium acetate was prepared by dissolving 7.85 g of $KCH_3O_2$ (Fisher Scientific Co., Fair Lawn, N.J.) in sufficient deionized water to yield a volume of 200 ml. A sample of gamma alumina particles A (300 ml volume of particles, 224.14 g) was impregnated by the incipient wetness technique using about 150 ml of the 0.4 M $KCH_3O_2$. After impregnation, the particles were dried in an oven at 100° C. After drying the impregnated particles were gold treated via plasma-assisted sputtering (deposition condition 2).

Figure 16:
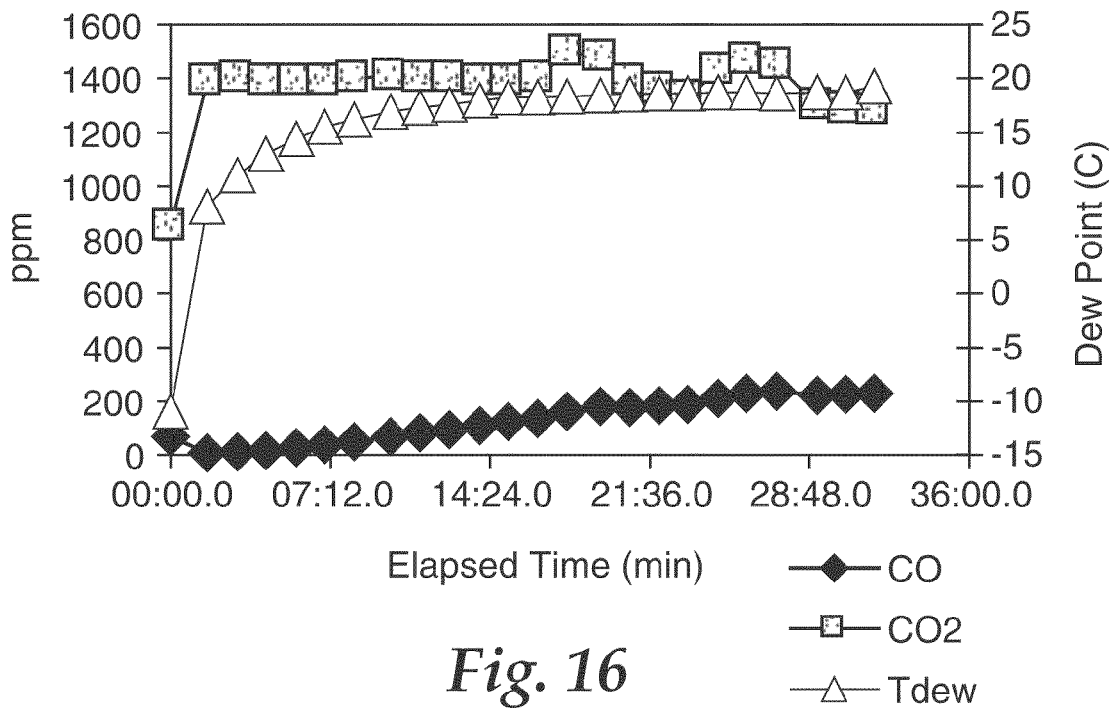
FIG. 16 is a graph showing catalytic characteristics of a sample, wherein the ability of the sample to catalytically oxidize CO to $CO_2$ in a flow containing CO in air is depicted as a function of time.

The performance of the catalyst of example 11 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 16.

Example 12

Preparation of Potassium Sulfate Impregnated Gamma Alumina Particles

A solution of potassium sulfate was prepared by dissolving 13.94 g of $K_2SO_4$ (J. T. Baker Chemical Co., Phillipsburg, N.J.) in sufficient deionized water to yield a volume of 200 ml. A sample of gamma alumina particles A (300 ml volume of particles, 224.14 g) was impregnated by the incipient wetness technique using about 150 ml of the 0.4 M $K_2SO_4$. After impregnation, the particles were dried in an oven at 100° C. After drying the impregnated particles were gold treated via plasma-assisted sputtering (deposition condition 2).

Figure 17:
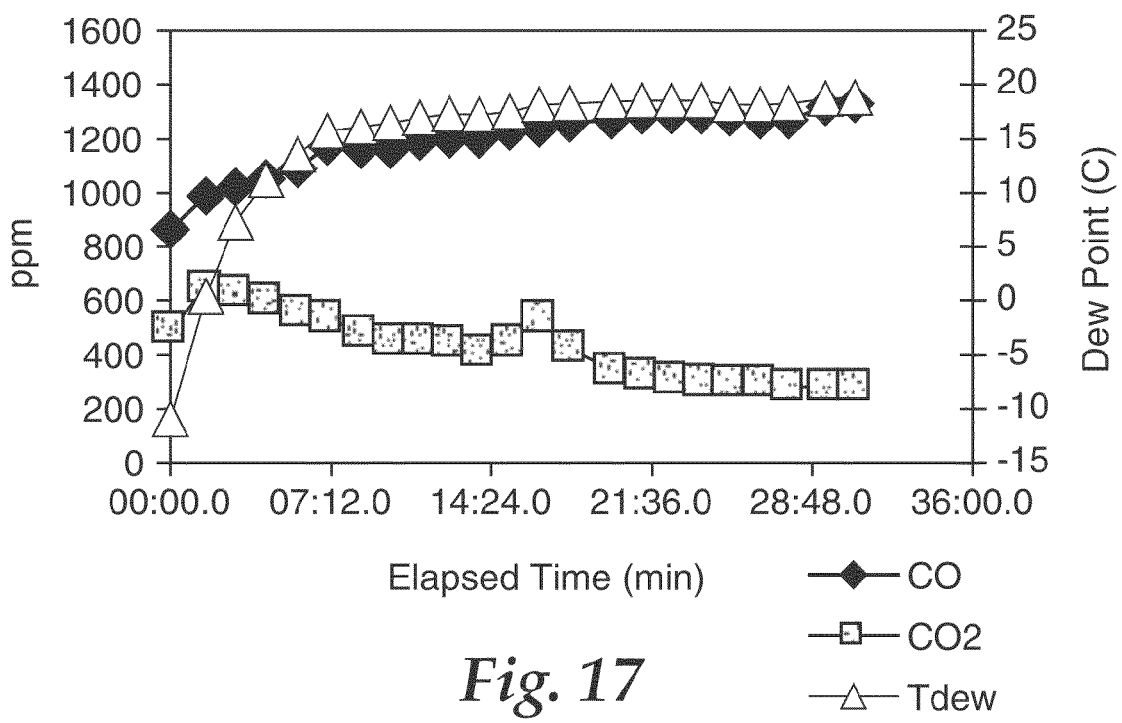
FIG. 17 is a graph showing catalytic characteristics of a sample, wherein the ability of the sample to catalytically oxidize CO to $CO_2$ in a flow containing CO in air is depicted as a function of time.

The performance of the catalyst of example 12 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 17.

Example 13

Preparation of Potassium Oxalate Impregnated Gamma Alumina Particles

A solution of potassium oxalate was prepared by dissolving 14.74 g of $K_2C_2O_4$ (Mallinkrodt Chemical Works, St. Louis, Mo.) in sufficient deionized water to yield a volume of 200 ml. A sample of gamma alumina particles A (300 ml volume of particles, 224.14 g) was impregnated by the incipient wetness technique using about 150 ml of the 0.4 M $K_2C_2O_4$. After impregnation, the particles were dried in an oven at 100° C. After drying the impregnated particles were gold treated via plasma-assisted sputtering (deposition condition 2).

Figure 18:
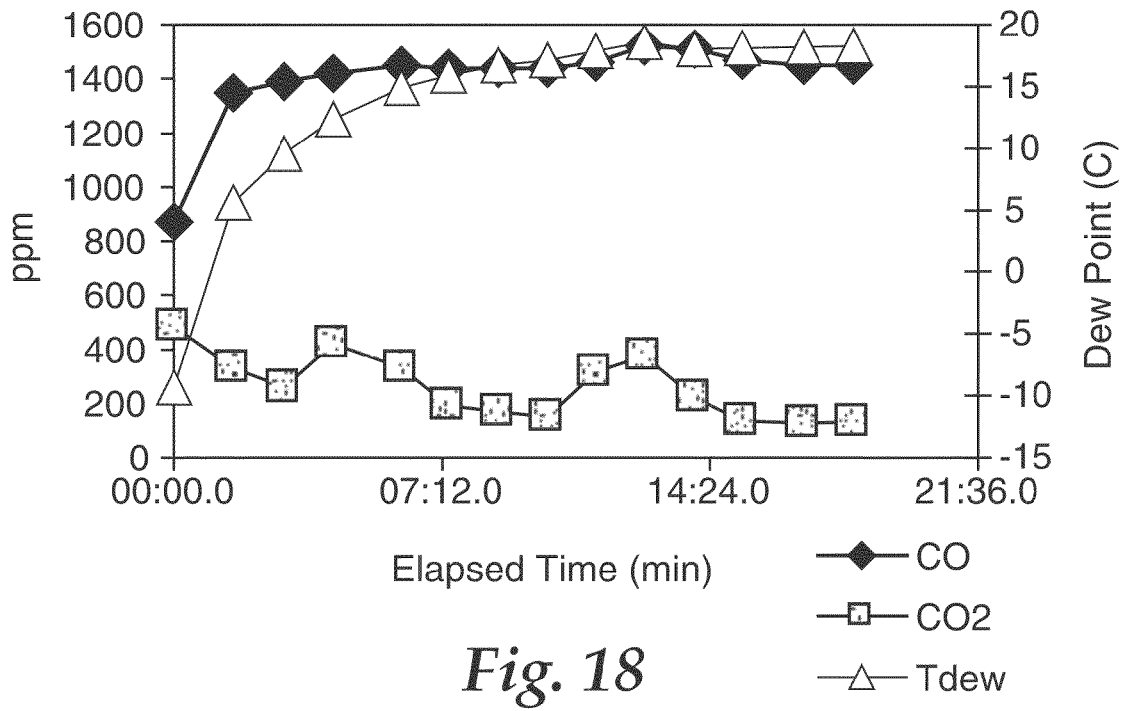
FIG. 18 is a graph showing catalytic characteristics of a sample, wherein the ability of the sample to catalytically oxidize CO to $CO_2$ in a flow containing CO in air is depicted as a function of time.

The performance of the catalyst of example 13 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 18.

Example 14

Preparation of Potassium Phosphate Impregnated Gamma Alumina Particles

A solution of potassium phosphate was prepared by dissolving 13.93 g of $K_2HPO_4$ (Aldrich Chemical Co., Milwaukee, Wis.) in sufficient deionized water to yield a volume of 200 ml. A sample of gamma alumina particles A (300 ml volume of particles, 224.14 g) was impregnated by the incipient wetness technique using about 150 ml of the 0.4 M $K_2HPO_4$. After impregnation, the particles were dried in an oven at 100° C. After drying the impregnated particles were gold treated via plasma-assisted sputtering (deposition condition 2).

Figure 19:
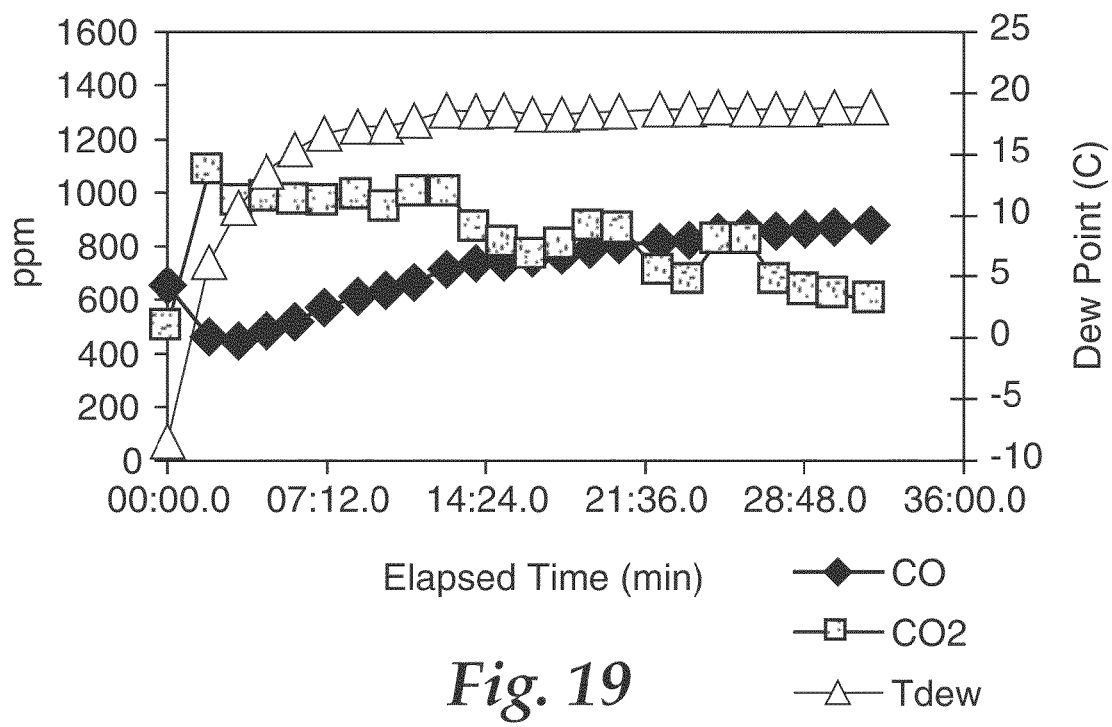
FIG. 19 is a graph showing catalytic characteristics of a sample, wherein the ability of the sample to catalytically oxidize CO to $CO_2$ in a flow containing CO in air is depicted as a function of time.

The performance of the catalyst of example 14 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 19.

Example 15

Preparation of Barium Impregnated Gamma Alumina Particles—Dried at 130° C.

The incipient wetness technique was used to impregnate A-type gamma alumina particles with 0.4 M barium nitrate (Certified A.C.S., Fisher Scientific Co., Fair Lawn, N.J.) solution as the impregnation solution. This impregnation involved impregnating 224.1 g of the gamma alumina with 148 ml of a solution prepared by dissolving 20.9 g of barium nitrate in deionized water to yield a final volume of 200 mls. After drying at 130° C. the sample was treated with gold via plasma-assisted sputtering (deposition condition 2).

Figure 20:
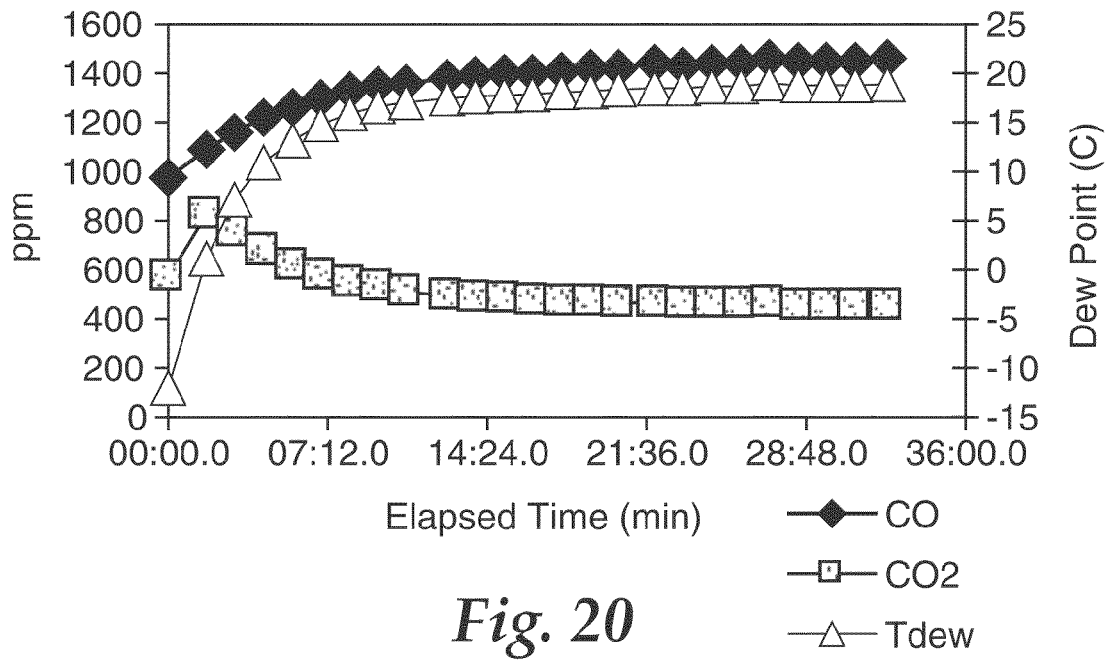
FIG. 20 is a graph showing catalytic characteristics of a sample, wherein the ability of the sample to catalytically oxidize CO to $CO_2$ in a flow containing CO in air is depicted as a function of time.

The performance of the catalyst of example 15 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 20.

Example 16

Preparation of Barium Impregnated Gamma Alumina Particles—Calcined to 300° C.

The incipient wetness technique was used to impregnate A-type gamma alumina particles with 0.4 M barium nitrate (Certified A.C.S., Fisher Scientific Co., Fair Lawn, N.J.) solution as the impregnation solution exactly as described in example 12. After drying at 130° C., a portion of the sample was calcined to 300° C. and held at 300° C. for 1 hour before allowing to cool with the furnace. After cooling, the sample was treated with gold via plasma-assisted sputtering (deposition condition 2).

Figure 21:
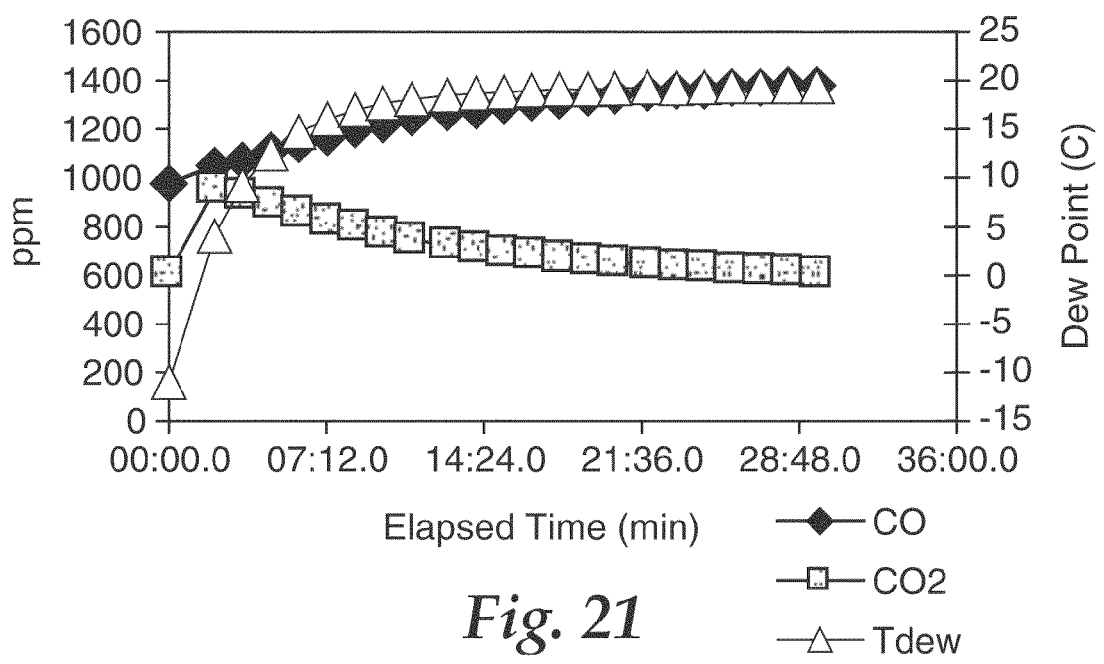
FIG. 21 is a graph showing catalytic characteristics of a sample, wherein the ability of the sample to catalytically oxidize CO to $CO_2$ in a flow containing CO in air is depicted as a function of time.

The performance of the catalyst of example 16 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 21.

Example 17

Preparation of Barium Impregnated Gamma Alumina Particles—Calcined to 600° C.

The incipient wetness technique was used to impregnate A-type gamma alumina particles with 0.4 M barium nitrate (Certified A.C.S., Fisher Scientific Co., Fair Lawn, N.J.) solution as the impregnation solution exactly as described in example 12. After drying at 130° C., a portion of the sample was calcined to 600° C. and held at 600° C. for one hour. After cooling, the sample was treated with gold via plasma-assisted sputtering (deposition condition 2).

Figure 22:
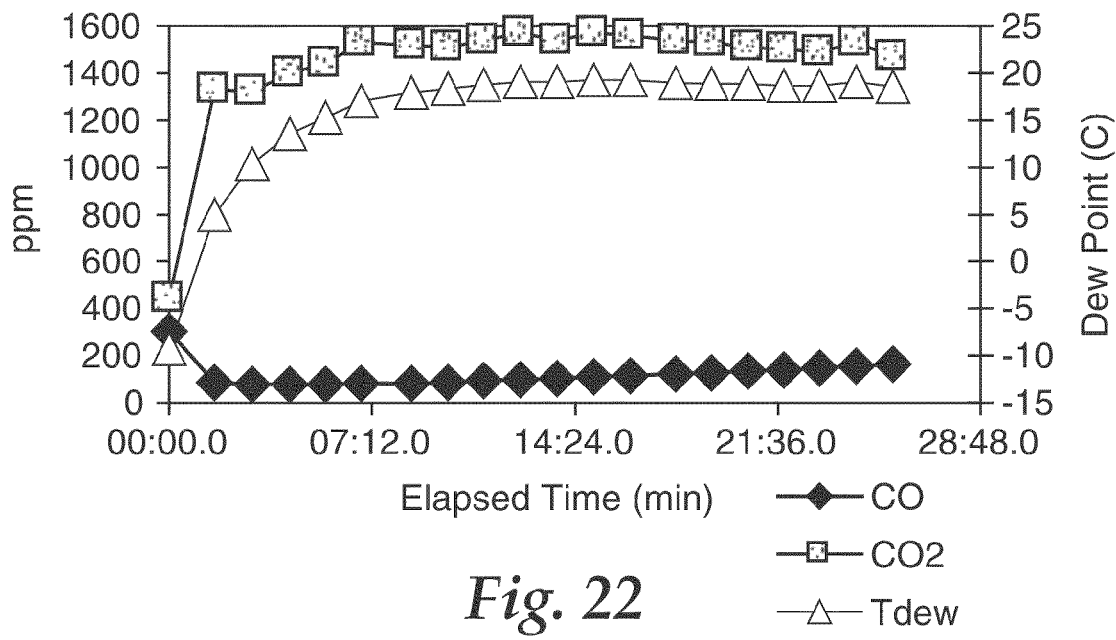
FIG. 22 is a graph showing catalytic characteristics of a sample, wherein the ability of the sample to catalytically oxidize CO to $CO_2$ in a flow containing CO in air is depicted as a function of time.

The performance of the catalyst of example 17 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 22.

Comparison of the results of example 17 with those of example 16 and example 15 demonstrate that the activating effect of barium nitrate is strongly manifested after the impregnated support was heated to 600° C.

Example 18

Preparation of Potassium Carbonate Treated—Barium Impregnated Gamma Alumina Particles—Calcined to 600° C.

The incipient wetness technique was used to impregnate A-type gamma alumina particles with 0.4 M barium nitrate (Certified A.C.S., Fisher Scientific Co., Fair Lawn, N.J.) solution as the impregnation solution exactly as described in example 12. After drying at 130° C., a portion of the sample was calcined to 600° C. and held at 600° C. for one hour. After cooling, this sample was impregnated with 0.5 M $K_2CO_3$ by incipient wetness. The sample was dried at 130° C. and treated with gold according to deposition condition 2.

Figure 23:
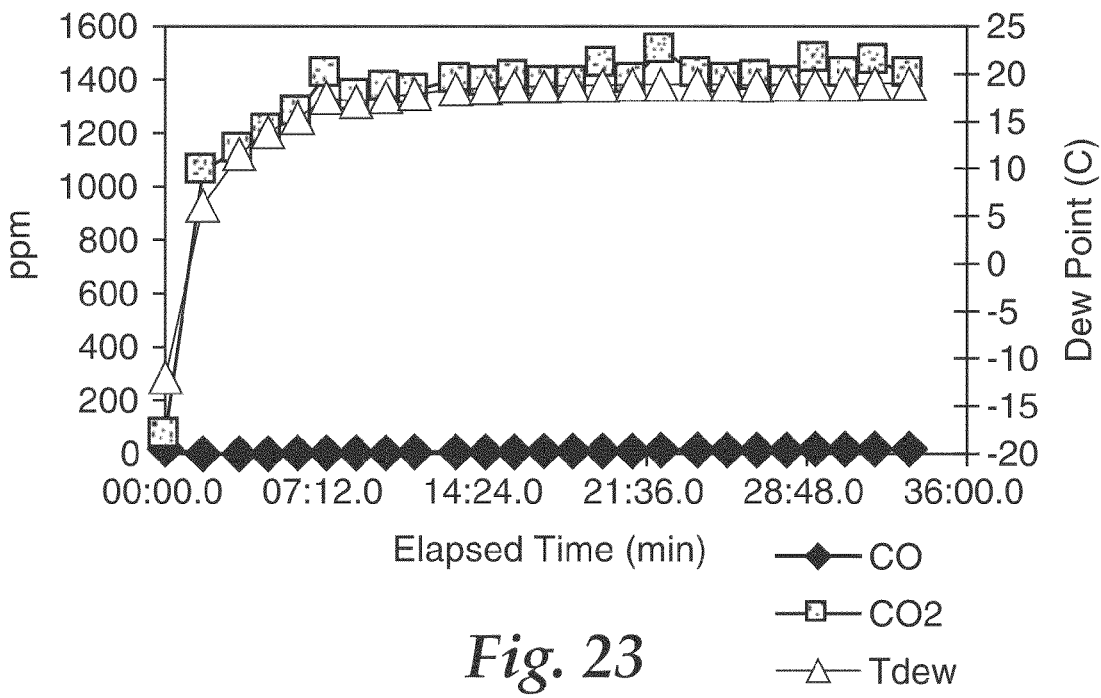
FIG. 23 is a graph showing catalytic characteristics of a sample, wherein the ability of the sample to catalytically oxidize CO to $CO_2$ in a flow containing CO in air is depicted as a function of time.

The performance of the catalyst of example 18 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 23.

Comparison of the results of testing the material of example 18 with the results of testing the material of example 17 show that improvement in catalytic performance can be attained by using a combination of activating agents.

Example 19

Preparation of Magnesium Impregnated Gamma Alumina Particles—Dried at 130° C.

The incipient wetness technique was used to impregnate A-type gamma alumina particles with 0.4 M magnesium nitrate hexahydrate (Alfa Aesar, Ward Hill, Mass.) solution. The solution for impregnation was prepared by dissolving 20.51 g of the magnesium nitrate hexahydrate in deionized water to yield a final volume of 200 ml. 148 ml of this solution was used to impregnate 224.14 g of the alumina particles. After drying at 130° C. the sample was treated with gold via plasma-assisted sputtering (deposition condition 2).

Figure 24:
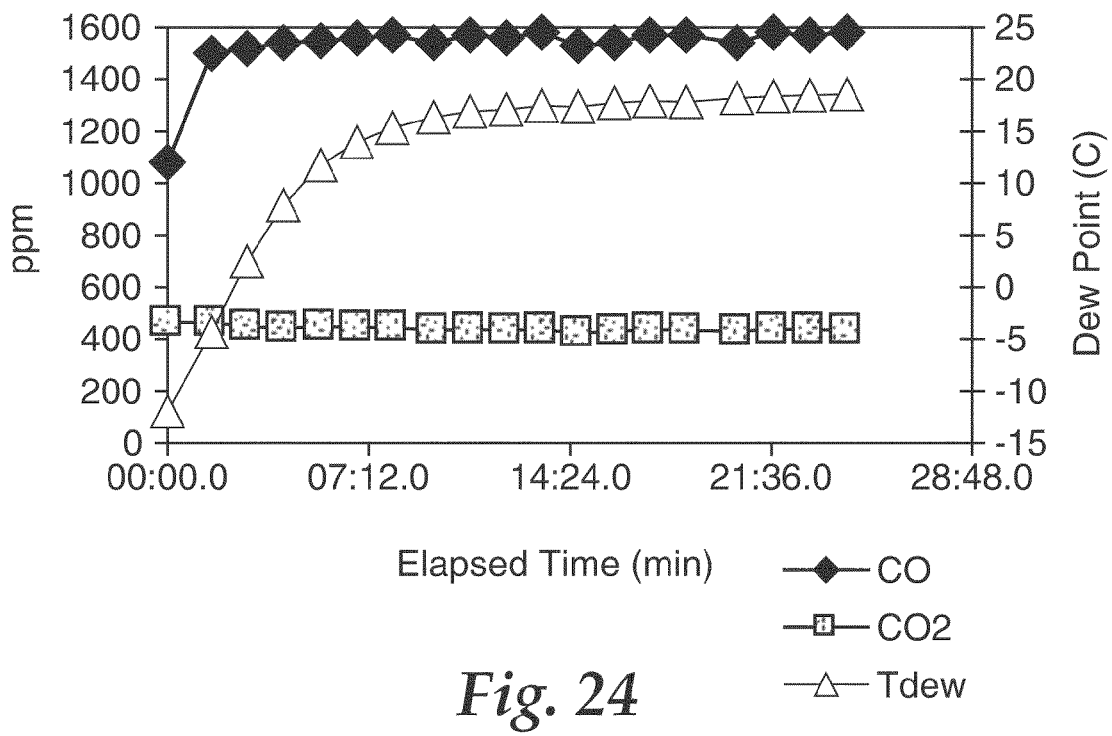
FIG. 24 is a graph showing catalytic characteristics of a sample, wherein the ability of the sample to catalytically oxidize CO to $CO_2$ in a flow containing CO in air is depicted as a function of time.

The performance of the catalyst of example 19 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 24.

Example 20

Preparation of Magnesium Impregnated Gamma Alumina Particles—Calcined to 300° C.

The incipient wetness technique was used to impregnate A-type gamma alumina particles with 0.4 M magnesium nitrate (Alfa Aesar, Ward Hill, Mass.) solution as described in example 16. After drying at 130° C., a portion of the sample was calcined to 300° C. and held at 300° C. for 1 hour before allowing to cool with the furnace. After cooling, the sample was treated with gold via plasma-assisted sputtering (deposition condition 2).

Figure 25:
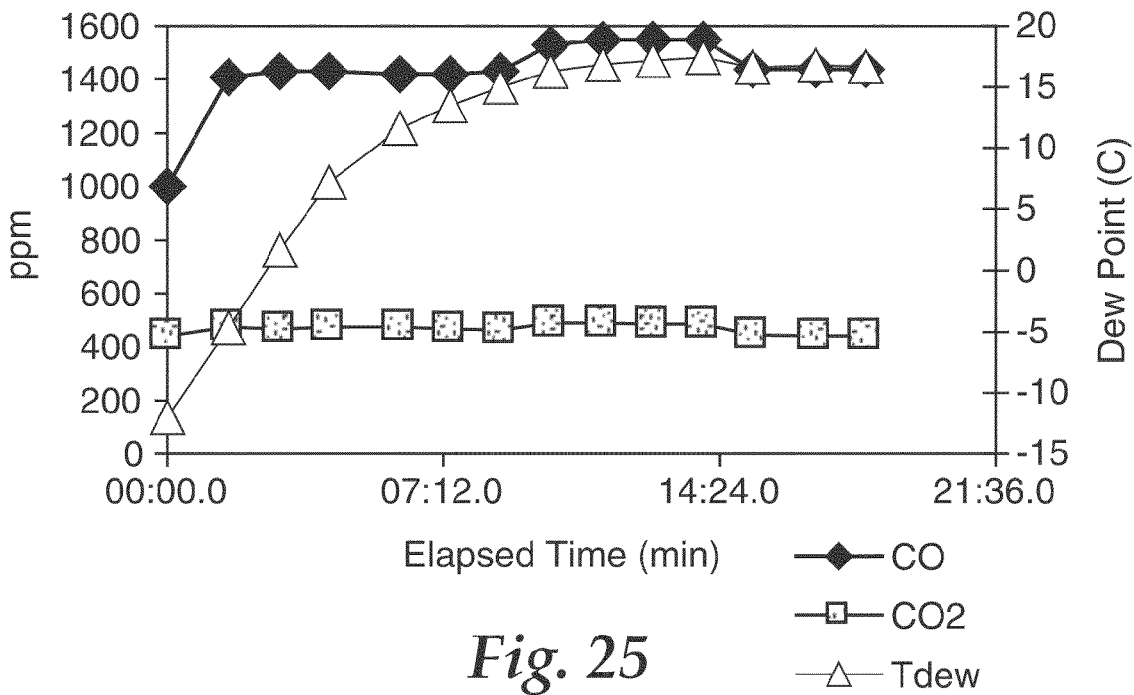
FIG. 25 is a graph showing catalytic characteristics of a sample, wherein the ability of the sample to catalytically oxidize CO to $CO_2$ in a flow containing CO in air is depicted as a function of time.

The performance of the catalyst of example 20 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 25.

Example 21

Preparation of Magnesium Impregnated Gamma Alumina Particles—Calcined to 600° C.

The incipient wetness technique was used to impregnate A-type gamma alumina particles with 0.4 M magnesium nitrate (Alfa Aesar, Ward Hill, Mass.) solution as described in example 16. After drying at 130° C., a portion of the sample was calcined to 600° C. and held at 600° C. for one hour. After cooling, the sample was treated with gold via plasma-assisted sputtering (deposition condition 2).

Figure 26:
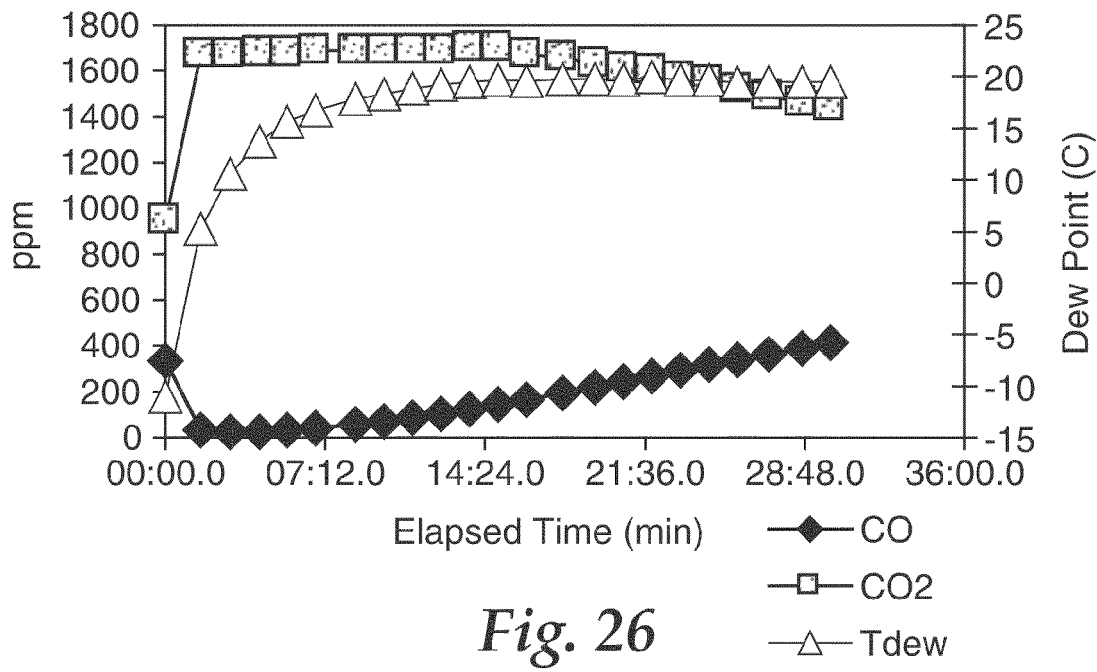
FIG. 26 is a graph showing catalytic characteristics of a sample, wherein the ability of the sample to catalytically oxidize CO to $CO_2$ in a flow containing CO in air is depicted as a function of time.

The performance of the catalyst of example 21 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 26.

Comparison of the results of example 21 with those of example 20 and example 19 demonstrate that the activating effect of magnesium nitrate is strongly manifested after the impregnated support was heated to 600° C.

Example 22

Preparation of Calcium Impregnated Gamma Alumina Particles—Dried at 130° C.

The incipient wetness technique was used to impregnate A-type gamma alumina particles with a solution of 0.4 M calcium nitrate. To prepare the impregnation solution, 18.89 g of calcium nitrate tetrahydrate (BAKER ANALYZED®, J. T. Baker, Co., Phillipsburg, N.J.) was dissolved in deionized water to yield a volume of 200 ml. 148 ml of this solution was impregnated into 224.14 g of the gamma alumina particles.

After drying at 130° C. the sample was treated with gold via plasma-assisted sputtering (deposition condition 2).

Figure 27:
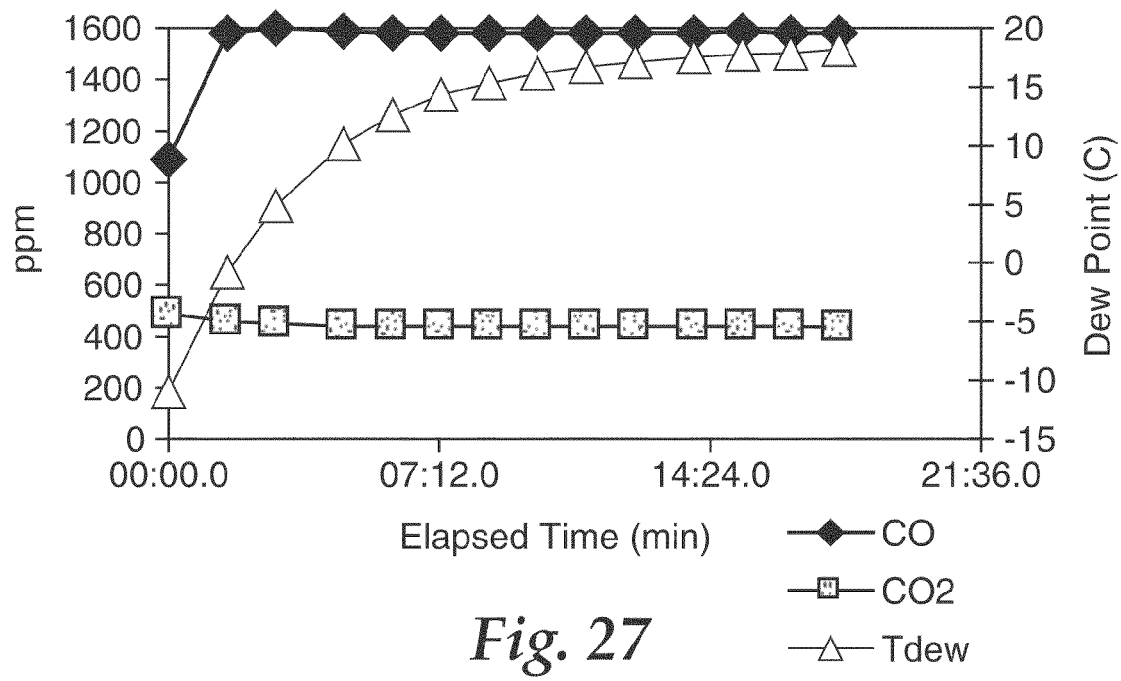
FIG. 27 is a graph showing catalytic characteristics of a sample, wherein the ability of the sample to catalytically oxidize CO to $CO_2$ in a flow containing CO in air is depicted as a function of time.

The performance of the catalyst of example 22 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 27.

Example 23

Preparation of Calcium Impregnated Gamma Alumina Particles—Calcined to 300° C.

The incipient wetness technique was used to impregnate A-type gamma alumina particles with a solution of 0.4 M calcium nitrate (calcium nitrate tetrahydrate, BAKER ANALYZED®, J. T. Baker, Co., Phillipsburg, N.J.) as described in example 19. After drying at 130° C., a portion of the sample was calcined to 300° C. and held at 300° C. for 1 hour before allowing to cool with the furnace. After cooling, the sample was treated with gold via plasma-assisted sputtering (deposition condition 2).

Figure 28:
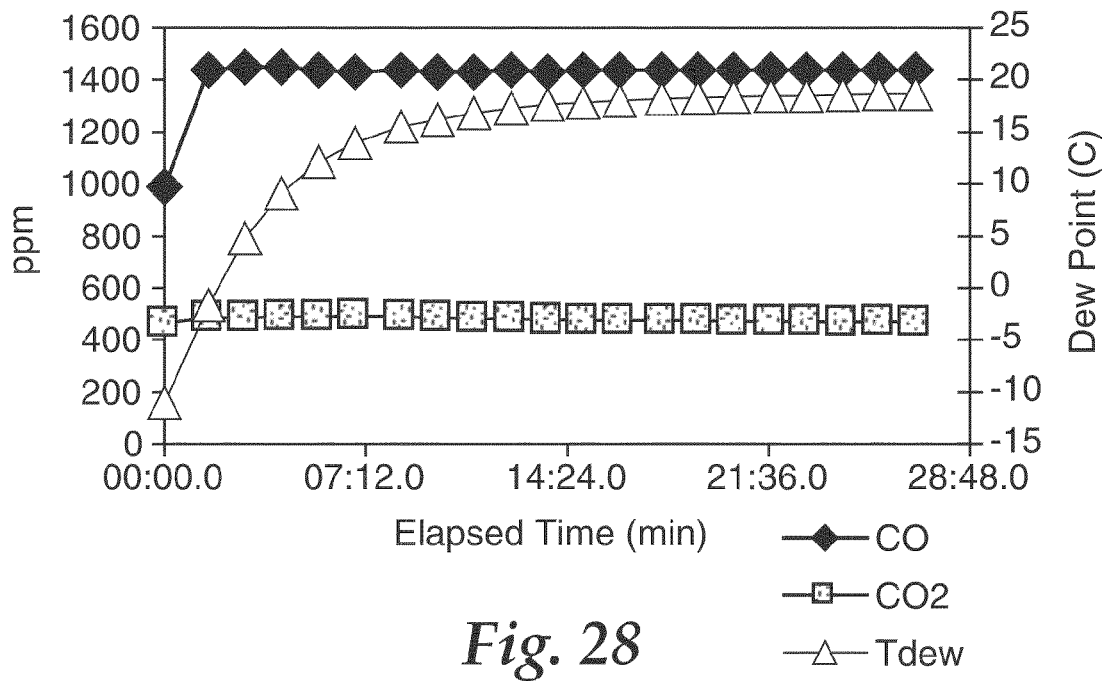
FIG. 28 is a graph showing catalytic characteristics of a sample, wherein the ability of the sample to catalytically oxidize CO to $CO_2$ in a flow containing CO in air is depicted as a function of time.

The performance of the catalyst of example 23 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 28.

Example 24

Preparation of Calcium Impregnated Gamma Alumina Particles—Calcined to 600° C.

The incipient wetness technique was used to impregnate A-type gamma alumina particles with a solution of 0.4 M calcium nitrate (calcium nitrate tetrahydrate, BAKER ANALYZED®, J. T. Baker, Co., Phillipsburg, N.J.) as described in example 19. After drying at 130° C., a portion of the sample was calcined to 600° C. and held at 600° C. for one hour. After cooling, the sample was treated with gold via plasma-assisted sputtering (deposition condition 2).

Figure 29:
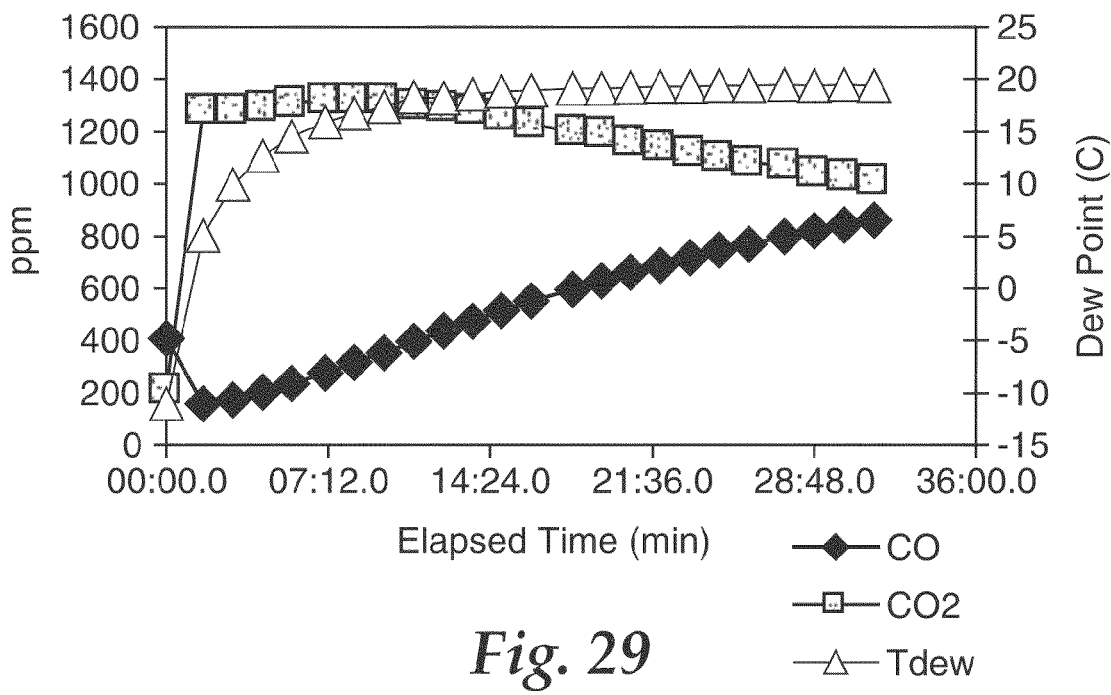
FIG. 29 is a graph showing catalytic characteristics of a sample, wherein the ability of the sample to catalytically oxidize CO to $CO_2$ in a flow containing CO in air is depicted as a function of time.

The performance of the catalyst of example 24 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 29.

Comparison of the results of example 24 with those of example 23 and example 22 demonstrate that the activating effect of calcium nitrate is manifested after the impregnated support was heated to 600° C.

Example 25

Preparation of Potassium Carbonate-Treated, Calcium Impregnated Gamma Alumina Particles—Calcined to 600° C.

The incipient wetness technique was used to impregnate A-type gamma alumina particles with a solution of 0.4 M calcium nitrate (calcium nitrate tetrahydrate, BAKER ANALYZED®, J. T. Baker, Co., Phillipsburg, N.J.) as described in example 19. After drying at 130° C., a portion of the sample was calcined to 600° C. and held at 600° C. for one hour. After cooling, the sample was impregnated by incipient wetness using a 0.5 M solution of potassium carbonate. The resulting calcium and potassium treated particles were dried at 135° C. overnight and treated with gold via plasma-assisted sputtering (deposition condition 2).

Figure 30:
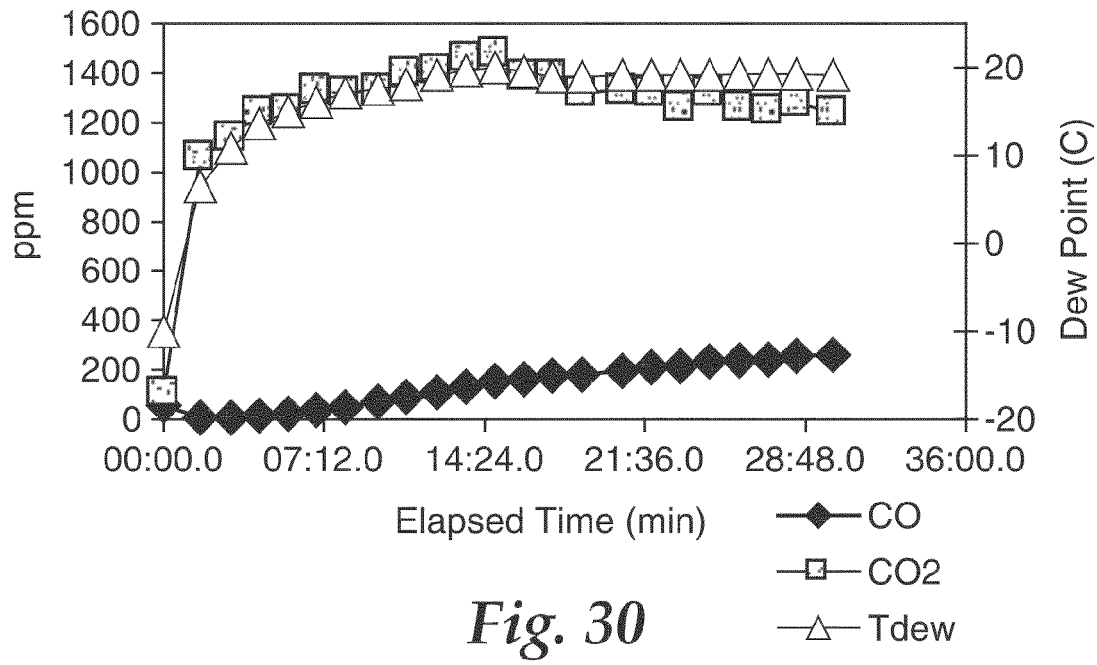
FIG. 30 is a graph showing catalytic characteristics of a sample, wherein the ability of the sample to catalytically oxidize CO to $CO_2$ in a flow containing CO in air is depicted as a function of time.

The performance of the catalyst of example 25 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 30.

Example 26

Preparation of Iron Impregnated Gamma Alumina Particles

The incipient wetness technique was used to impregnate A-type gamma alumina particles with a solution of 0.4 M iron nitrate nonahydrate. To make the iron nitrate solution, 32.32 g of $Fe(NO_3)_3 \cdot 9H_2O$ (Certified A.C.S., Fisher Scientific Co., Fair Lawn, N.J.) was dissolved in deionized water to yield a final volume of 200 ml. 224.14 g of gamma alumina A particles were impregnated with the iron nitrate solution. After drying at 130° C., the sample was calcined to 600° C. and held at 600° C. for 1 hour. After calcining the impregnated particles were gold treated via plasma-assisted sputtering (deposition condition 2).

Figure 31:
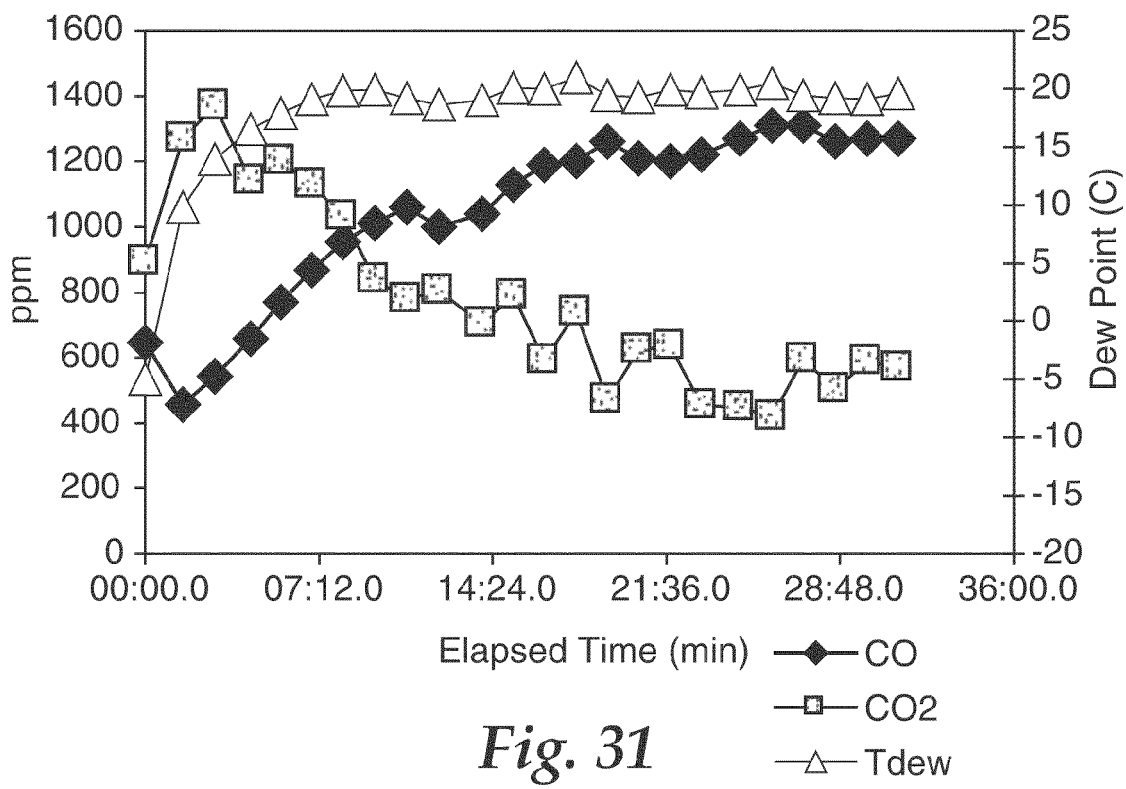
FIG. 31 is a graph showing catalytic characteristics of a sample, wherein the ability of the sample to catalytically oxidize CO to $CO_2$ in a flow containing CO in air is depicted as a function of time.

The performance of the catalyst of example 26 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 31.

Example 27

Preparation of Manganese Impregnated Gamma Alumina Particles

The incipient wetness technique was used to impregnate A-type gamma alumina particles with 148 ml of a solution of 50% manganese nitrate (Fisher Scientific Co., Fair Lawn, N.J.). 224.14 g of gamma alumina A particles were impregnated with the manganese nitrate solution. After drying at 130° C., the sample was calcined to 600° C. and held at 600° C. for 1 hour. After calcining the impregnated particles were gold treated via plasma-assisted sputtering (deposition condition 2).

Figure 32:
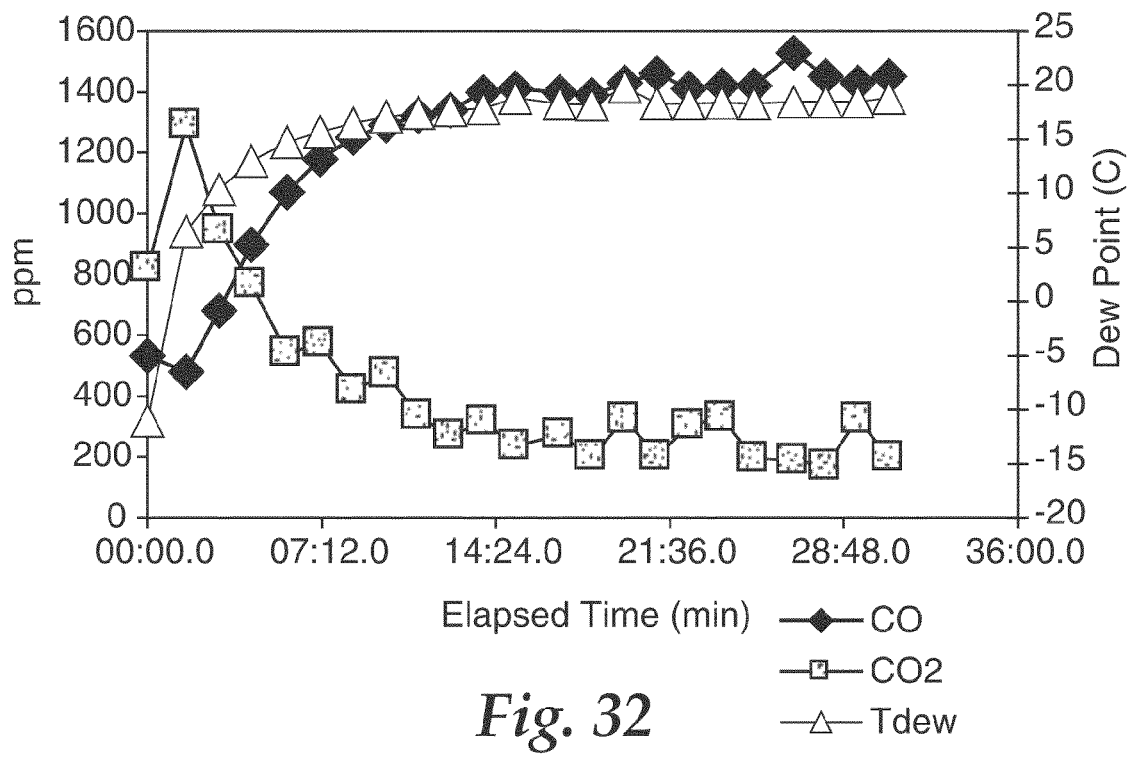
FIG. 32 is a graph showing catalytic characteristics of a sample, wherein the ability of the sample to catalytically oxidize CO to $CO_2$ in a flow containing CO in air is depicted as a function of time.

The performance of the catalyst of example 27 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 32.

Example 28

Preparation of Cobalt Impregnated Gamma Alumina Particles

The incipient wetness technique was used to impregnate A-type gamma alumina particles with a solution of 0.4 M cobalt nitrate hexahydrate. To make the cobalt nitrate solution, 23.28 g of $Co(NO_3)_2 \cdot 6H_2O$ (analytical reagent grade, Mallinkrodt Inc., Paris, Ky.) was dissolved in deionized water to yield a final volume of 200 ml. 224.14 g of gamma alumina A particles were impregnated with the cobalt nitrate solution.

After drying the impregnated particles at 130° C., a portion of the sample was calcined to 600° C. and held at 600° C. for 1 hour. After calcining the impregnated particles were gold treated via plasma-assisted sputtering (deposition condition 2).

Figure 33:
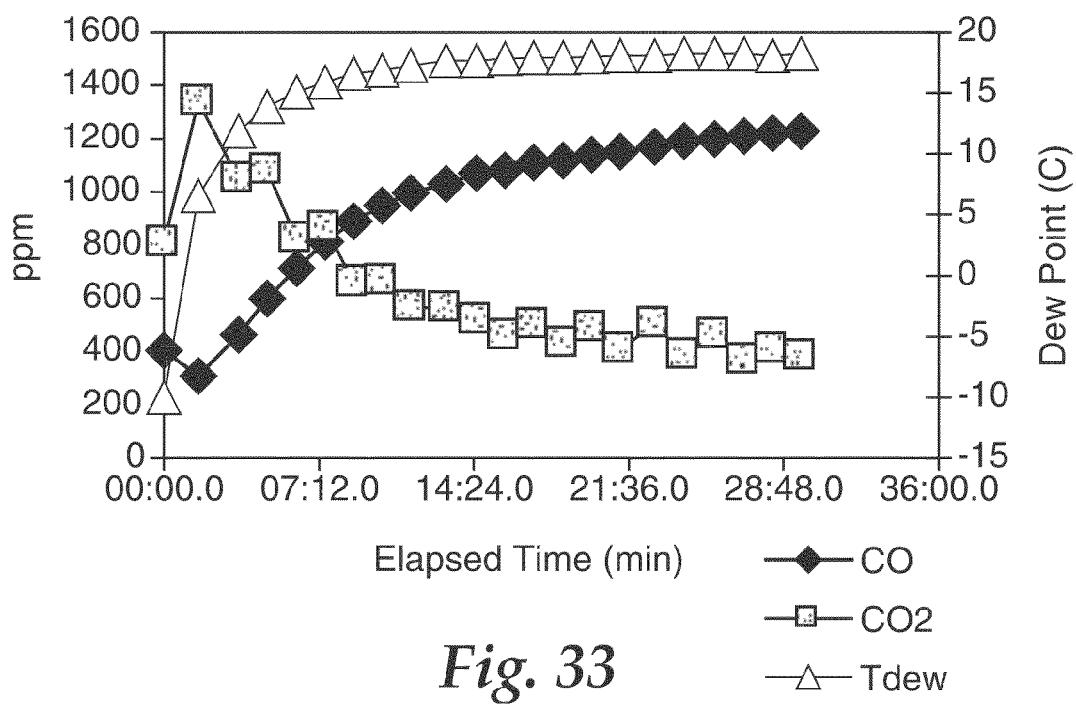
FIG. 33 is a graph showing catalytic characteristics of a sample, wherein the ability of the sample to catalytically oxidize CO to $CO_2$ in a flow containing CO in air is depicted as a function of time.

The performance of the catalyst of example 28 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 33.

Example 29

Preparation of Copper Impregnated Gamma Alumina Particles

The incipient wetness technique was used to impregnate A-type gamma alumina particles with a solution of 0.4 M copper (II) nitrate 2.5 hydrate. To make the copper nitrate solution, 18.61 g of $Cu(NO_3)_2.2.5H_2O$ (BAKER ANALYZED®, J. T. Baker, Co., Phillipsburg, N.J.) was dissolved in deionized water to yield a final volume of 200 ml. 224.14 g of gamma alumina A particles were impregnated with the copper nitrate solution. After drying the impregnated particles at 130° C., a portion of the sample was calcined to 600° C. and held at 600° C. for 1 hour. After calcining the impregnated particles were gold treated via plasma-assisted sputtering (deposition condition 2).

Figure 34:
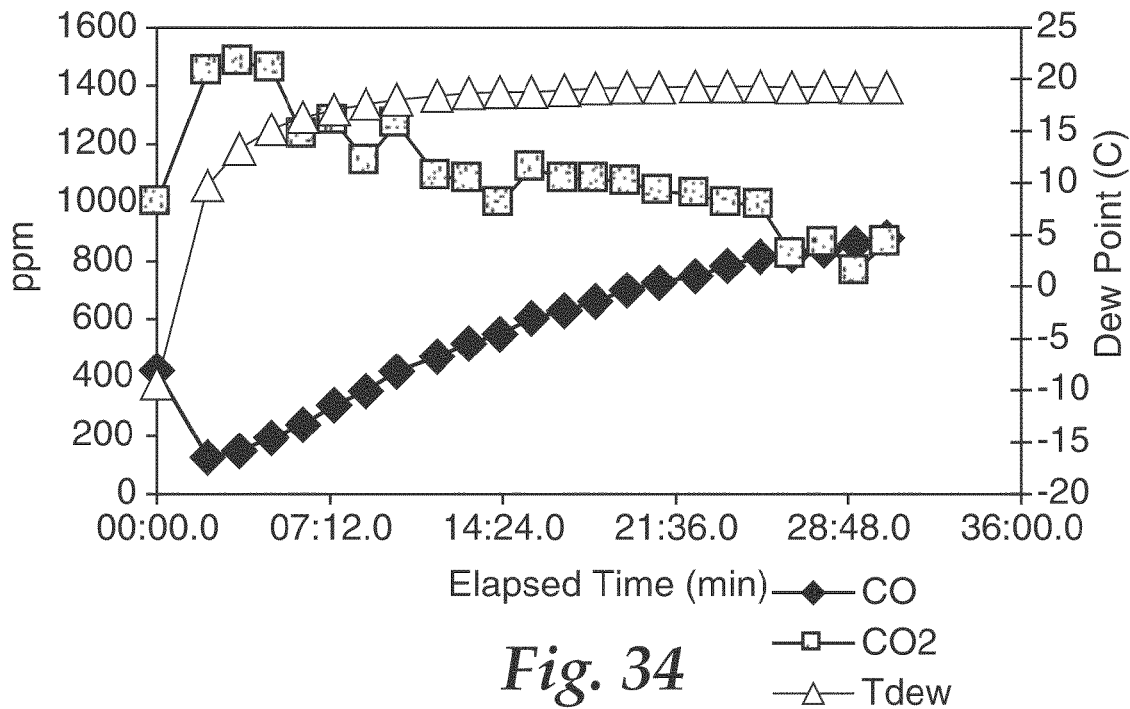
FIG. 34 is a graph showing catalytic characteristics of a sample, wherein the ability of the sample to catalytically oxidize CO to $CO_2$ in a flow containing CO in air is depicted as a function of time.

The performance of the catalyst of example 29 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 34.

Example 30

Preparation of Nickel Impregnated Gamma Alumina Particles

The incipient wetness technique was used to impregnate A-type gamma alumina particles with a solution of 0.4 M nickel nitrate hexahydrate. To make the nickel nitrate solution, 23.26 g of $Ni(NO_3)_2.6H_2O$ (Cobalt low, certified, Fisher Scientific Company, Fair Lawn, N.J.) was dissolved in deionized water to yield a final volume of 200 ml. 224.14 g of gamma alumina A particles were impregnated with the nickel nitrate solution. After drying the impregnated particles at 130° C., a portion of the sample was calcined to 600° C. and held at 600° C. for 1 hour. After calcining the impregnated particles were gold treated via plasma-assisted sputtering (deposition condition 2).

Figure 35:
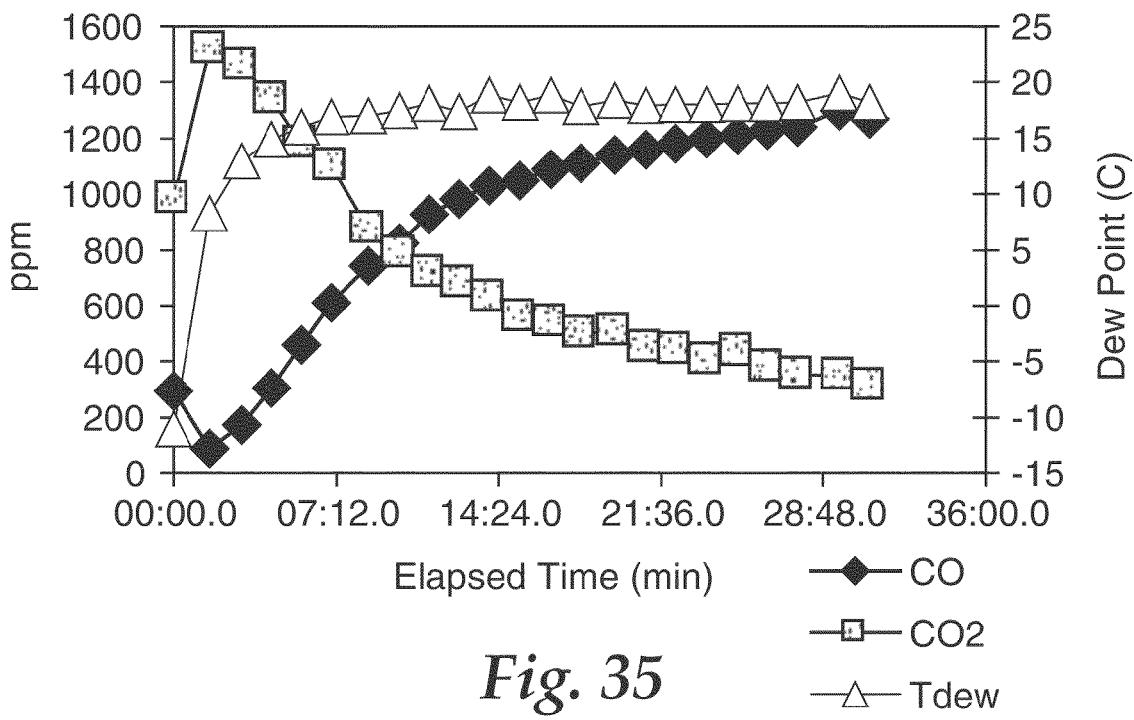
FIG. 35 is a graph showing catalytic characteristics of a sample, wherein the ability of the sample to catalytically oxidize CO to $CO_2$ in a flow containing CO in air is depicted as a function of time.

The performance of the catalyst of example 30 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 35.

Example 31

Preparation of Chromium Impregnated Gamma Alumina Particles

The incipient wetness technique was used to impregnate A-type gamma alumina particles with a solution of 0.4 M chromium nitrate nonahydrate. To make the chromium nitrate solution, 32.01 g of $Cr(NO_3)_3.9H_2O$ (Reagent grade, Matheson, Coleman and Bell, Norwood, Ohio) was dissolved in deionized water to yield a final volume of 200 ml. 224.14 g of gamma alumina A particles were impregnated with the chromium nitrate solution. After drying the impregnated particles at 130° C., a portion of the sample was calcined to 600° C. and held at 600° C. for 1 hour. After calcining the impregnated particles were gold treated via plasma-assisted sputtering (deposition condition 2).

Figure 36:
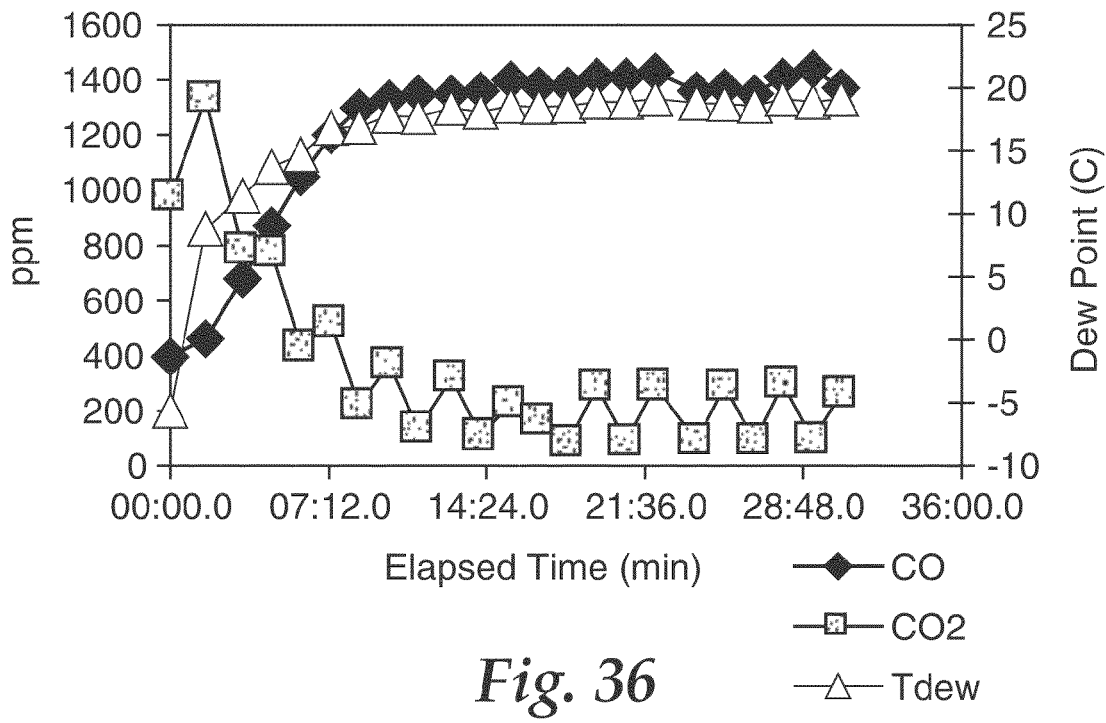
FIG. 36 is a graph showing catalytic characteristics of a sample, wherein the ability of the sample to catalytically oxidize CO to $CO_2$ in a flow containing CO in air is depicted as a function of time.

The performance of the catalyst of example 31 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 36.

Example 32

Preparation of Zinc Impregnated Gamma Alumina Particles

The incipient wetness technique was used to impregnate A-type gamma alumina particles with a solution of 0.4 M zinc nitrate hexahydrate. To make the zinc nitrate solution, 23.80 g of $Zn(NO_3)_2.6H_2O$ (BAKER ANALYZED Reagent,® Mallinkrodt Baker, Inc., Phillipsburg, N.J.) was dissolved in deionized water to yield a final volume of 200 ml. 224.14 g of gamma alumina A particles were impregnated with the zinc nitrate solution. After drying the impregnated particles at 130° C., a portion of the sample was calcined to 600° C. and held at 600° C. for 1 hour. After calcining the impregnated particles were gold treated via plasma-assisted sputtering (deposition condition 2).

Figure 37:
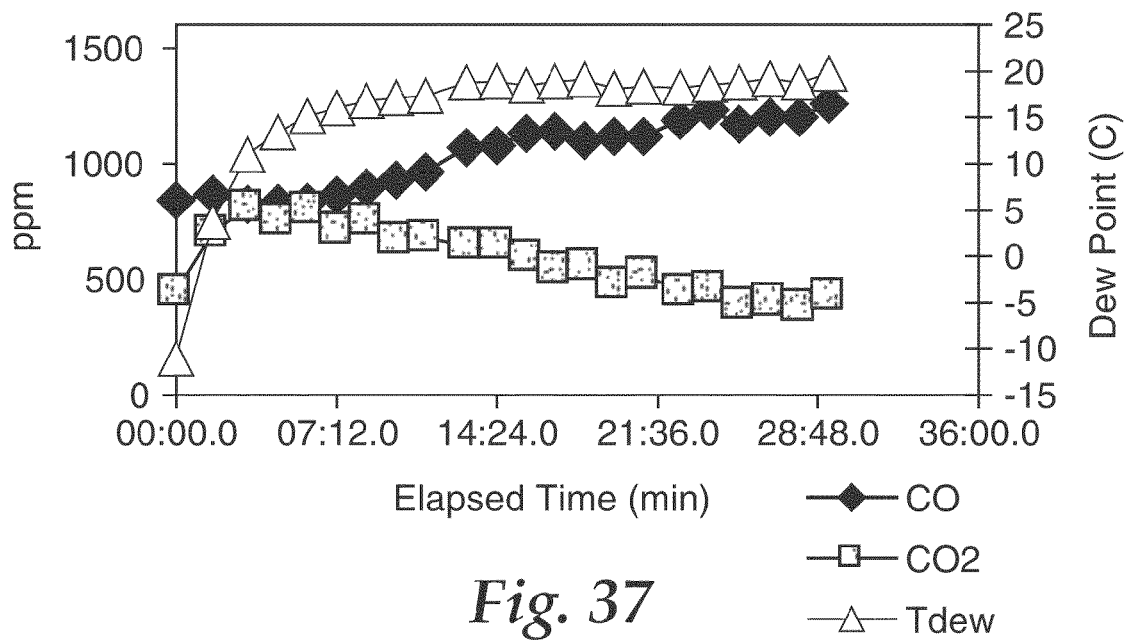
FIG. 37 is a graph showing catalytic characteristics of a sample, wherein the ability of the sample to catalytically oxidize CO to $CO_2$ in a flow containing CO in air is depicted as a function of time.

The performance of the catalyst of example 32 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 37.

Example 33

Preparation of Titanium and Potassium Impregnated Gamma Alumina Particles

The incipient wetness technique was used to impregnate A-type gamma alumina particles with a solution of Tyzor LA™ titanium lactate solution containing potassium carbonate. To make the titanium lactate/potassium carbonate solution, 6.91 g of $K_2CO_3$ was dissolved in 200 ml of Tyzor LA titanium lactate (E. I. Du Pont de Nemours Co., Willmington, Del.: Tyzor LA is nominally 13.7% by weight $TiO_2$ equivalent). 224.14 g of gamma alumina A particles were impregnated with about 148 ml of the Tyzor LA/potassium carbonate solution. After drying the impregnated particles at 130° C., a portion of the sample was calcined to 600° C. and held at 600° C. for 1 hour. After calcining the impregnated particles were gold treated via plasma-assisted sputtering (deposition condition 2).

Figure 38:
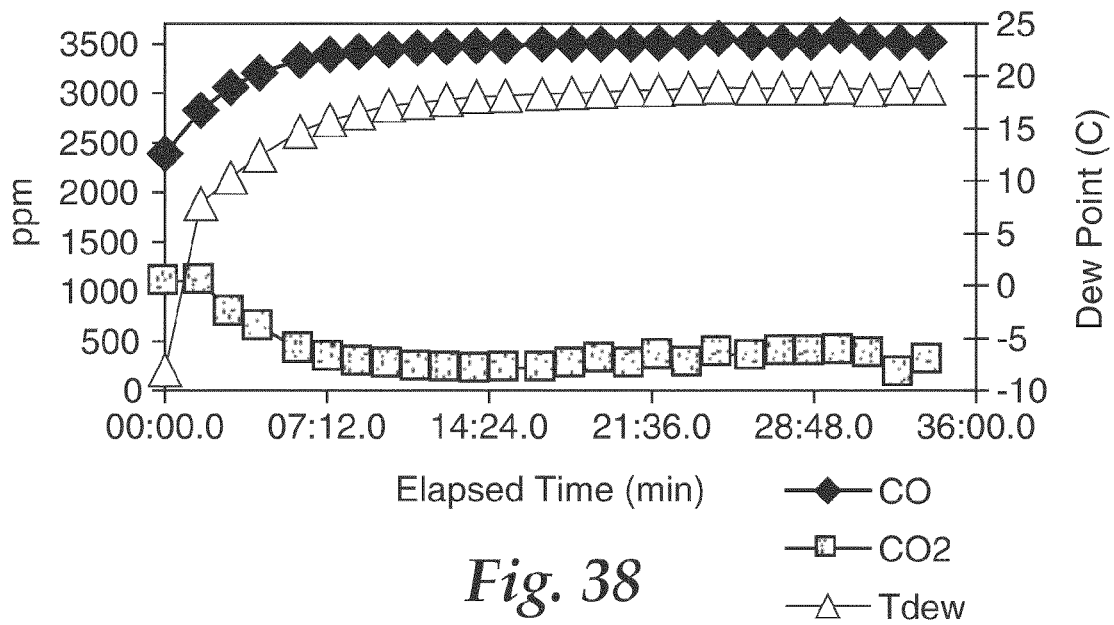
FIG. 38 is a graph showing catalytic characteristics of a sample, wherein the ability of the sample to catalytically oxidize CO to $CO_2$ in a flow containing CO in air is depicted as a function of time.

The sample was examined by TEM as previously described. The approximate size range of Au particles in a representative region of the sample was 3.2 to 32 nm. The average size of Au particles was 9 nm and the approximate range of depth into the substrate was 33 to 60 nm. The performance of the catalyst of example 33 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 38.

Metal Oxide-Coated Substrates

Example 34

Preparation of Titanium Oxide-Coated Alumina Particles

A solution of tetraisopropyltitanate (TPT) in isopropyl alcohol was prepared by mixing 30 ml of tetraisopropyltitanate (Gelest, Inc., Tullytown, Pa.) with sufficient isopropyl alcohol to yield a final volume of 148 ml. This solution was impregnated by incipient wetness into 224.14 g of the B-type alumina particles. After impregnation the particles were spread out onto a 30×21 cm aluminum tray and were allowed to hydrolyze in air for about 2 hours. During this time the particles were gently stirred every 10 minutes using a spatula. The tray of air hydrolyzed-TPT-treated particles was transferred into an oven and dried at about 150° C. overnight. After drying, the titanium oxide-coated particles were calcined at 500° C. (time at temperature=1 hour, heating rate from room temperature to 500° C.=1.6° C./min.). After cooling these particles were gold treated via sputtering (deposition condition 2).

Figure 39:
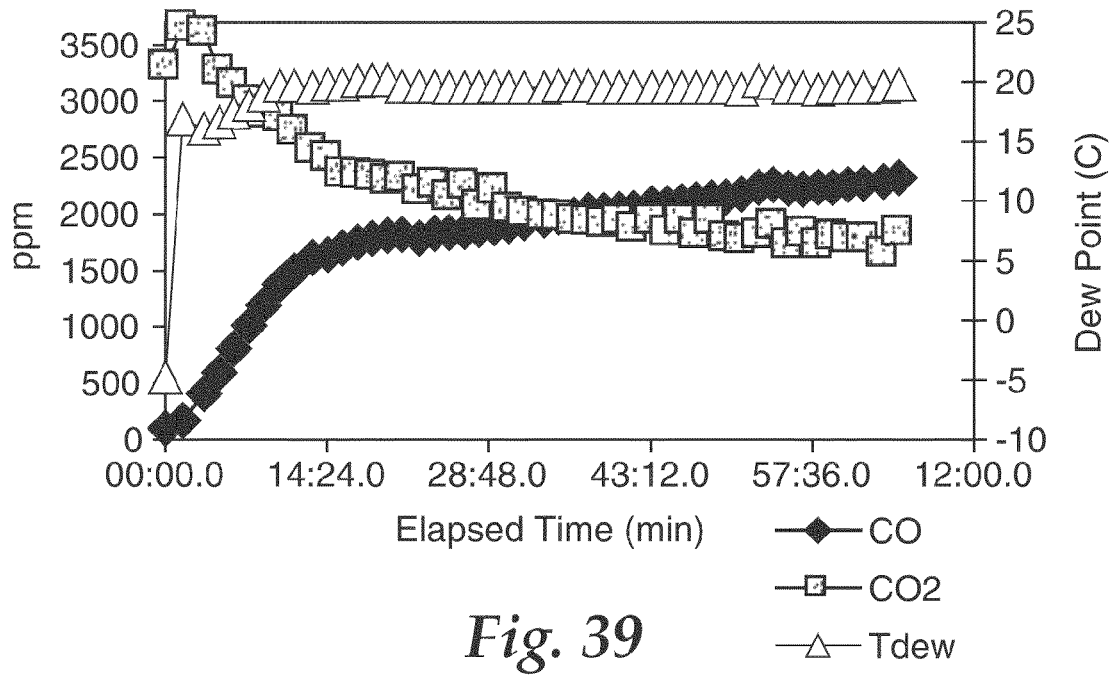
FIG. 39 is a graph showing catalytic characteristics of a sample, wherein the ability of the sample to catalytically oxidize CO to $CO_2$ in a flow containing CO in air is depicted as a function of time.

The performance of the catalyst of example 34 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 39.

Example 35

Preparation of Titanium Oxide-Coated Alumina Particles with Liquid Water Hydrolysis Titania-coated alumina particles were prepared as described in example 31 with the exception that rather than allowing the tetraisopropyltitanate to hydrolyze in air prior to drying, after the treatment with the TPT-isopropyl alcohol mixture, the particles were washed twice with 500 ml of deionized water. The particles were then dried at 150° C. overnight. After drying, the titanium oxide-coated particles were calcined at 500° C. (time at temperature=1 hour, heating rate from room temperature to 500° C.=1.6° C./min.). After cooling these particles were gold treated via sputtering (deposition condition 2).

Figure 40:
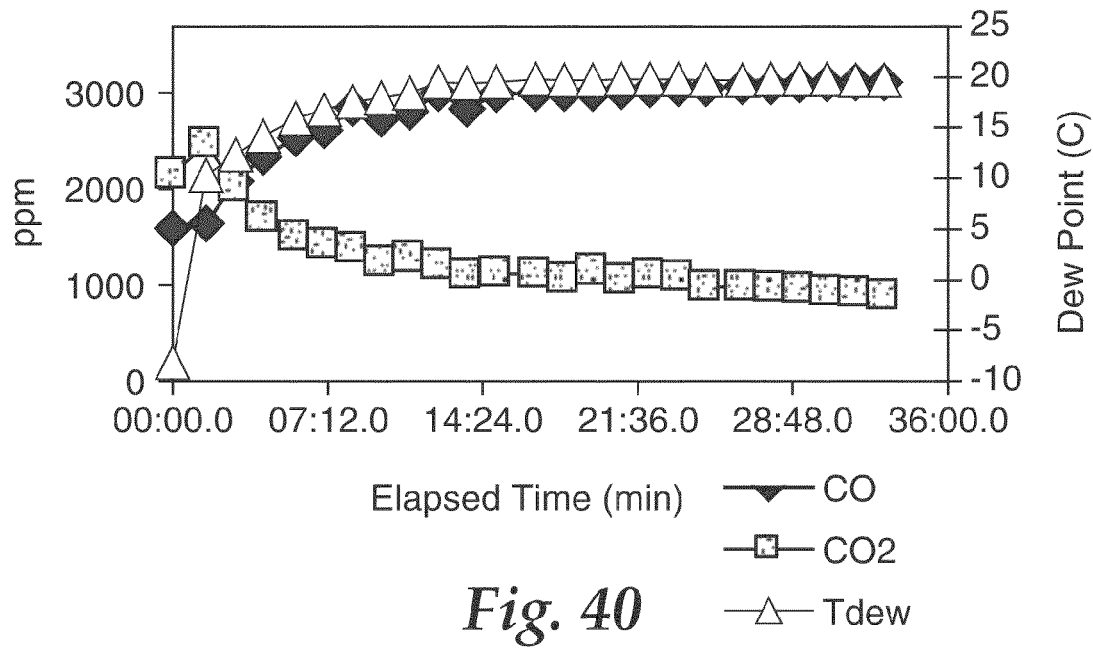
FIG. 40 is a graph showing catalytic characteristics of a sample, wherein the ability of the sample to catalytically oxidize CO to $CO_2$ in a flow containing CO in air is depicted as a function of time.

The performance of the catalyst of example 35 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 40.

Example 36

Preparation of Titanium Oxide-Coated, Potassium Carbonate-treated Alumina Particles Potassium carbonate-treated alumina particles were prepared by impregnating A-type alumina particles with a solution of 0.5 M $K_2CO_3$ (Merck KGaA, Darmstadt, Germany) in deionized water. This material was dried overnight at 135° C. in a forced air furnace. A solution of tetraisopropyltitanate (TPT) in isopropyl alcohol was prepared by mixing 30 ml of tetraisopropyltitanate (Gelest, Inc., Tullytown, Pa.) with sufficient isopropyl alcohol to yield a final volume of 148 ml. This solution was impregnated by incipient wetness into 224.14 g of the potassium carbonate-treated, A-type alumina particles. After impregnation the particles were spread onto a 30×21 cm aluminum tray and were allowed to hydrolyze in air for about 2 hours. During this time the particles were gently stirred every 10 minutes using a spatula. The tray of air hydrolyzed-TPT-treated particles was transferred into an oven and dried at about 150° C. overnight. After drying, the titanium oxide-coated particles were calcined at 500° C. (time at temperature=1 hour, heating rate from room temperature to 500° C.=1.6° C./min.). After cooling these particles were gold treated via sputtering (deposition condition 2).

Figure 41:
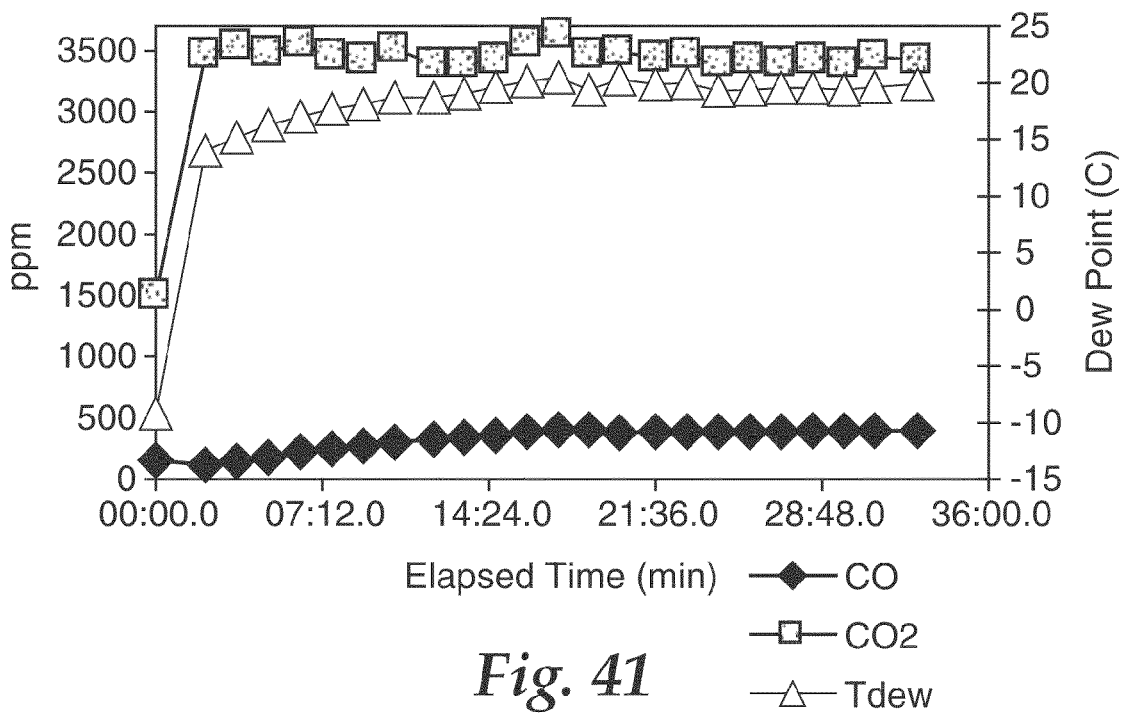
FIG. 41 is a graph showing catalytic characteristics of a sample, wherein the ability of the sample to catalytically oxidize CO to $CO_2$ in a flow containing CO in air is depicted as a function of time.

The performance of the catalyst of example 36 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 41.

The results of the testing of the material of example 36 demonstrates the high activity that can be obtained by use of a nanoporous metal oxide coating in combination with an activating agent.

Example 37

Preparation of Zirconium Oxide-Coated Gamma Alumina Particles 30.0 g of zirconium n-propoxide (Johnson Matthey Electronics, Ward Hill, Mass.) was diluted with isopropyl alcohol to a final combined volume of 148 ml. 224.14 g of B-type gamma alumina particles were impregnated by incipient wetness using this solution. The resulting material was air hydrolyzed for about 5 hours, and dried in an oven at 135° C. overnight. After drying, the titanium oxide-coated particles were calcined at 500° C. (time at temperature=1 hour, heating rate from room temperature to 500° C.=1.6° C./min.). After cooling these particles were gold treated via sputtering (deposition condition 2).

Figure 42:
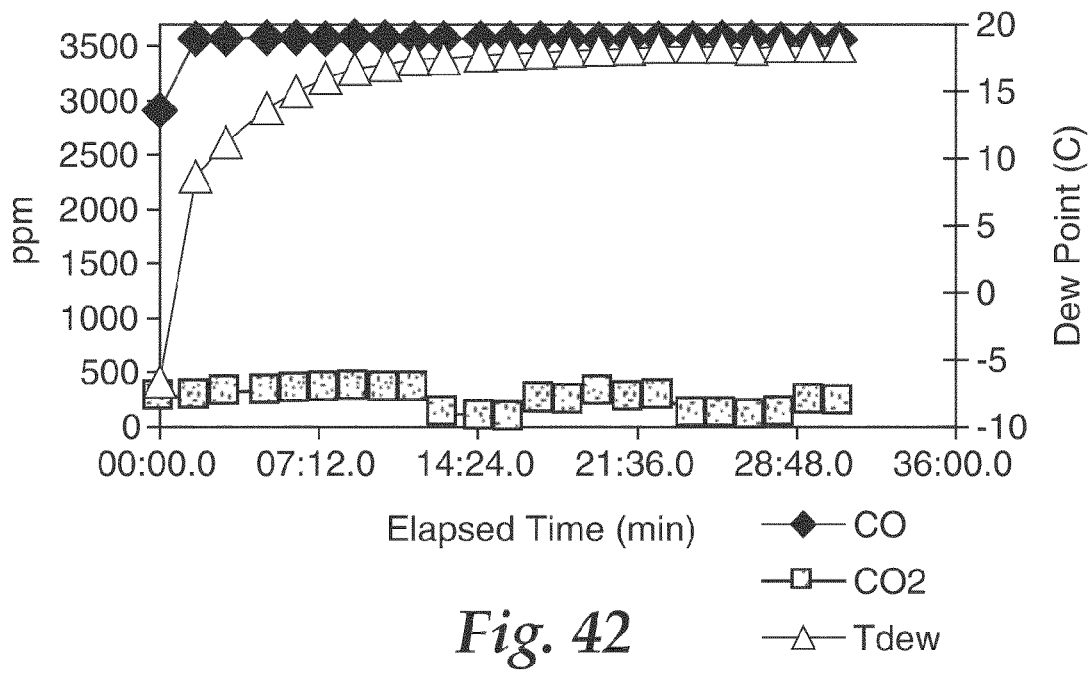
FIG. 42 is a graph showing catalytic characteristics of a sample, wherein the ability of the sample to catalytically oxidize CO to $CO_2$ in a flow containing CO in air is depicted as a function of time.

The performance of the catalyst of example 37 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 42.

Particles of example 37 were placed in a ½ mm high, 3 mm diameter copper ring on a microscope slide and immobilized using conductive Buehler epoxy. The conductive epoxy was prepared by mixing 5 g Buehler epoxy base (Epoxy Base No. 20-8130-037, Buehler Inc., Lake Bluff, Ill.), 1 g Buehler Epoxy hardener (No 20-8132-003) and 1 g colloidal carbon glue (Catalog number 16053, Ted Pella, Inc., Redding, Calif.). The epoxy mix was de-aired at 5 mm vacuum for 2 minutes, poured into the ring and over the particles. The samples were cured for 1 hr. at 70° C. and the copper ring holding the samples immobilized in epoxy was removed from the microscope slide. The immobilized sample was polished flat on one side with 600 grit carbide sand paper. The flat surface was affixed to a SouthBay 515 dimpling machine (South Bay Technology, Inc., San Clemente, Calif.) and ground using diamond slurry to a thickness of 15 um.

The Sample was placed in a Gatan ion mill (Gatan Duo Mill Model 600, Gatan, Inc., Warrendale, Pa.) and milled with dual guns using argon at 5 KV and 0.5 mA per gun until the sample was perforated in the correct area. The sample/s were viewed in a JEOL JSL 200CX (JEOL USA Inc., Peabody, Mass.) at 200 Kv. The samples were manipulated so as to allow viewing of the outer surface of the gold particle with a viewing angle perpendicular to the catalyst surface.

The microstructure and the condition of the core-coating interfaced was determined and the crystalline phases of the core-interface determined. The core was transition alumina, the coating zirconia, and the Au did not visibly penetrate the core. The zirconia phase was discontinuous and the gold was primarily found on the outside edge of the zirconia deposit. Selected area diffraction was used to identify the major crystalline phases present. Crystalline gold, gamma alumina and crystalline zirconia were identified. The zirconia phase was identified as monoclinic zirconia. The zirconia crystallites were in 0.1-0.3 micrometer clusters consisting of primary crystallites of 50-100 nm. Although some small gold crystallites were observed in the 30-100 nm size range, the bulk of the gold was found to be much larger, in the 30-100 nm range.

This example shows that the zirconia did not function to stabilize the gold in the nanoparticle and nanocluster form. This larger particle size gold was found to be essentially inactive as a CO oxidation catalyst.

Example 38

Preparation of Aluminum Oxide-Coated Gamma Alumina Particles 30.0 g of aluminum sec-butoxide (Johnson Matthey Electronics, Ward Hill, Mass.) was diluted with sec-butanol to a final combined volume of 148 ml. 224.14 g of B-type gamma alumina particles were impregnated by incipient wetness using this solution. The resulting material was air hydrolyzed for about 5 hours, and dried in an oven at 135° C. overnight. After drying, the aluminum oxide-coated particles were gold treated via sputtering (deposition condition 2).

The sample was examined by TEM as previously described. The approximate size range of Au particles in a representative region of the sample was 2.6 to 9.7 nm. The average length of Au particles in this region was 4.4 nm and the approximate range of depth into the substrate was 40 to 57 nm.

Figure 43:
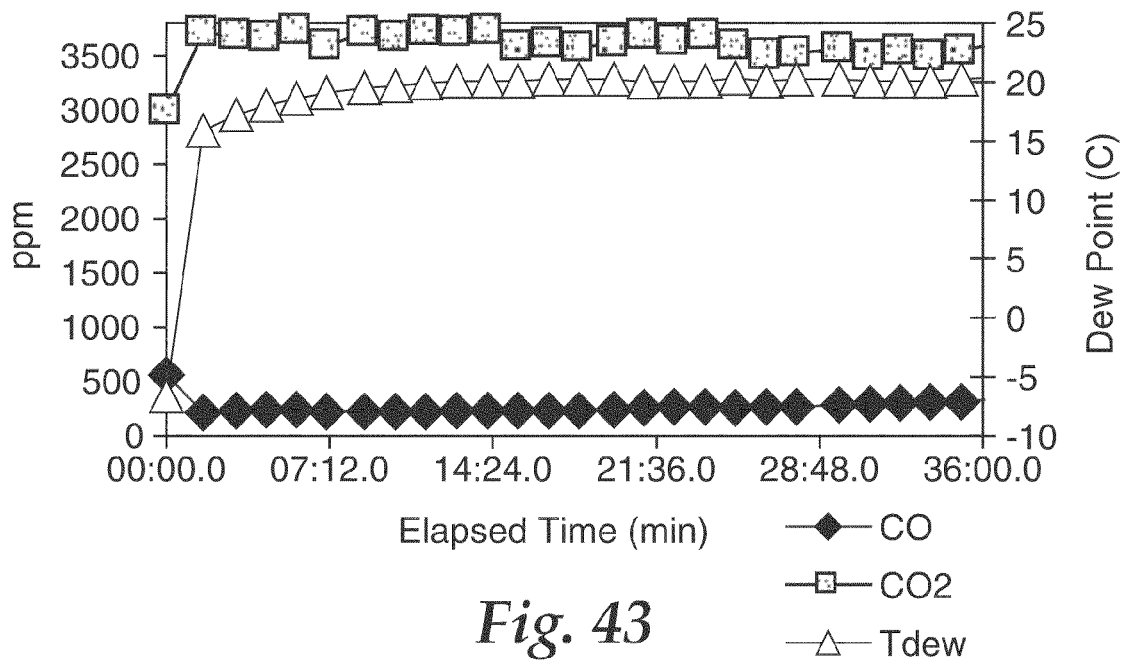
FIG. 43 is a graph showing catalytic characteristics of a sample, wherein the ability of the sample to catalytically oxidize CO to $CO_2$ in a flow containing CO in air is depicted as a function of time.

The performance of the catalyst of example 38 was examined for its catalytic activity in oxidizing CO during gas flow through a bed using test method 1. The CO challenge was 1500 ppm CO and the total gas flow rate was 64 liters/min. The gas was at 85% relative humidity. The results are represented in FIG. 43.

The results of the testing of the material of example 38 show the high performance of a catalyst utilizing a support material whose surface was altered by the hydrolysis of a metal alkoxide (in this case an aluminum alkoxide) on said surface (in this case a nanoporous aluminum oxide).

Example 39

Figure 44:
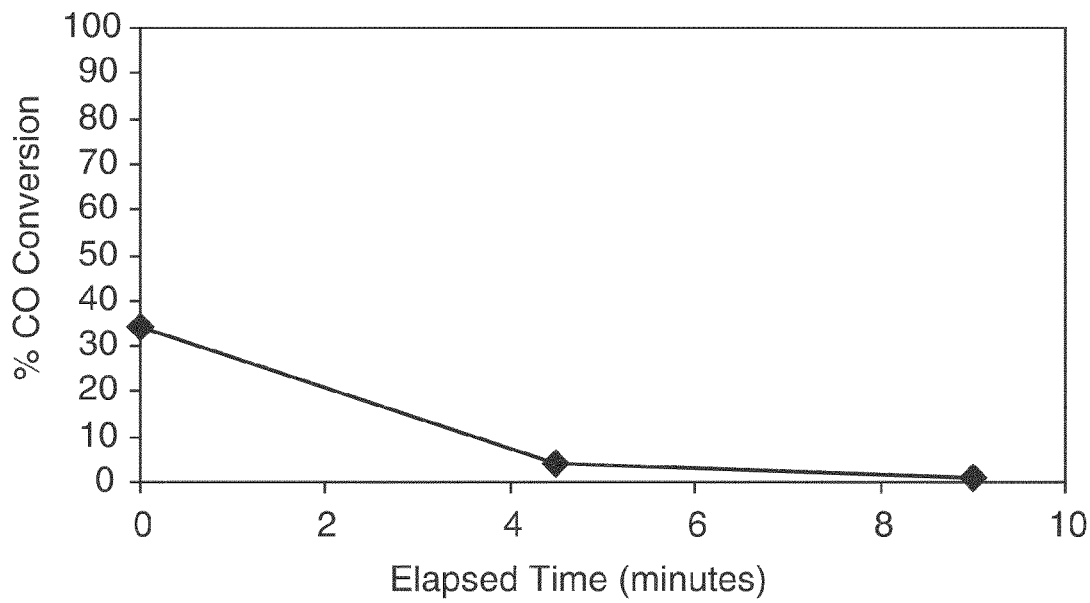
FIG. 44 is a graph showing catalytic characteristics of a sample, wherein the ability of the sample to catalytically oxidize CO to $CO_2$ in a flow containing CO in air is depicted as a function of time.

Gold Treated Glass Beads 280 grams of solid glass spheres, 170×325 mesh, obtained from Potters Industries Inc. (Valley Forge, Pa.) were gold treated using deposition condition 1. The cathodic power was 0.03 kW, the agitator speed was approximately 4 rpm, the argon pressure was approximately 4 mT, and the treatment time was 2 hours. The sample was tested as described in Test Method 2 using 5400 ppm CO in air at greater than 70% RH and a flow rate of 200 ml/min. The bed depth was approximately 1 inch. The results are indicated in FIG. 44.

Example 40

Preparation of Titanium Oxide-Coated, Potassium Carbonate-treated Alumina Particles—Effect of Sequence of Addition A solution of tetraisopropyltitanate (TPT) in isopropyl alcohol was prepared by mixing 30 ml of tetraisopropyltitanate (Gelest, Inc., Tullytown, Pa.) with sufficient isopropyl alcohol to yield a final volume of 148 ml. This solution was impregnated by incipient wetness into 224.14 g of the B-type alumina particles. After impregnation the particles were spread out onto a 30×21 cm aluminum tray and were allowed to hydrolyze in air for about 2 hours. During this time the particles were gently stirred every 20 minutes using a spatula. The tray of air hydrolyzed-TPT-treated particles was transferred into an oven and dried at about 150° C. overnight. After drying, the titanium oxide-coated particles were calcined at 500° C. (time at temperature=1 hour, heating rate from room temperature to 500° C.=1.6° C./min.). After cooling these particles were impregnated by incipient wetness technique with a 0.5 M Potassium carbonate (Merck KGaA, Darmstadt, Germany) solution. This material was dried overnight at 135° C. in a forced air oven. After drying, the potassium carbonate impregnated-titanium oxide-coated particles were gold treated via sputtering (deposition condition 2).

Figure 45:
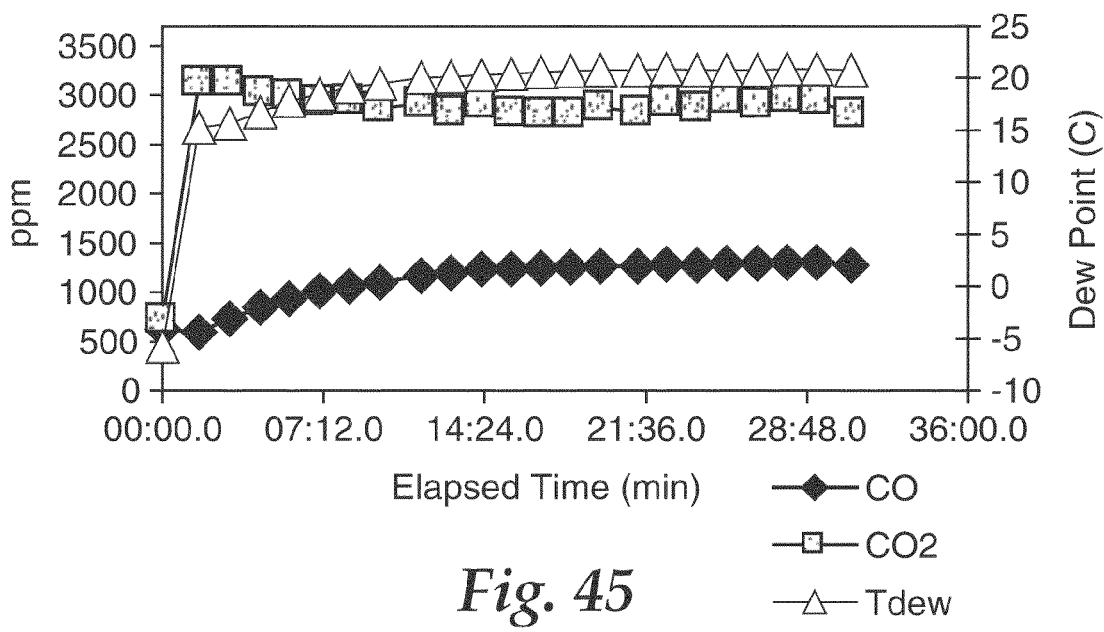
FIG. 45 is a graph showing catalytic characteristics of a sample, wherein the ability of the sample to catalytically oxidize CO to $CO_2$ in a flow containing CO in air is depicted as a function of time.

The performance of the catalyst of example 40 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 45.

Example 41

Gold Treatment on Acid-washed Carbon Granules 1000 ml 12×20 mesh size Kuraray GC (Kuraray Chemical Company, Ltd., Osaka, Japan) was washed with a solution of 2000 ml of deionized water containing 4 ml of concentrated NH$_4$OH (EM Industries, Incorporated, Gibbstown, N.J.) followed by washing with deionized water to neutral pH. The washed sample was dried at 120° C. for 24 hours. This material was gold treated via sputtering (deposition condition 1).

Figure 46:
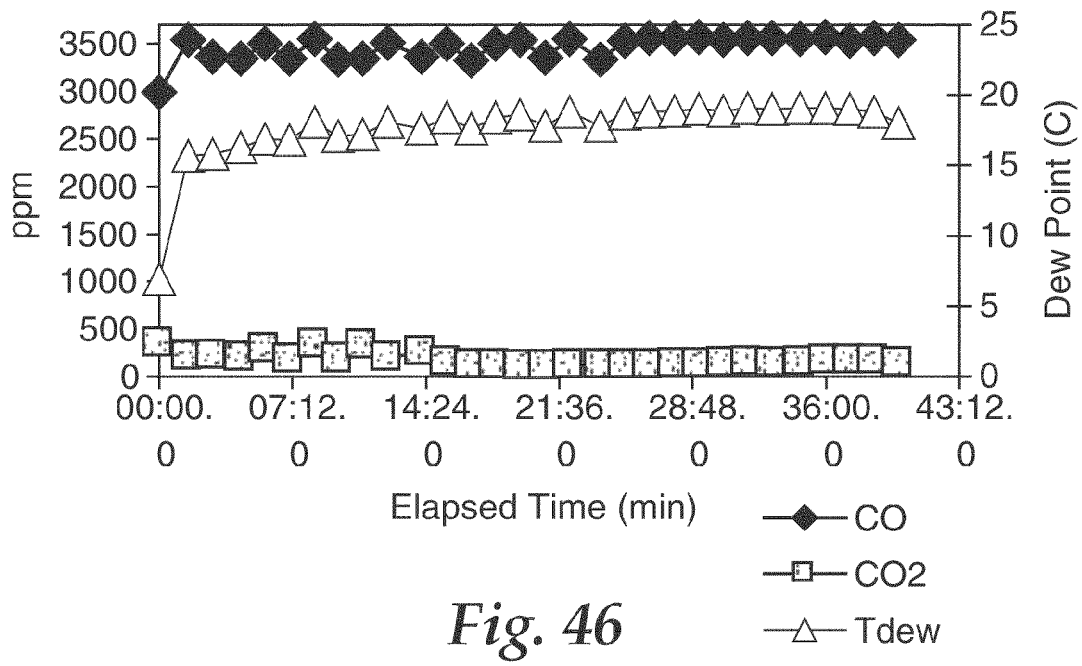
FIG. 46 is a graph showing catalytic characteristics of a sample, wherein the ability of the sample to catalytically oxidize CO to $CO_2$ in a flow containing CO in air is depicted as a function of time.

The performance of the catalyst of example 41 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 46.

Example 42

Gold Treatment on a Treated Carbon Granule: Effect of Impregnation of a Potassium Source 123.80 g 12×20 mesh size Kuraray GC (Kuraray Chemical Company, Ltd., Osaka, Japan) was impregnated by incipient wetness with a solution of potassium acetate. The potassium acetate solution was prepared by dissolving 7.50 g potassium acetate (Fisher Scientific, Fair Lawn, N.J.) in 142.50 g deionized water). After impregnation, the sample was dried in an oven at 130° C. overnight and subsequently calcined in a flow of nitrogen gas according to the heating schedule: room temperature to 950° C. at 3° C./min. and then hold at 950° C. for 1 hour. After cooling this material was gold treated via sputtering (deposition condition 1).

Figure 47:
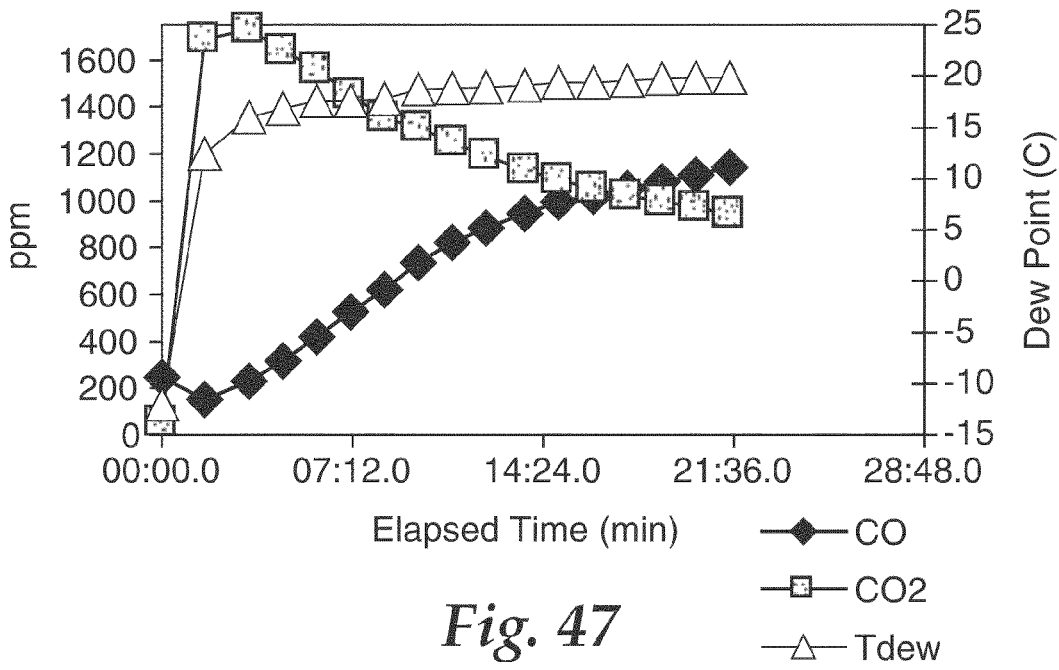
FIG. 47 is a graph showing catalytic characteristics of a sample, wherein the ability of the sample to catalytically oxidize CO to $CO_2$ in a flow containing CO in air is depicted as a function of time.

The performance of the catalyst of example 42 was examined for its catalytic activity in oxidizing CO during gas flow through a bed using test method 1. The CO challenge was 1500 ppm CO and the total gas flow rate was 32 liters/min. The gas was at 85% relative humidity. The results are represented in FIG. 47.

Example 43

Figure 48:
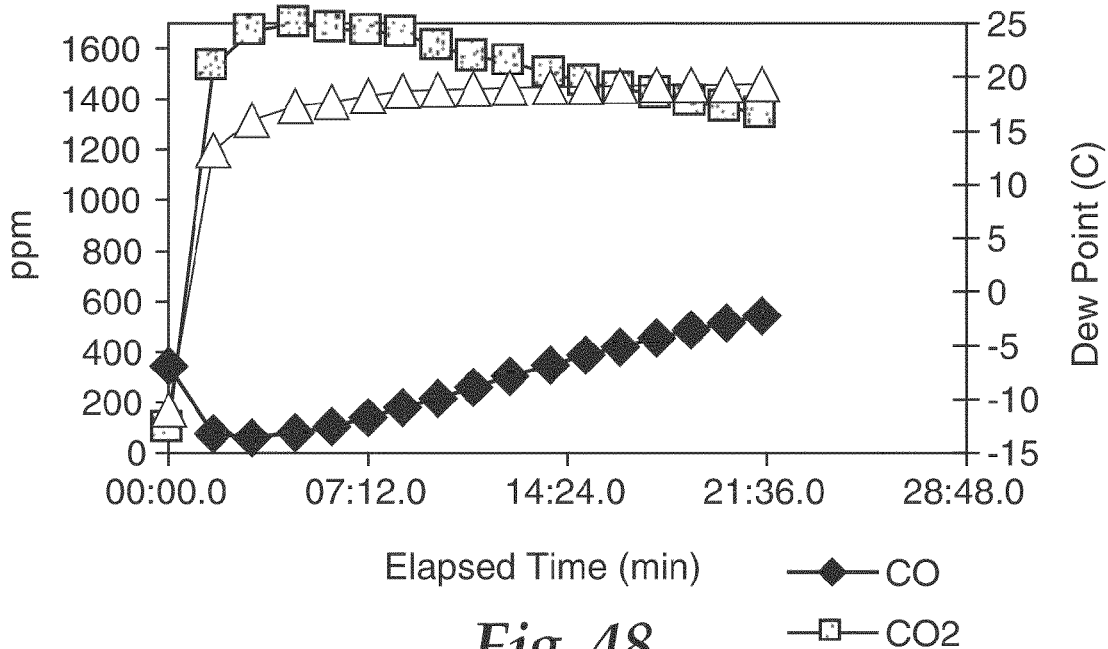
FIG. 48 is a graph showing catalytic characteristics of a sample, wherein the ability of the sample to catalytically oxidize CO to $CO_2$ in a flow containing CO in air is depicted as a function of time.

Gold Treatment on a Treated Carbon Granule: Effect of Impregnation of a Sodium Source 123.80 g 12×20 mesh size Kuraray GC (Kuraray Chemical Company, Ltd., Osaka Japan) was impregnated by incipient wetness with a solution of sodium acetate. The sodium acetate solution was prepared by dissolving 7.50 g sodium acetate (Mallinkrodt Incorporated, St. Louis, Mo.) in 142.50 g deionized water. After impregnation, the sample was dried in an oven at 130° C. overnight and subsequently calcined in a flow of nitrogen gas according to the heating schedule: room temperature to 950° C. at 3° C./min. and then hold at 950° C. for 1 hour. After cooling this material was gold treated via sputtering (deposition condition 1). The performance of the catalyst of example 43 was examined for its catalytic activity in oxidizing CO during gas flow through a bed using test method 1. The CO challenge was 1500 ppm CO and the total gas flow rate was 32 liters/min. The gas was at 85% relative humidity. The results are represented in FIG. 48.

Example 44

Gold Treatment on Non-Acid Washed Carbon Granule

12×20 mesh size Kuraray GG was gold treated via sputtering (deposition condition 1).

Figure 49:
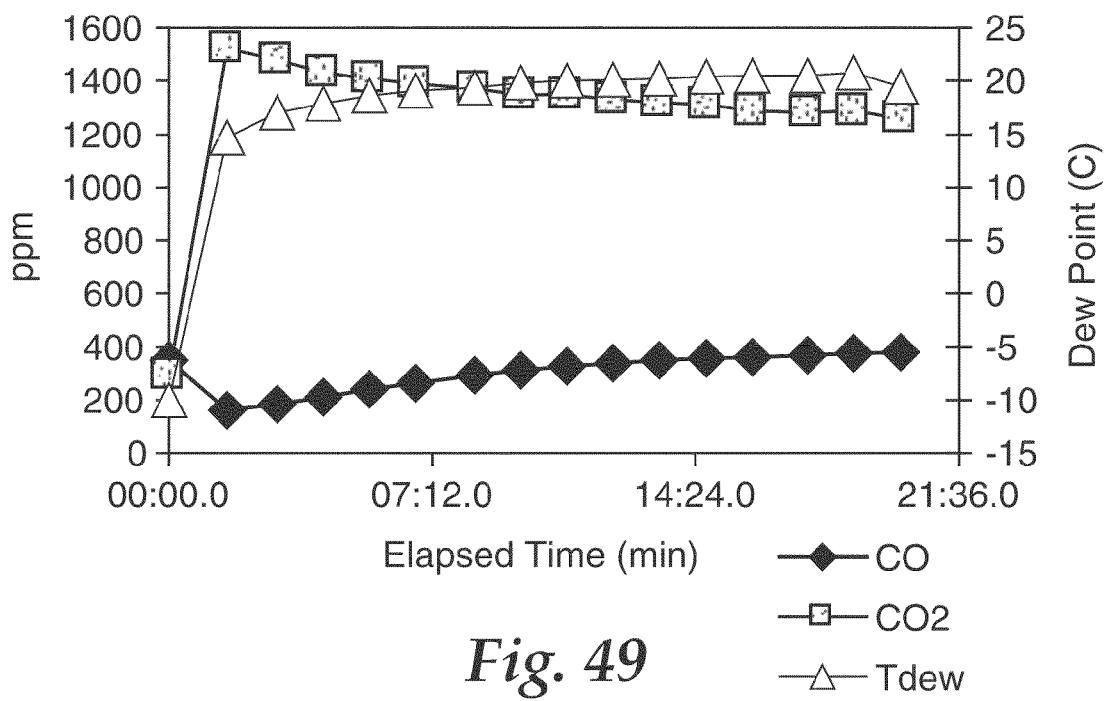
FIG. 49 is a graph showing catalytic characteristics of a sample, wherein the ability of the sample to catalytically oxidize CO to $CO_2$ in a flow containing CO in air is depicted as a function of time.

The performance of the catalyst of example 44 was examined for its catalytic activity in oxidizing CO during gas flow through a bed using test method 1. The CO challenge was 1500 ppm CO and the total gas flow rate was 32 liters/min. The gas was at 85% relative humidity. The results are represented in FIG. 49.

Example 45

Gold Treatment on Carbon Granule: Effect of Changes in Deposition Conditions

Figure 50:
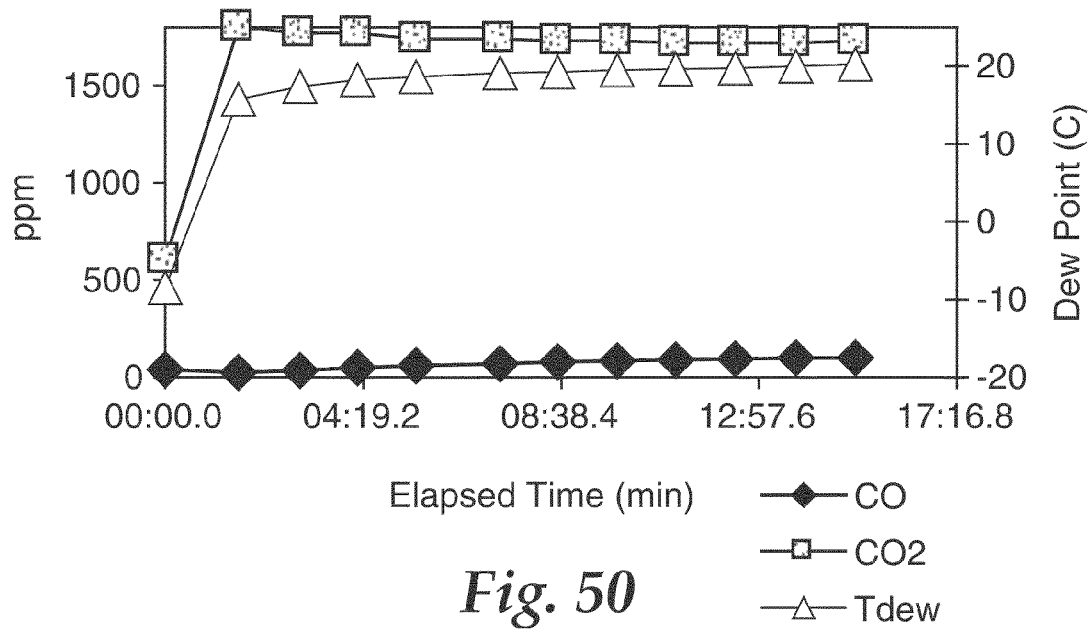
FIG. 50 is a graph showing catalytic characteristics of a sample, wherein the ability of the sample to catalytically oxidize CO to $CO_2$ in a flow containing CO in air is depicted as a function of time.

12×20 mesh size Kuraray GG was gold treated via sputtering (deposition condition 1) with the exception that the particle agitator was turned at 10 rpms during the deposition process. The performance of the catalyst of example 45 was examined for its catalytic activity in oxidizing CO during gas flow through a bed using test method 1. The CO challenge was 1500 ppm CO and the total gas flow rate was 32 liters/min. The gas was at 85% relative humidity. The results are represented in FIG. 50.

Example 46

Preparation of Surface Area Enhanced Particles: Fine Particles Bonded to Coarser Particles A 10% boehmite sol was prepared by dispersing 20.0 g of alpha alumina monohydrate (boehmite) powder sold under the trade designation Disperal (Condea Chimie, GMBH) in 188.5 g deionized water using 1.25 ml concentrated nitric acid as a dispersant. To disperse the boehmite, the boehmite was first added to the deionized water while rapidly stirring with an OMNI GLH lab mixer (Omni International, Warrenton, Va.). The acid was added dropwise to the dispersion while rapidly mixing to generate uniform dispersion. To 135.11 g of this sol was added 15.01 g of fine (40-200 mesh) particles of gamma alumina (gamma alumina prepared by calcining boehmite particles as described earlier). This mixture was blended well to disperse the gamma alumina particles in the boehmite sol. This boehmite-gamma alumina particle mixture was then added to 230.8 g of the type A gamma alumina particles while stirring the type A gamma alumina particles with a spatula so as to effect a uniform treatment of the type A gamma alumina particles with the boehmite-gamma alumina particle mixture. The result of this process was that the finer gamma alumina particles adhered to the surface of the coarser gamma alumina particles. The mixture was transferred to a shallow aluminum tray and dried in an oven at 125° C. The dried particles were calcined to 600° C. according to the schedule: room temperature to 600° C. at 4.8° C./min., hold at 600° C. for 1 hour, and then cool with the furnace. After the particles were cool, the particles were gold treated according to deposition condition 2.

Figure 51:
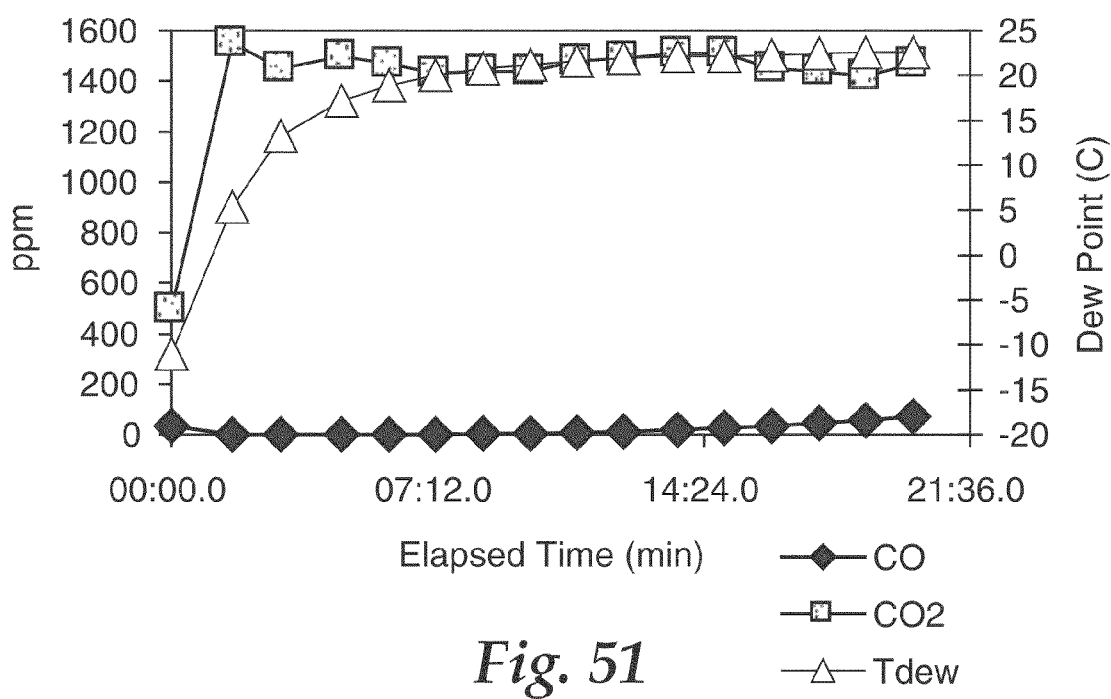
FIG. 51 is a graph showing catalytic characteristics of a sample, wherein the ability of the sample to catalytically oxidize CO to $CO_2$ in a flow containing CO in air is depicted as a function of time.

The performance of the catalyst of example 46 was examined for its catalytic activity in oxidizing CO during gas flow through a bed using test method 1. The CO challenge was 1500 ppm CO and the total gas flow rate was 32 liters/min. The gas was at 85% relative humidity. The results are represented in FIG. 51.

Example 47

Preparation of Surface Area Enhanced Particles: Effect of Surface Modification through Creation of Surface Roughness and Surface Porosity A boehmite sol was prepared by the method described in example 46 using 358.52 g of Disperal™ boehmite, 592 g of deionized water and 13 ml of concentrated nitric acid. In a separate step, fine particle size gamma alumina was prepared by calcining a sample of Disperal™ boehmite to 600° C. in a fused silica tray (heating rate of 4.8° C./min., held at 600° C. for 2 hours). 58.61 g of this fine particle size gamma alumina was added to the boehmite sol with rapid stirring using an OMNI GLH lab mixer. 200 g of this mixture was diluted with 900 g of deionized water. To this dispersion was added 50.0 g of the fine (40-200 mesh) gamma alumina particles along with 30.0 g of carbon (Darco Activated Carbon, ICI United States, Inc., Willmington, Del.) and the mixture was mixed well. 150 ml of this mixture was added in fine drops to 224.1 g of Type B gamma alumina particles while mixing the particles with a spatula. The resulting particles were uniformly black (black from the carbon particles in the dispersion). The treated particles were transferred to a shallow aluminum tray and dried in the oven overnight at 120° C. The dried particles were calcined to 600° C. according to the schedule: room temperature to 600° C. at 2.4° C./min., hold at 600° C. for 1 hour, cool with the furnace. After the particles were cool, the particles were impregnated with 0.5 M solution of potassium carbonate by incipient wetness. The particles were again dried at 120 C overnight, calcined to 600° C. (4.8° C./min. to 600° C., hold at 600° C. for 1 hour, cool with the furnace) and, after cooling, the particles were gold treated according to deposition condition 2.

during this process; "time" represents the time of gold treatment; "pressure" represents the chamber pressure during the deposition process; "revs total" is the number of total revolutions of the agitator in the chamber during the deposition time; "gap" indicates the gap between the blades and the chamber wall, "<20 mesh" indicates the percentage by weight of the sample that was found to pass through a 20 mesh sieve after the gold treatment; "<60 mesh" indicates the percentage by weight of the sample that was found to pass through a 60 mesh sieve after the gold treatment; and the "% eff." is a measure of the catalytic activity as measured by the percentage of CO removed during the first 15 minutes of the test versus the amount of CO that was introduced into the catalyst test bed during the test.

TABLE 1

| Example | Sample | | | | | | | | | |
|---|---|---|---|---|---|---|---|---|---|---|
| | power (kW) | current (Amps) | time (hr) | speed (rpm) | pressure (mTorr) | revs total | gap (mm) | <20 mesh (%) | <60 mesh (%) | % eff. (%) |
| 49 | 0.03 | 0.06 | 1 | 4 | 10 | 240 | 1.7 | 21.4 | 1.0 | 97 |
| 50 | 0.03 | 0.06 | 1 | 4 | 10 | 240 | 1.7 | 21.1 | 1.3 | 98 |
| 51 | 0.03 | 0.06 | 1 | 10 | 10 | 600 | 1.7 | 22.6 | 1.8 | 95 |
| 52 | 0.03 | 0.06 | 1 | 10 | 3 | 600 | 1.7 | 28.0 | 2.4 | 97 |
| 53 | 0.06 | 0.12 | 0.5 | 4 | 10 | 120 | 1.7 | 10.3 | 0.7 | 90 |
| 54 | 0.03 | 0.06 | 1 | 4 | 10 | 240 | 2.7 | 5.1 | 0.5 | 75 |

Figure 52:
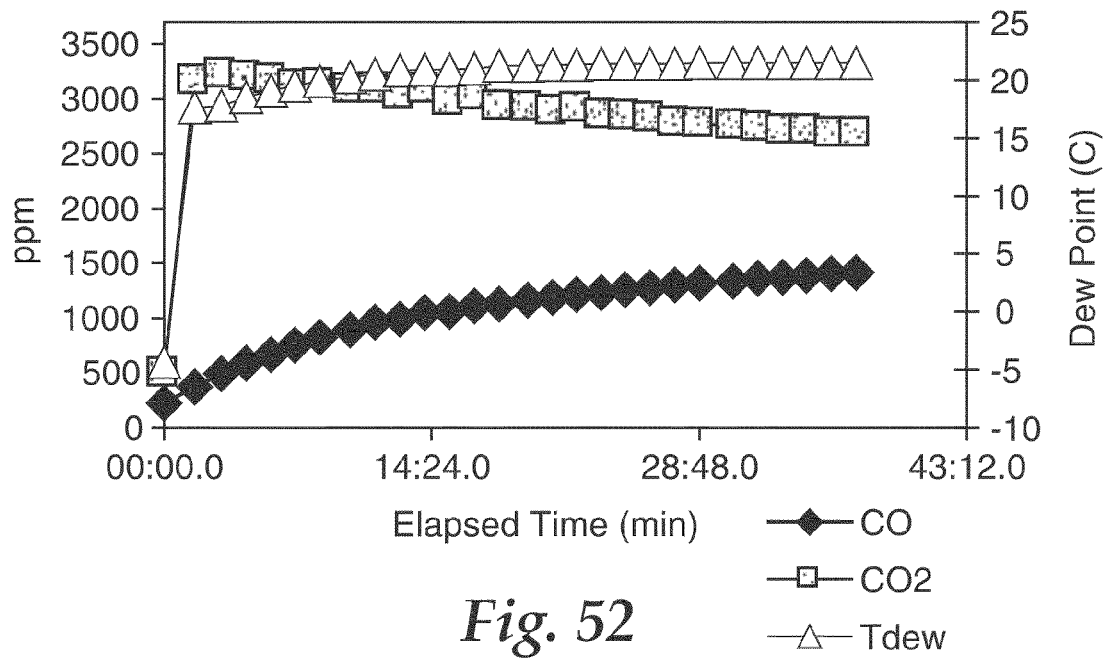
FIG. 52 is a graph showing catalytic characteristics of a sample, wherein the ability of the sample to catalytically oxidize CO to $CO_2$ in a flow containing CO in air is depicted as a function of time.

The performance of the catalyst of example 47 was examined for its catalytic activity in oxidizing CO during gas flow through a bed using test method 1. The CO challenge was 3600 ppm CO and the total gas flow rate was 64 liters/min. The gas was at 85% relative humidity. The results are represented in FIG. 52.

Example 48

Activation of Molecular Sieves Through Gold Treatment 300 ml of 14-30 mesh Sigma molecular sieve particles (M2760, 4 angstrom molecular sieves; Sigma Aldrich, St. Louis, Mo.) were treated with gold using deposition condition 2.

Figure 53:
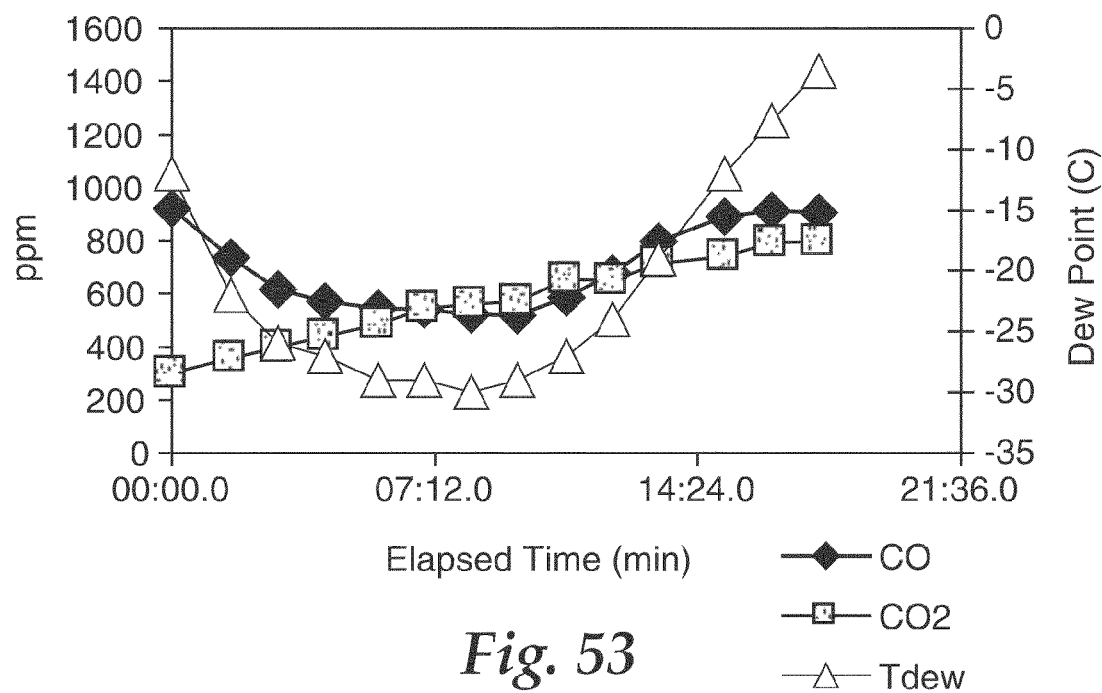
FIG. 53 is a graph showing catalytic characteristics of a sample, wherein the ability of the sample to catalytically oxidize CO to $CO_2$ in a flow containing CO in air is depicted as a function of time.

The performance of the catalyst of example 48 was examined for its catalytic activity in oxidizing CO during gas flow through a bed using test method 1. The CO challenge was 1500 ppm CO and the total gas flow rate was 32 liters/min. The gas was at 85% relative humidity. The results are represented in FIG. 53.

Examples 49-54 Effect of Changes in Deposition Conditions on the Activity of Carbon Catalysts Examples 49-54 were prepared by gold treating 300 ml samples of 12×20 mesh Kuraray GG carbon particles using the deposition conditions shown in table 1 below. In this table the "power" represents the cathodic power during the gold deposition process; "current" represents the measured current The weight percent gold as measured by ICP for these samples is indicated in the following table. Replicate samples of Examples 49 and 53 were measured by this technique.

TABLE 2

| Example | wt % gold | |
|---|---|---|
| 49 | 0.0657 | 0.0659 |
| 51 | 0.0939 | — |
| 52 | 0.0995 | — |
| 53 | 0.0962 | 0.0923 |
| 54 | 0.0933 | — |

Figure 54:
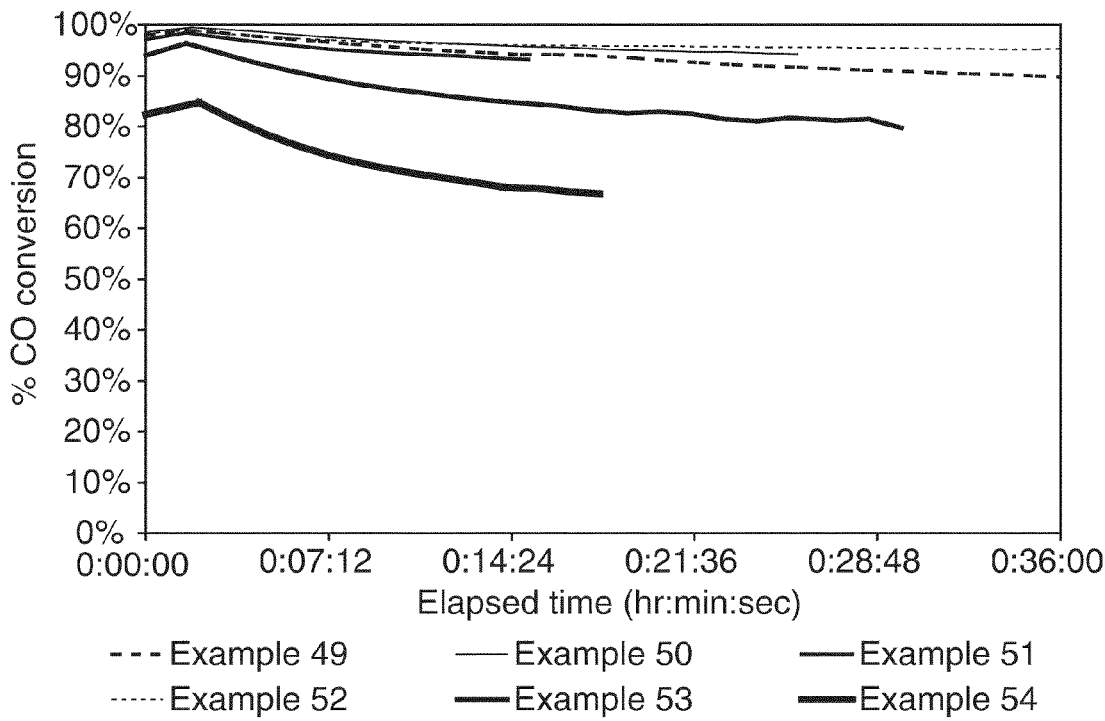
FIG. 54 is a graph showing catalytic characteristics of samples, wherein the ability of each sample to catalytically oxidize CO to $CO_2$ in a flow containing CO in air is depicted as a function of time.

The performance of the catalyst materials of examples 49-54 were examined for their catalytic activities in oxidizing CO during gas flow through a bed using test method 1. The CO challenge was 1500 ppm CO and the total gas flow rate was 32 liters/min. The gas was at 85% relative humidity. The results are represented in FIG. 54.

Examples 55-60 Effect of Changes in Power on the Gold on Carbon Catalyst Activity Examples 55-60 were prepared by gold treating 300 ml samples of 12×20 mesh Kuraray GG carbon particles using the deposition conditions shown in table 2 below. In these examples, "thickness" represents the relative thickness of the gold coating as measured by the plasma current, "rotation rate" represents the rotation speed of the particle agitator shaft, "distance" represents the length between the sample and the target and the other variables are as previously defined.

TABLE 3

| Example | thickness (centiAmps) | power (kW) | current (Amps) | time (hrs) | rotation rate (rpm) | gap (mm) | distance (cm) | % eff. (%) |
|---|---|---|---|---|---|---|---|---|
| 55 | 15 | 0.09 | 0.15 | 1.00 | 2 | 2.7 | 8.6 | 80 |
| 56 | 12 | 0.06 | 0.12 | 1.00 | 2 | 2.7 | 8.6 | 72 |

TABLE 3-continued

| Example | thickness (centiAmps) | power (kW) | current (Amps) | time (hrs) | rotation rate (rpm) | gap (mm) | distance (cm) | % eff. (%) |
|---|---|---|---|---|---|---|---|---|
| 57 | 3 | 0.01 | 0.03 | 1.00 | 2 | 2.7 | 8.6 | 59 |
| 58 | 9 | 0.04 | 0.09 | 1.00 | 2 | 2.7 | 8.6 | 77 |
| 59 | std | 0.03 | 0.06 | 1.00 | 4 | 2.7 | 4.6 | 82 |
| 60 | 6 | 0.02 | 0.06 | 1.00 | 2 | 2.7 | 8.6 | 65 |

Figure 55:
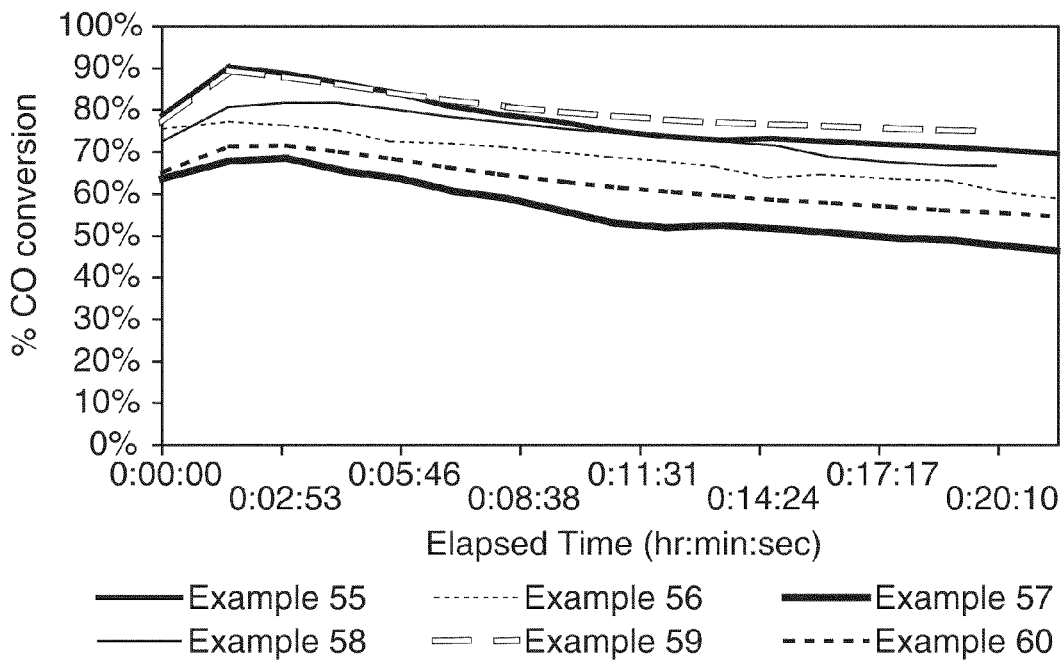
FIG. 55 is a graph showing catalytic characteristics of samples, wherein the ability of each sample to catalytically oxidize CO to $CO_2$ in a flow containing CO in air is depicted as a function of time.

The performance of the catalyst materials of examples 55-60 were examined for their catalytic activities in oxidizing CO during gas flow through a bed using test method 1. The CO challenge was 1500-ppm CO and the total gas flow rate was 32 liters/min. The gas was at 85% relative humidity. The results are represented in FIG. 55.

Figure 56:
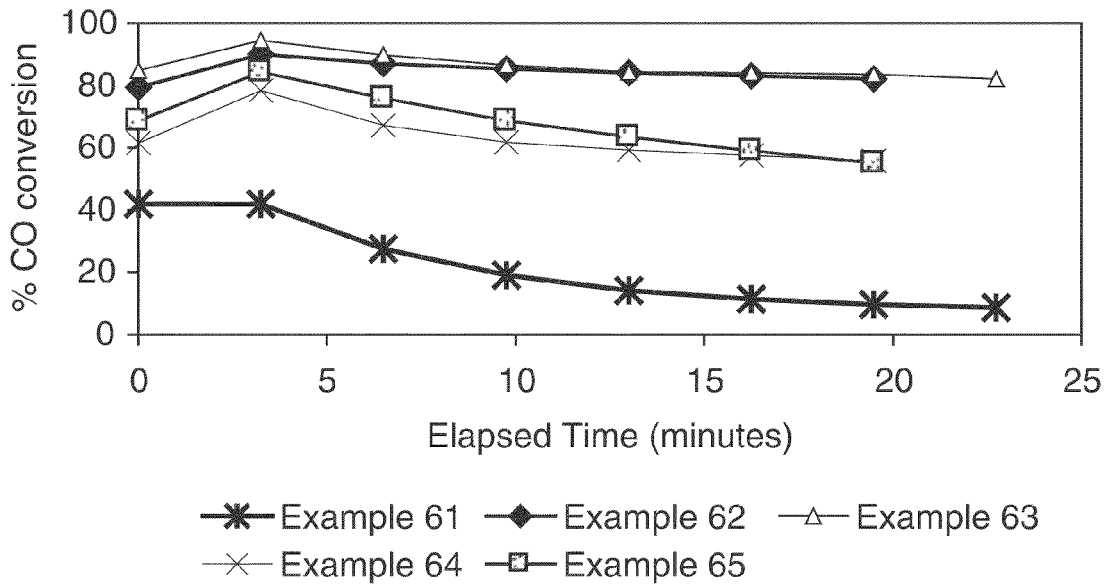
FIG. 56 is a graph showing catalytic characteristics of samples, wherein the ability of each sample to catalytically oxidize CO to $CO_2$ in a flow containing CO in air is depicted as a function of time.

Examples 61-65 Effect of Impregnation and Heat Treatment On Catalyst Performance Samples prepared as described in Examples 1, 3, 4, 5, and 17 and designated Examples 61, 62, 63, 64, 65, respectively, were screened to retain particles greater than 40 mesh and smaller than 30 mesh using U.S. Standard Sieves (A.S.T.M. E-11 specification; The Murdock Co., Mundelein, Ill.). The retained samples were tested as described in Test Method 2 using 16,000 ppm CO in air at greater than 85% RH and a flow rate of 100 mL/min. Catalyst mass tested was 435 mg for Examples 61, 62, and 65 and 438 mg for Examples 63 and 64. Results are indicated in FIG. 56.

Examples 66-70 Effect of Silica Support and Gold Coating Thickness

Examples 66-70 were prepared by gold treating various chromatography grade silica gel substrates (S2509, S4883, S9258 obtained from Sigma Aldrich Co, St. Louis, Mo.) as described in Table 3 below. S2509 consists of 70 to 230 mesh particles (63 to 200 μm) with average pore diameter of 60 Å. S4883 consists of 20 to 200 mesh particles (74 to 840 μm) with average pore diameter of 22 Å. S9258 consists of 15 to 40 μm particles with average pore diameter of 60 Å. The distance between the samples and target was maintained at 4.6 cm. The gap was set at 1.7 mm. The "catalyst weight" refers to the weight of the material tested for its catalytic activity. "Drying temp" refers to the temperature at which the sample was dried overnight prior to gold treating.

TABLE 4

| Example | Substrate | Catalyst Weight mg | Drying Temp ° C. | Power kW | Current Amps | Time hrs | Rotation rate rpm |
|---|---|---|---|---|---|---|---|
| 66 | S2509 | 98 | 200 | 0.03 | 0.07 | 2 | 4 |
| 67 | S4883 | 105 | 200 | 0.02 | 0.06 | 1 | 4 |
| 68 | S9258 | 98 | 600 | 0.02 | 0.1 | 6 | 4 |
| 69 | S9258 | 105 | — | — | — | — | — |
| 70 | S2509 | 214 | 200 | 0.03 | 0.07 | 2 | 4 |

Figure 57:
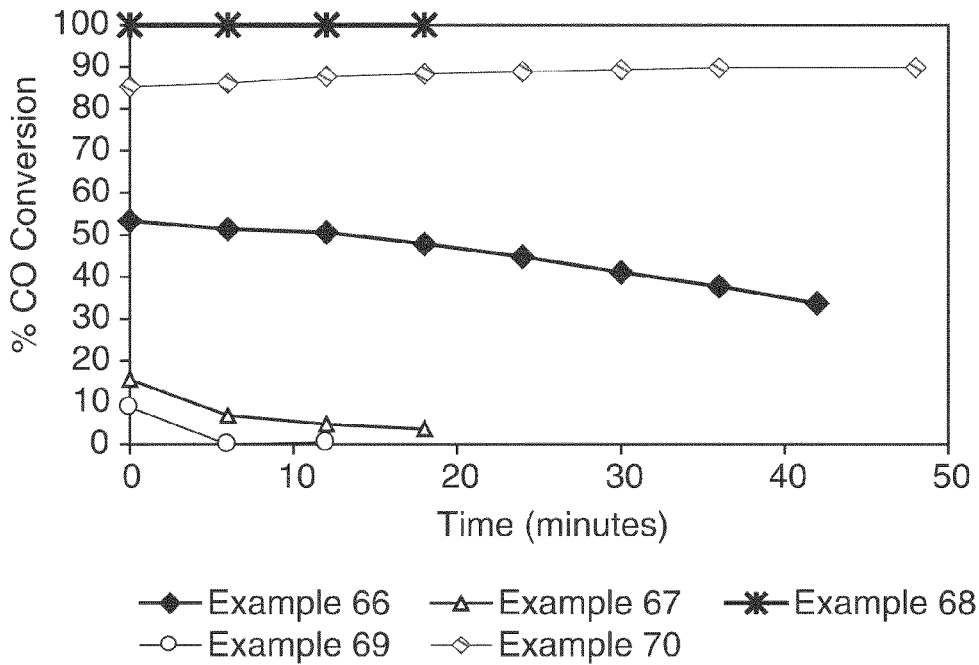
FIG. 57 is a graph showing catalytic characteristics of samples, wherein the ability of each sample to catalytically oxidize CO to $CO_2$ in a flow containing CO in air is depicted as a function of time.

The performance of the catalytic materials of Examples 66 to 70 was tested as described in Test Method 2. The CO concentration was 1800-ppm CO in air, the relative humidity was >90%, and the gas flow rate was 100 mL/min. Results are indicated in FIG. 57.

Example 71

Effect of Long-Time CO Exposure on Catalyst Performance

Figure 58:
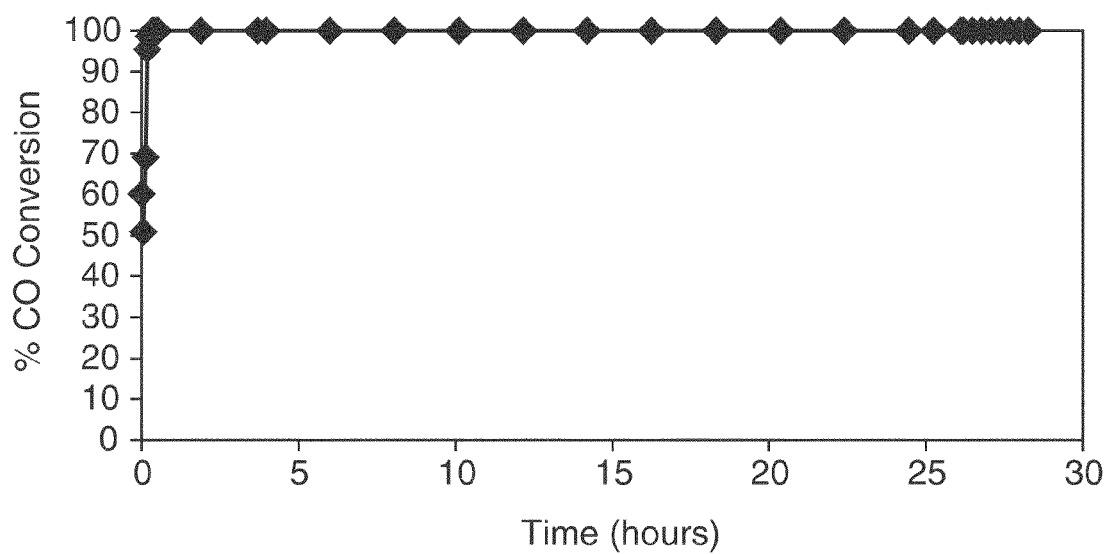
FIG. 58 is a graph showing catalytic characteristics of a sample, wherein the ability of the sample to catalytically oxidize CO to $CO_2$ in a flow containing CO in air is depicted as a function of time.

A sample prepared as described in Example 38 was sieved to retain particles smaller than 140-mesh using U.S. Standard Sieves (A.S.T.M. E-11 specification; The Murdock Co., Mundelein, Ill.). The retained sample was tested as described in Test Method 2 using 18,900 ppm CO in air at greater than 85% RH and a flow rate of 100 mL/min. Catalyst mass tested was 119 mg. The test was continued for 28 hours. Results are indicated in FIG. 58.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A method of making a catalyst system, comprising the steps of:
   inserting a nanoporous support medium into a physical vapor deposition chamber that contains a particle agitator; and,
   physically vapor depositing elemental gold clusters of dimensions of about 0.5 nm to about 50 nm onto the nanoporous support medium while the nanoporous support medium is being mixed and comminuted by the particle agitator.

2. The method of claim 1, wherein the nanoporous support medium comprises a carbonaceous material.

3. The method of claim 2, wherein the nanoporous support medium comprises activated carbon.

4. The method of claim 1, wherein the nanoporous support medium comprises alumina.

5. The method of claim 1, wherein the nanoporous support medium comprises titania.

6. The method of claim 1, further comprising heat treating the nanoporous support medium.

7. The method of claim 1, further comprising incorporating a water soluble metal salt into the nanoporous support medium.

8. The method of claim 7, wherein the incorporation of the water soluble metal salt into the nanoporous support medium occurs prior to the gold deposition.

9. The method of claim 8, further comprising heat treating the nanoporous support medium after the incorporating of the water soluble metal salt but prior to the gold deposition.

10. The method of claim 7, wherein the water soluble metal salt is selected from the group consisting of an alkali metal, an alkaline earth metal, and mixtures thereof.

11. The method of claim 7, wherein the nanoporous support medium comprises a carbonaceous material.

12. The method of claim 1, further comprising hydrolyzing a metal alkoxide onto the nanoporous support medium.

13. The method of claim 12, further comprising heat treating the nanoporous support medium after the hydrolyzing a metal alkoxide onto the nanoporous support medium but prior to the gold deposition.

14. The method of claim 12, wherein the metal alkoxide is selected from the group comprising alkoxides of Ti and Al.

15. The method of claim 12, further comprising the step of incorporating a water soluble metal salt onto the nanoporous support medium.

16. The method of claim 1, wherein the nanoporous support medium comprises a plurality of composite particles, each composite particle comprising a plurality of nanoporous guest particles incorporated onto a host particle wherein the ratio of the average particle size of the host particles to the guest particles is in the range of 10,000:1 to 10:1.

17. The method of claim 16 wherein the plurality of nanoporous guest particles is incorporated onto the host particles, prior to the gold being physically vapor deposited.

18. The method of claim 17, wherein the plurality of nanoporous guest particles are adhered to the host particles to form the composite particles.

19. The method of claim 16, wherein the nanoporous guest particles comprise an oxide of titanium.

20. The method of claim 16, including the step of heat treating the composite particles.

21. The method of claim 16, wherein the composite particles comprise at least one water soluble metal salt.

22. The method of claim 21, wherein the water soluble metal salt is selected from the group consisting of an alkali metal, an alkaline earth metal, and mixtures thereof.

23. The method of claim 22, wherein the water soluble metal salt comprises potassium carbonate.

24. The method of claim 16, wherein the composite particles comprise a material formed by the hydrolysis of a metal alkoxide.

25. The method of claim 1 wherein the particle agitator comprises a mechanical agitator comprising at least one blade.

* * * * *

UNITED STATES PATENT AND TRADEMARK OFFICE
CERTIFICATE OF CORRECTION

PATENT NO.       : 7,989,384 B2
APPLICATION NO.  : 12/756635
DATED            : August 2, 2011
INVENTOR(S)      : Larry A Brey It is certified that error appears in the above-identified patent and that said Letters Patent is hereby corrected as shown below:

Title Page 2, item (56); Column 2 (Other Publications)
Line 16, delete "A12O3" and insert -- $Al_2O_3$ --, therefor.

Title Page 2, item (56); Column 2 (Other Publications)
Line 21, delete "A12O3" and insert -- $Al_2O_3$ --, therefor.

Title Page 2, item (56); Column 2 (Other Publications)
Line 27, delete "Multiayer" and insert -- Multilayer --, therefor.

Title Page 3, item (56); Column 1 (Other Publications)
Line 38, delete "$Al_2O_3$" and insert -- $Al_2O_3$ --, therefor.

Title Page 3, item (56); Column 1 (Other Publications)
Line 48, delete "Noanoparticles" and insert -- Nanoparticles --, therefor.

Title Page 3, item (56); Column 1 (Other Publications)
Line 48, delete "$Al_2O_3$" and insert -- $Al_2O_3$ --, therefor.

Title Page 3, item (56); Column 2 (Other Publications)
Line 48, delete "Al2O₃" and insert -- $Al_2O_3$ --, therefor.

Title Page 3, item (56); Column 2 (Other Publications)
Line 23, delete "Al2O₃" and insert -- $Al_2O_3$ --, therefor.

Column 11
Line 49, delete "(vida infra)" and insert -- (vide infra) --, therefor.

Column 14
Line 26, delete "deposition" and insert -- deposition. --, therefor.

Signed and Sealed this
First Day of November, 2011

David J. Kappos
*Director of the United States Patent and Trademark Office*

CERTIFICATE OF CORRECTION (continued)
U.S. Pat. No. 7,989,384 B2

Column 17
Line 9 (Approx.), delete "Volumeat" and insert -- Volume at --, therefor.

Column 23
Line 36, delete "calcining" and insert -- calcining. --, therefor.

Column 23
Line 65, delete "calcining" and insert -- calcining. --, therefor.

Column 25
Line 20, delete "Kjer" and insert -- Kjaer --, therefor.

Column 26
Line 44, delete "RH" and insert -- RH. --, therefor.

Column 27
Line 35, delete "(Greeco Corp., Hydson, N.H.)." and insert -- (Greco Corp., Hudson, N.H.). --, therefor.

Column 31
Line 62, delete "Mallinkrodt" and insert -- Mallinckrodt --, therefor.

Column 36
Line 65, delete "Mallinkrodt" and insert -- Mallinckrodt --, therefor.

Column 38
Line 27, delete "Mallinkrodt" and insert -- Mallinckrodt --, therefor.

Column 38
Line 52, delete "Willmington" and insert -- Wilmington --, therefor.

Column 43
Line 22, delete "Mallinkrodt" and insert -- Mallinckrodt --, therefor.

Column 44
Line 9 (Approx.), delete "Disperal" and insert -- Dispersal --, therefor.

Column 44
Line 9 (Approx.), delete "Chimie" and insert -- Chemie --, therefor.

Column 44
Line 64 (Approx.), delete "Willmington" and insert -- Wilmington --, therefor.